US008039098B2

(12) United States Patent
Yoshizawa et al.

(10) Patent No.: US 8,039,098 B2
(45) Date of Patent: Oct. 18, 2011

(54) COATING COMPOSITION, OPTICAL FILM, ANTIREFLECTIVE FILM, POLARIZING PLATE, AND DISPLAY DEVICE USING THE SAME

(75) Inventors: Masataka Yoshizawa, Minami-Ashigara (JP); Masaki Noro, Minami-Ashigara (JP); Takato Suzuki, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1124 days.

(21) Appl. No.: 11/795,629

(22) PCT Filed: Jan. 27, 2006

(86) PCT No.: PCT/JP2006/301348
§ 371 (c)(1),
(2), (4) Date: Jul. 19, 2007

(87) PCT Pub. No.: WO2006/080456
PCT Pub. Date: Aug. 3, 2006

(65) Prior Publication Data
US 2008/0038561 A1 Feb. 14, 2008

(30) Foreign Application Priority Data
Jan. 27, 2005 (JP) .................. 2005-019561

(51) Int. Cl.
*B32B 5/16* (2006.01)
(52) U.S. Cl. .................. 428/313.3; 428/323; 428/411.1; 428/421
(58) Field of Classification Search ............... 428/313.3, 428/411.1, 421, 323
See application file for complete search history.

(56) References Cited

U.S. PATENT DOCUMENTS 5,410,005 A * 4/1995 Nemoto et al. ............... 526/245
(Continued)

FOREIGN PATENT DOCUMENTS

JP 61-296076 A 12/1986
(Continued)

OTHER PUBLICATIONS

International Search Report for PCT/JP2006/301348, dated May 16, 2006.
(Continued)

*Primary Examiner* — Peter D. Mulcahy
*Assistant Examiner* — Henry Hu
(74) *Attorney, Agent, or Firm* — Buchanan Ingersoll & Rooney PC

(57) ABSTRACT

A coating composition capable of improving evenness in drying and evenness in airing and causing no impairment of evenness in coating, which is useful for an antireflective film having high uniformity in surface conditions and attaining sufficient antireflection performance and for a polarizing plate and a display device each using such an antireflective film. A coating composition including a fluoroaliphatic group-containing copolymer that includes a repeating unit corresponding to the fluoroaliphatic group-containing monomer represented by the following formula (1) and a repeating unit corresponding to the monomer represented by the following formula (2) was found:

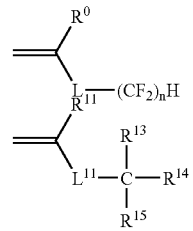

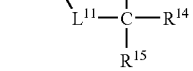

in formula [1], $R^0$ represents a hydrogen atom, a halogen atom or a methyl group; L represents a divalent linkage group; and n represents an integer of 1 to 18, and in formula [2], $R^{11}$ represents a hydrogen atom, a halogen atom or a methyl group; $L^{11}$ represents a divalent linkage group; and $R^{13}$, $R^{14}$ and $R^{15}$ each represents a 1-20C linear, branched or cyclic alkyl group which may have a substituent.

9 Claims, 6 Drawing Sheets

U.S. PATENT DOCUMENTS

| | | | |
|---|---|---|---|
| 7,273,690 B2 * | 9/2007 | Kodama et al. | 430/270.1 |
| 2005/0186505 A1 * | 8/2005 | Kodama et al. | 430/270.1 |
| 2007/0035839 A1 | 2/2007 | Ibuki | |
| 2007/0289497 A1 | 12/2007 | Suzuki | |

FOREIGN PATENT DOCUMENTS

| | | | |
|---|---|---|---|
| JP | 2-8284 A | | 1/1990 |
| JP | 7-234514 A | | 9/1995 |
| JP | 7-333404 A | | 12/1995 |
| JP | 9-90615 A | | 4/1997 |
| JP | 2003-292805 | * | 10/2003 |
| JP | 2003-292805 A | | 10/2003 |
| JP | 2004-331812 | * | 11/2004 |
| JP | 2004-331812 A | | 11/2004 |
| JP | 2005-115139 A | | 4/2005 |
| JP | 2005-115359 A | | 4/2005 |
| JP | 2006-117915 A | | 5/2006 |
| WO | WO 2006/035949 A1 | | 4/2006 |
| WO | WO-2006/080456 A1 | * | 8/2006 |
| WO | WO-2006/080456 A1 | * | 8/2006 |

OTHER PUBLICATIONS

Office Action from Japanese Patent Office issued in Applicant's corresponding Japanese Patent Application No. 2005-019561 dated Aug. 31, 2010, and an English Translation thereof.

Official Action dated Jan. 4, 2011, issued by the Japanese Patent Office in corresponding Japanese Patent Application No. 2005-019561, and English translation of the Official Action.

* cited by examiner (A)

(B)

COATING COMPOSITION, OPTICAL FILM, ANTIREFLECTIVE FILM, POLARIZING PLATE, AND DISPLAY DEVICE USING THE SAME

TECHNICAL FIELD

The present invention relates to a coating composition, an optical film, an antireflective film, a polarizing plate, and a display device using them.

BACKGROUND ART

Recent years have seen advancement in development of materials utilizing a wide variety of coating techniques. Coating techniques for thin layers on thickness levels of several micrometers to several tens of nanometers in particular are necessary for optical films, graphic arts, photolithography and the like, and the coating accuracy required therein is also being increased, e.g., as the coating layer is reduced in thickness, the substrate is upsized and the coating is speeded up. In manufacturing optical films in particular, the film thickness control is a very important point because it has a decisive influence on optical performance, so there is a growing demand for techniques that permit achievement of speedups in coating operations while assuring continued accuracy.

For the purpose of preventing a contrast drop and degradation of image viewability due to reflections of outside light in image display devices, such as a cathode-ray tube (CRT) display device, a plasma display panel (PDP), an electroluminescent display (ELD) and a liquid crystal display (LCD), an antireflective film is generally placed at the outermost surface of each display so as to reduce the reflectance through utilization of the principle of optical interference.

As those display devices, especially display devices having thinner depth dimensions and wider display areas than traditional CRTs, have proliferated in recent years, demand for display devices with higher definition and higher quality has come to grow. With this trend, uniformity of surface conditions has urgently been required for antireflective films. The term "uniformity of surface conditions" as used herein means that neither variations in optical performance, notably antireflection performance, nor variations in physical properties as film, notably a scratch-resistant property, are present in the overall display area.

As a method of manufacturing antireflective film, the inorganic vapor deposition method as described in Patent Document 1 can be cited. In this document, the silicon oxide film formed using a CVD method is disclosed as an antiglare antireflective film having excellent gas-barrier, antiglare and anti-reflection properties. In point of high-volume production capability, however, a method of manufacturing antireflective film by all-wet coating has an advantage.

Although an all-wet coating method using a solvent is highly advantageous from the viewpoint of productivity, it is very difficult to perform drying of the solvent right after the coating as dried conditions are kept uniform, so unevenness in surface conditions tend to develop. The expression "unevenness in surface conditions" as used herein is intended to include unevenness of drying which results from a difference in solvent drying speeds, unevenness of airing as unevenness in thickness caused by drying air variations, and unevenness of coating which occurs in a coating division. For further increasing the productivity in all-wet coating, the speeding up of a coating operation is an essential technique. However, a simple increase in coating speed involves relatively increasing the velocity of drying air and produces an effect of entrained wind resulting from high-speed transport of a support; as a result, the unevenness of airing becomes worse. In addition, the coating division becomes more unstable, so the unevenness of coating becomes worse in many cases. Accordingly, it has so far been impossible to much increase the coating speed with the intention of obtaining antireflective film reduced in variations of optical performance and physical film properties.

It is known that enhancement of leveling quality is effective in reducing the unevenness which develops under drying. As a measure taken to enhance the leveling quality, addition of surfactants to coating compositions has been put forth. This measure is based on a mechanism that, when a surfactant is added to a coating composition, the coating composition is reduced in surface tension to result in improvement in its ability to wet a material to be coated therewith and the change in surface tension during the process of coating formation is reduced or decreased to result in prevention of thermal convection and improvement in uniformity of coating film (See Non-patent Document 1: Haruo Kiryu (supervisor), Coating Yo Tenkazai no Saishin Gijutu (Latest Arts of Coating Additives), CMC (2001)). Although the most suitable species of surfactants vary depending on, e.g., the compatibilities with solvent, resin and additives used in the desired coating composition, it is effective to use fluorochemical surfactants in the case of applying a coating with the aid of solvent because of their solubility in solvents and their highest ability to lower surface tension.

In general, a fluorochemical surfactant is a compound having in each of its molecules both a fluoroaliphatic group for performing a function of lowering surface tension and a medium affinity group contributing to affinity for various compositions used for coating or molding materials when the surfactant is used as an additive. Such a compound can be obtained by copolymerizing a monomer having a fluoroaliphatic group and a monomer having a medium affinity group.

Typical examples of a monomer having a medium affinity group, which is polymerized together with a monomer having a fluoroaliphatic group, include poly(oxyalkylene)acrylates and poly(oxyalkylene)methacrylates. On the other hand, there is a report of the antireflective film in which both improvement in airing marks and anti-scratch performance are ensured by use of the fluorocarbon polymer of ω-H type disclosed in Patent Document 2.

However, the use of traditional fluorochemical surfactants can make improvements in drying marks and airing marks, but cannot avoid unevenness of coating and entails a problem of lowering quality of the antireflective film formed through coating.

Patent Document 1: JP-A-7-333404
Patent Document 2: JP-A-2004-331812
Non-patent Document 1: Coating Yo Tenkazai no Saishin Gijutu (Latest Arts of Coating Additives), compiled under supervision by Haruo Kiryu, published by CMC (2001)

DISCLOSURE OF THE INVENTION

Problems that the Invention is to Solve

Objects of the invention are:
(1) to provide a coating composition containing a fluoroaliphatic group-containing polymer which permits not only reductions in drying marks and airing marks but also prevention of aggravation of unevenness of coating, (2) to provide an antireflective film which is highly uniform in surface conditions and attains sufficient antireflection performance, and (3) to provide a polarizing plate and a display device which each use the antireflective film as described above.

Means for Solving the Problems

As a result of our scrutiny of the structures of fluoroaliphatic groups in fluoroaliphatic group-containing monomers as constituents of fluorochemical surfactants and the compositions of fluoroaliphatic group-containing monomers and fluoroaliphatic group-free monomers in fluorochemical surfactants, it has been found that a composition capable of not only reducing drying marks and airing marks which develop during the process of coating but also avoiding aggravation of unevenness of coating can be obtained by use of a fluorochemical surfactant including a monomer having a tertiary carbon and not containing a fluoroaliphatic group and a monomer containing a fluoroaliphatic group having a specific structure.

More specifically, the present invention are attained with the following.

(1) A coating composition, which comprises:

a fluoroaliphatic group-containing copolymer that comprises a repeating unit corresponding to the following monomer (i) and a repeating unit corresponding to the following monomer (ii):

(i) fluoroaliphatic group-containing monomer represented by the following formula [1], (ii) monomer represented by the following formula [2]:

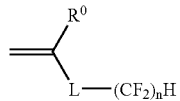

Formula [1]

in formula [1], $R^0$ represents a hydrogen atom, a halogen atom or a methyl group;

L represents a divalent linkage group; and n represents an integer of 1 to 18, and

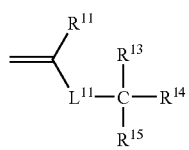

Formula [2]

in formula [2], $R^{11}$ represents a hydrogen atom, a halogen atom or a methyl group;

$L^{11}$ represents a divalent linkage group; and $R^{13}$, $R^{14}$ and $R^{15}$ each represents a 1-20C linear, branched or cyclic hydrocarbon group or an aromatic heterocyclic group, which each may have a substituent.

(2) The coating composition as described in (1) above, wherein the fluoroaliphatic group-containing monomer represented by the formula [1] described in (1) above is represented by the following formula [3]:

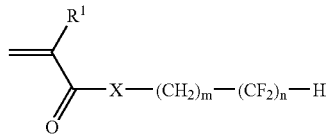

Formula [3]

in formula [3], $R^1$ represents a hydrogen atom, a halogen atom or a methyl group;

X represents an oxygen atom, a sulfur atom or —N(Ra)—;

m represents an integer of 1 to 6; and n represents an integer of 1 to 18, in which Ra represents a hydrogen atom or a 1-8C alkyl group which may have a substituent.

(3) A coating composition, which comprises:

a fluoroaliphatic group-containing copolymer that comprises a repeating unit corresponding to the following monomer (i) and a repeating unit corresponding to the following monomer (ii):

(i) fluoroaliphatic group-containing monomer represented by the following formula [4], (ii) monomer represented by the following formula [2]:

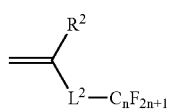

Formula [4]

in formula [4], $R^2$ represents a hydrogen atom, a halogen atom or a methyl group;

$L^2$ represents a divalent linkage group; and n represents an integer of 1 to 6, and

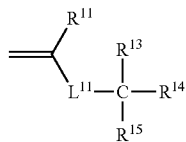

Formula [2]

in formula [2], $R^{11}$ represents a hydrogen atom, a halogen atom or a methyl group;

$L^{11}$ represents a divalent linkage group; and $R^{13}$, $R^{14}$ and $R^{15}$ each represents a 1-20C linear, branched or cyclic hydrocarbon group or an aromatic heterocyclic group, which each may have a substituent.

(4) The coating composition as described in (3) above, wherein the fluoroaliphatic group-containing monomer represented by the formula [4] described in (3) above is represented by the following formula [5]:

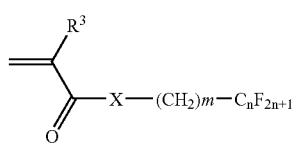

Formula [5]

in formula [5], $R^3$ represents a hydrogen atom or a methyl group;

X represents an oxygen atom, a sulfur atom or —N(Rb)—;

m represents an integer of 1 to 6; and n represents an integer of 1 to 6, in which Rb represents a hydrogen atom or a 1-8C alkyl group which may have a substituent.

(5) A coating composition, which comprises:

a fluoroaliphatic group-containing copolymer that comprises a repeating unit corresponding to the following monomer (i) and a repeating unit corresponding to the following monomer (ii):

(i) fluoroaliphatic group-containing monomer represented by the following formula [1], (ii) fluoroaliphatic group-containing monomer represented by the following formula [4]:

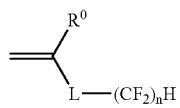

Formula [1]

in formula [1], $R^0$ represents a hydrogen atom, a halogen atom or a methyl group;

L represents a divalent linkage group; and n represents an integer of 1 to 18, and

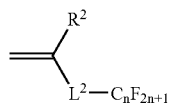

Formula [4]

in formula [4], $R^2$ represents a hydrogen atom, a halogen atom or a methyl group;

$L^2$ represents a divalent linkage group; and n represents an integer of 1 to 6.

(6) The coating composition as described in any of (1) to (4) above, wherein the monomer represented by the formula [2] is represented by the following formula [6]:

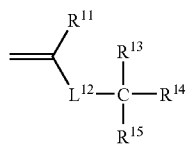

Formula [6]

in formula [6], $R^{11}$ represents a hydrogen atom, a halogen atom or a methyl group;

$L^{12}$ represents a divalent linkage group containing any of an oxygen atom, a nitrogen atom and a sulfur atom; and $R^{13}$, $R^{14}$ and $R^{15}$ each represents a 1-20C linear, branched or cyclic hydrocarbon atom or an aromatic heterocyclic group, which each may have a substituent.

(7) The coating composition as described in any of (1) to (4) and (6) above, wherein the monomer represented by the formula [2] is represented by the following formula [7]:

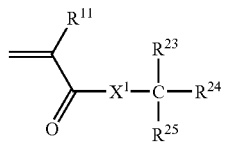

Formula [7]

in formula [7], $R^{11}$ represents a hydrogen atom, a halogen atom or a methyl group;

$X^1$ represents an oxygen atom, a sulfur atom or —N(Rc)-; and $R^{23}$, $R^{24}$ and $R^{25}$ each represents a 1-20C linear, branched or cyclic alkyl group, in which Rc represents a hydrogen atom or a 1-8C alkyl group which may have a substituent.

(8) An optical film, wherein at least one layer of the coating composition as described in any one of (1) to (7) above is coated on a transparent support.

(9) An antireflective film, wherein the optical film as described in (8) above has antireflection capability.

(10) A polarizing plate, wherein the antireflective film as described in (9) above is used on at least one side of a polarizing film.

(11) A polarizing plate, wherein the antireflective film as described in (9) above is used as a protective film for one side of a polarizing film and an optically-compensatory film having optical anisotropy is used as a protective film for the other side of the polarizing film.

(12) An image display device, wherein the antireflective film as described in (9) above or the polarizing plate as described in (10) or (11) above is disposed.

Advantages of the Invention

In accordance with the invention, it is possible to provide (i) a coating composition including a fluoroaliphatic group-containing polymer which allows compatibility between reductions in drying and airing marks and prevention of aggravation of unevenness of coating, (ii) an antireflective film having high uniformity in surface conditions and attaining sufficient antireflection performance, and (iii) a polarizing plate and a display device which each uses such an antireflective film.

Figure 1:
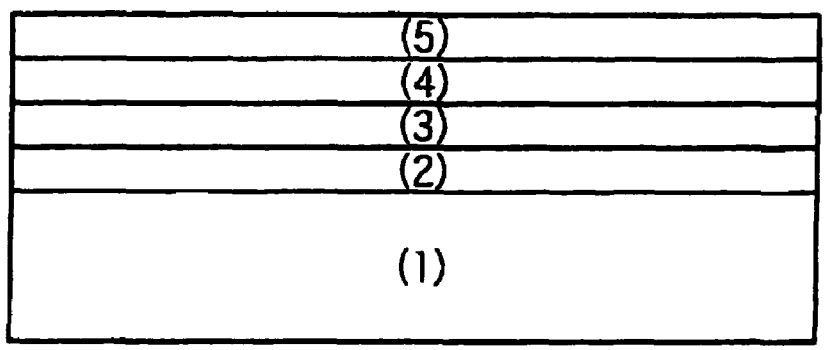
FIG. 1 is a schematic cross-sectional diagram showing one example of layer structures of antireflective films relating to the invention.

DESCRIPTION OF REFERENCE NUMERALS AND SIGNS (1): Transparent support
(2): Hard coating layer
(3): Medium refractive index layer
(4): High refractive index layer
(5): Low refractive index layer
11: Backup roll
14a: Bead
14b: Coating film
15: Pocket
16: Slot
16a: Slot opening
18: Flat part
30: Slot die
31a: Upstream-side lip land
31b: Downstream-side lip land
32: Pocket
33: Slot
40 Reduced-pressure chamber
40a Back plate
40b Side plate
40c Screw
$G_B$ Gap between back plate 40a and web W
$G_S$ Gap between side plate 40b and web W
W Web

BEST MODE FOR CARRYING OUT THE INVENTION

According to the attached drawings, preferred modes of the present composition, coating composition, antireflective film, method of manufacturing the antireflective film, polarizing plate using the antireflective film and image display device using them are each described in detail.

Fluoroalphatic group-containing copolymers (hereinafter abbreviated as "fluoropolymers" occasionally) relating to the invention are described below in detail.

Each of monomers represented by formula [2] and usable in the invention has tertiary carbon, and this carbon is preferably introduced to a position close to the unsaturated double bond. The term "tertiary carbon" as used herein refers to the carbon represented by $—C(R^{13})(R^{14})(R^{15})$. $R^{13}$, $R^{14}$ and $R^{15}$ each represent a 1-20C linear, branched or cyclic hydrocarbon group or an aromatic heterocyclic group, which may have a substituent.

In formula [2] according to the invention, $R^{11}$ represents a hydrogen atom, a halogen atom (preferably a fluorine atom) or a methyl group, preferably a hydrogen atom or a methyl group. $L^{11}$ represents a divalent linkage group, preferably a divalent linkage group containing an oxygen atom, a sulfur atom or a nitrogen atom. $R^{13}$, $R^{14}$ and $R^{15}$ each represent a 1-20C linear, branched or cyclic alkyl group, which may have a substituent, preferably a 1-20C linear, branched or cyclic alkyl group. In addition, two or more varieties of polymerizing units derived from monomers represented by formula [2] may be contained as constituent units in the present fluoroaliphatic group-containing copolymer.

In formula [6] according to the invention, $R^{11}$ represents a hydrogen atom, a halogen atom or a methyl group, preferably a hydrogen atom or a methyl group. $L^2$ represents a divalent linkage group containing any of oxygen, nitrogen and sulfur atoms, preferably —COO—, —COS— or —CON(Rd)- . Herein, Rd represents a hydrogen atom or a 1-8C alkyl group. $R^{13}$, $R^{14}$ and $R^{15}$ each represent a 1-20C linear, branched or cyclic hydrocarbon group or an aromatic heterocyclic group, which may have a substituent, preferably a 1-20C linear, branched or cyclic alkyl group. In addition, two or more varieties of polymerizing units derived from monomers represented by formula [6] may be contained as constituent units in the present fluoroaliphatic group-containing copolymer.

In formula [7] according to the invention, $R^{11}$ represents a hydrogen atom, a halogen atom or a methyl group, preferably a hydrogen atom or a methyl group. $X^1$ represents an oxygen atom, a sulfur atom or —N(Rc)-, preferably an oxygen atom. Herein, Rc represents a hydrogen atom or a 1-8C alkyl group, preferably a 1-4C alkyl group. $R^{23}$, $R^{24}$ and $R^{25}$ each represent a 1-20C linear, branched or cyclic alkyl group, preferably a 1-8C linear, branched or cyclic alkyl group. In addition, two or more varieties of polymerizing units derived from monomers represented by formula [7] may be contained as constituent units in the present fluoroaliphatic group-containing copolymer.

More specific examples of monomers represented by formula [2], [6] or [7] according to the invention include the monomers illustrated below, but not limited to these monomers.

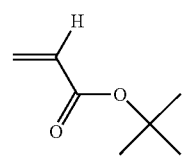

A-1

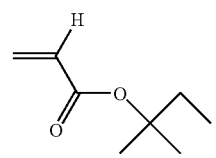

A-2

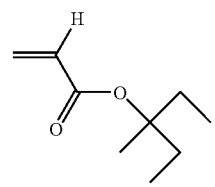

A-3

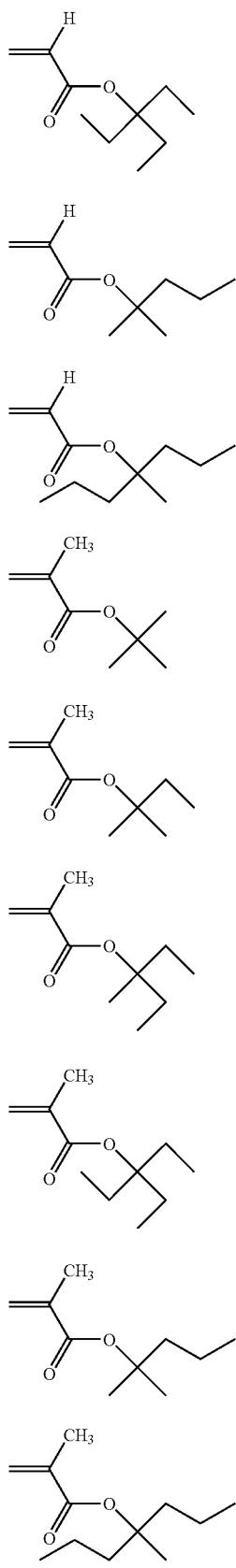
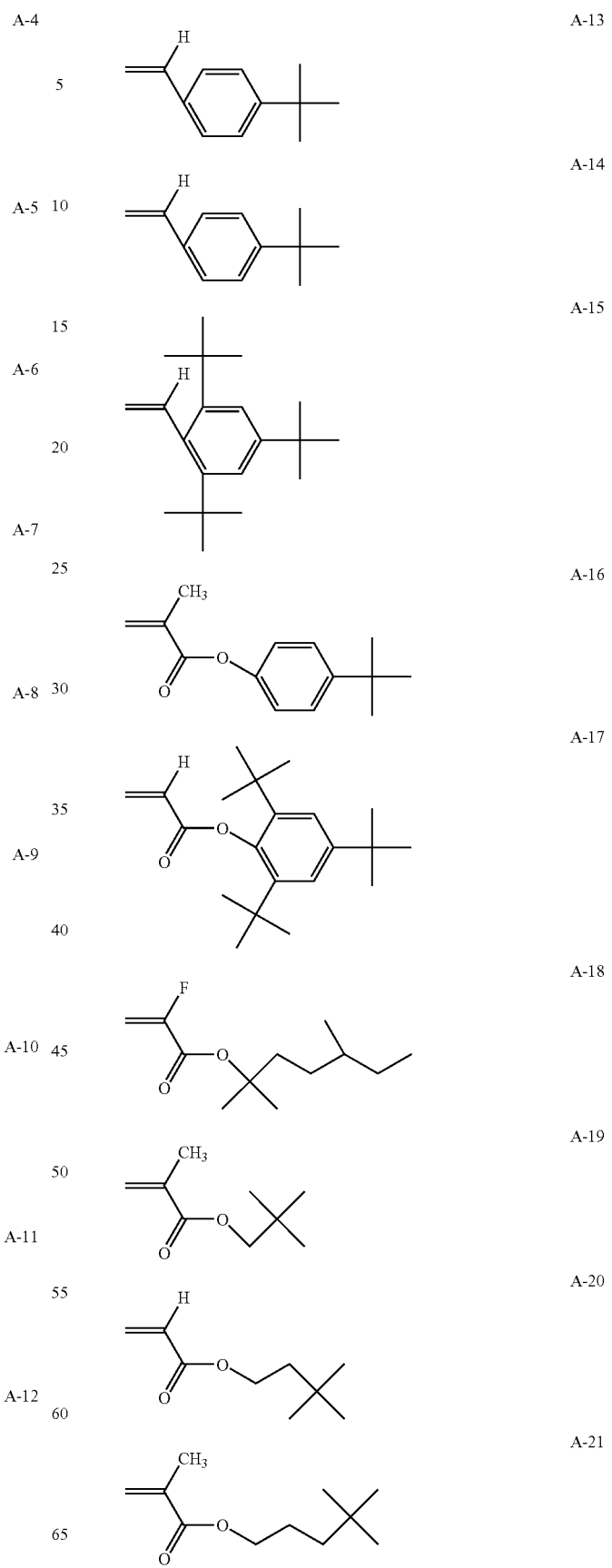

-continued

A-22
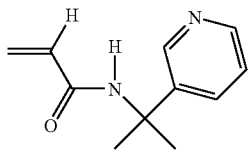

A-23
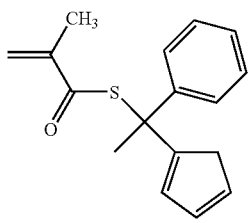

A-24
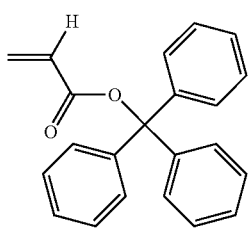

In the next place, fluoroaliphatic group-containing monomers represented by formula [1] are described.

In formula [1] according to the invention, $R^0$ represents a hydrogen atom, a halogen atom (preferably a fluorine atom) or a methyl group, preferably a hydrogen atom or a methyl group. L represents a divalent linkage group, preferably a divalent linkage group containing an oxygen atom, a sulfur atom or a nitrogen atom. n represents an integer of 1 to 18, preferably 4 to 12, far preferably 6 to 8, especially preferably 6.

In addition, two or more varieties of polymerizing units derived from fluoroaliphatic group-containing monomers represented by formula [1] may be contained as constituent units in the fluoropolymer.

In formula [3] according to the invention, $R^1$ represents a hydrogen atom, a halogen atom (preferably a fluorine atom) or a methyl group, preferably a hydrogen atom or a methyl group. X represents an oxygen atom, a sulfur atom or —N(Ra)—, preferably an oxygen atom or —N(Ra)—, far preferably an oxygen atom. Ra represents a hydrogen atom or a 1-8C alkyl group, preferably a hydrogen atom or a 1-4C alkyl group, far preferably a hydrogen atom or a methyl group. m represents an integer of 1 to 6, preferably 1 to 3, far preferably 1. n represents an integer of 1 to 18, preferably 4 to 12, far preferably 6 to 8, especially preferably 6.

In addition, two or more varieties of polymerizing units derived from fluoroaliphatic group-containing monomers represented by formula [3] may be contained as constituent units in the fluoropolymer.

In addition, two or more varieties of polymerizing units derived from fluoroaliphatic group-containing monomers represented by formula [1] may be contained as constituent units in the fluoropolymer.

Specific examples of fluoroaliphatic group-containing monomers represented by formula [1] or [3] include the monomers illustrated below, but not limited to these monomers.

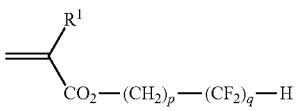

| | $R^1$ | p | q |
|---|---|---|---|
| F-1 | H | 1 | 4 |
| F-2 | CH$_3$ | 1 | 4 |
| F-3 | F | 1 | 4 |
| F-4 | H | 2 | 4 |
| F-5 | CH$_3$ | 3 | 4 |
| F-6 | H | 1 | 6 |
| F-7 | CH$_3$ | 1 | 6 |
| F-8 | F | 1 | 6 |
| F-9 | H | 2 | 6 |
| F-10 | CH$_3$ | 2 | 6 |
| F-11 | H | 3 | 6 |
| F-12 | H | 1 | 8 |
| F-13 | CH$_3$ | 1 | 8 |
| F-14 | F | 1 | 8 |
| F-15 | CH$_3$ | 2 | 8 |
| F-16 | H | 3 | 8 |
| F-17 | CH$_3$ | 3 | 8 |
| F-18 | H | 1 | 10 |
| F-19 | CH$_3$ | 1 | 10 |
| F-20 | F | 1 | 10 |
| F-21 | H | 2 | 10 |
| F-22 | H | 2 | 10 |
| F-23 | H | 1 | 12 |
| F-24 | CH$_3$ | 1 | 12 |
| F-25 | F | 1 | 12 |
| F-26 | H | 2 | 12 |
| F-27 | H | 3 | 12 |
| F-28 | H | 1 | 14 |
| F-29 | CH$_3$ | 1 | 14 |
| F-30 | F | 1 | 14 |
| F-31 | H | 2 | 14 |
| F-32 | CH$_3$ | 2 | 14 |
| F-33 | H | 1 | 16 |
| F-34 | CH$_3$ | 1 | 16 |
| F-35 | F | 1 | 16 |
| F-36 | CH$_3$ | 2 | 16 |
| F-37 | H | 3 | 16 |
| F-38 | H | 1 | 18 |
| F-39 | CH$_3$ | 1 | 18 |
| F-40 | F | 1 | 18 |
| F-41 | H | 3 | 18 |
| F-42 | CH$_3$ | 3 | 18 |

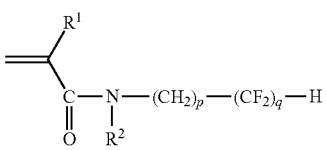

| | $R^1$ | $R^2$ | p | q |
|---|---|---|---|---|
| F-43 | H | H | 1 | 4 |
| F-44 | CH$_3$ | H | 1 | 4 |
| F-45 | H | CH$_3$ | 1 | 4 |
| F-46 | H | H | 2 | 4 |
| F-47 | H | H | 1 | 6 |
| F-48 | CH$_3$ | H | 1 | 6 |
| F-49 | H | CH$_3$ | 1 | 6 |
| F-50 | H | C$_2$H$_5$ | 1 | 6 |
| F-51 | CH$_3$ | H | 1 | 6 |
| F-52 | F | H | 2 | 6 |
| F-53 | H | H | 1 | 8 |
| F-54 | CH$_3$ | H | 1 | 8 |
| F-55 | H | CH$_3$ | 1 | 8 |
| F-56 | H | C$_4$H$_9$(n) | 1 | 8 |
| F-57 | CH$_3$ | C$_2$H$_5$ | 1 | 8 |
| F-58 | H | CH$_2$Ph | 1 | 8 |
| F-59 | H | H | 2 | 8 |

-continued

| | R¹ | R² | n | q |
|---|---|---|---|---|
| F-60 | CH₃ | H | 3 | 8 |
| F-61 | H | H | 1 | 10 |
| F-62 | CH₃ | CH₃ | 1 | 10 |
| F-63 | H | H | 1 | 12 |
| F-64 | CH₃ | H | 1 | 12 |
| F-65 | H | H | 1 | 18 |
| F-66 | H | CH₃ | 1 | 18 |

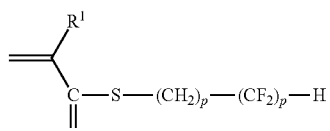

| | R¹ | p | q |
|---|---|---|---|
| F-67 | H | 1 | 4 |
| F-68 | CH₃ | 1 | 4 |
| F-69 | H | 2 | 4 |
| F-70 | H | 1 | 6 |
| F-71 | CH₃ | 1 | 6 |
| F-72 | CH₃ | 2 | 6 |
| F-73 | H | 1 | 8 |
| F-74 | CH₃ | 1 | 8 |
| F-75 | F | 1 | 8 |
| F-76 | H | 2 | 8 |
| F-77 | CH₃ | 3 | 8 |
| F-78 | H | 1 | 10 |
| F-79 | CH₃ | 1 | 10 |
| F-80 | H | 1 | 12 |
| F-81 | CH₃ | 1 | 12 |
| F-82 | H | 1 | 16 |
| F-83 | CH₃ | 2 | 16 |
| F-84 | H | 1 | 18 |
| F-85 | CH₃ | 1 | 18 |

In formula [4] according to the invention, $R^2$ represents a hydrogen atom, a halogen atom (preferably a fluorine atom) or a methyl group, preferably a hydrogen atom or a methyl group. $L^2$ represents a divalent linkage group, preferably a divalent linkage group containing an oxygen atom, a sulfur atom or a nitrogen atom. n represents an integer of 1 to 6, preferably 4 to 6, far preferably 6.

Two or more varieties of polymerizing units derived from fluoroaliphatic group-containing monomers represented by formula [4] may be contained as constituent units in the fluoroaliphatic group-containing copolymer.

In formula [5] according to the invention, $R^3$ represents a hydrogen atom, a halogen atom or a methyl group, preferably a hydrogen atom or a methyl group. X represents an oxygen atom, a sulfur atom or —N(Rb)—, preferably an oxygen atom or —N(Rb)—, far preferably an oxygen atom. Rb represents a hydrogen atom or a 1-8C alkyl group, preferably a hydrogen atom or a 1-4C alkyl group, far preferably a hydrogen atom or a methyl group. m represents an integer of 1 to 6, preferably 1 to 3, far preferably 1. n represents an integer of 1 to 6, preferably 4 to 6, far preferably 6.

Two or more varieties of polymerizing units derived from fluoroaliphatic group-containing monomers represented by formula [1] may be contained as constituent units in the fluoroaliphatic group-containing copolymer.

More specific examples of fluoroaliphatic group-containing monomers represented by formula [4] or [5] include the monomers illustrated below, but not limited to these monomers.

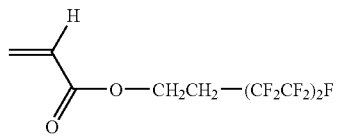

F-1

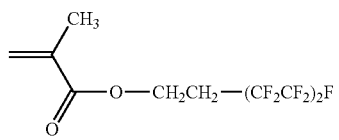

F-2

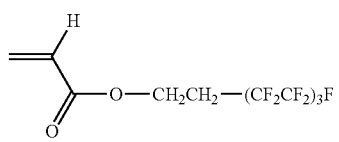

F-3

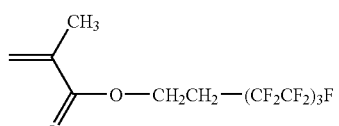

F-4

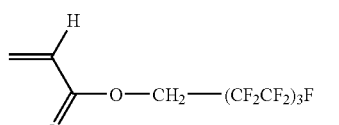

F-5

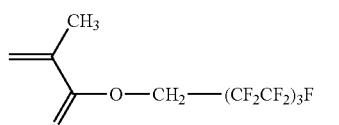

F-6

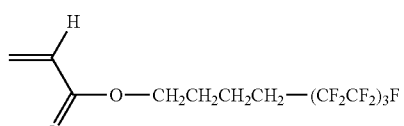

F-7

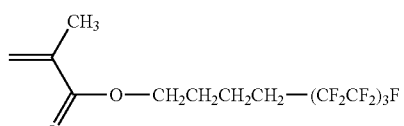

F-8

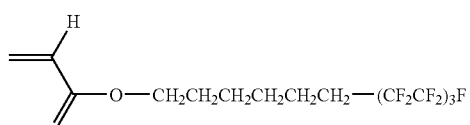

F-9

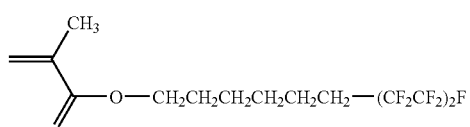

F-10

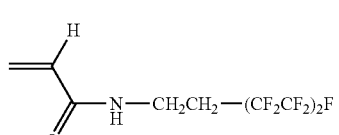

F-11

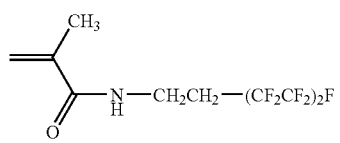
F-12
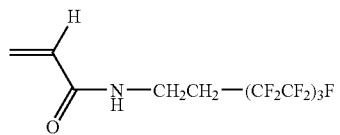
F-13
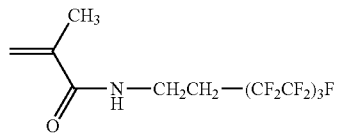
F-14
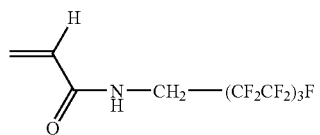
F-15
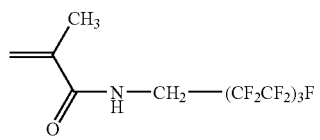
F-16
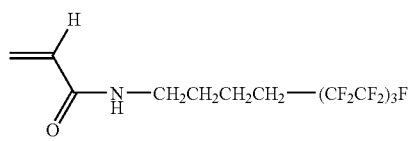
F-17
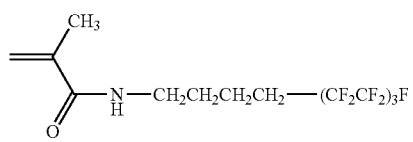
F-18
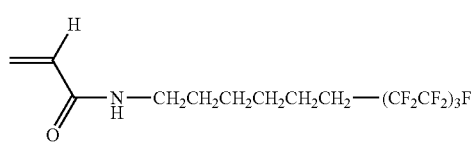
F-19
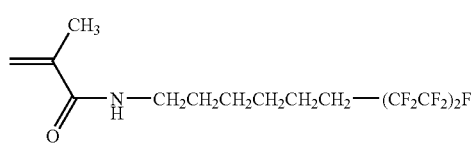
F-20
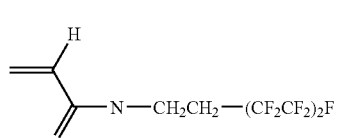
F-21
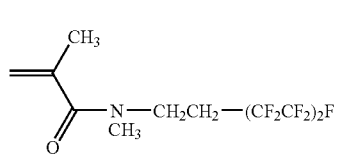
F-22
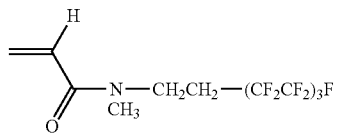
F-23
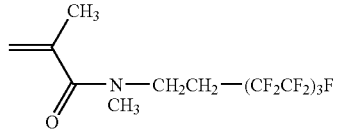
F-24
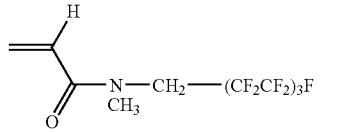
F-25
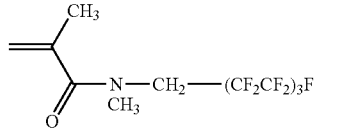
F-26
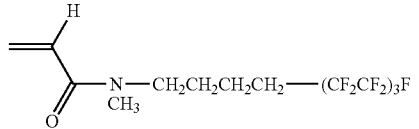
F-27
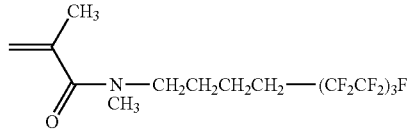
F-28
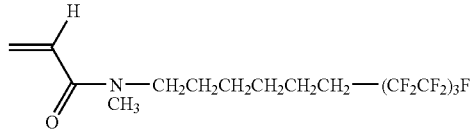
F-29
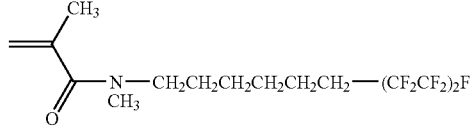
F-30
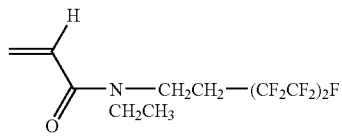
F-31
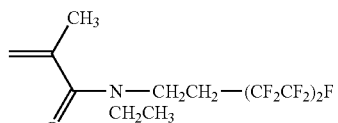
F-32
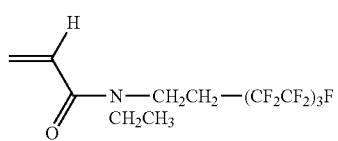
F-33

F-34 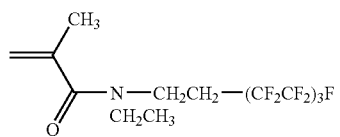
F-35 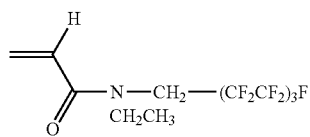
F-36 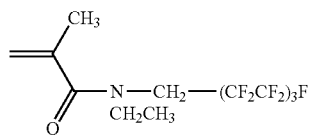
F-37 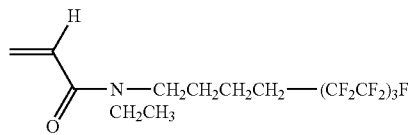
F-38 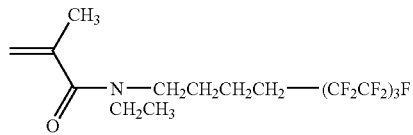
F-39 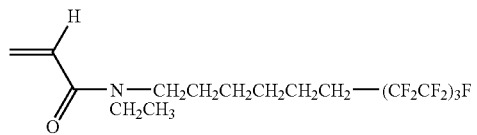
F-40 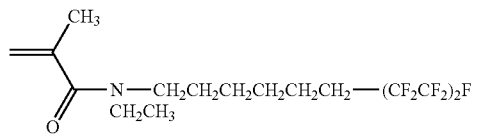
F-41 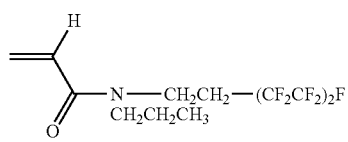
F-42 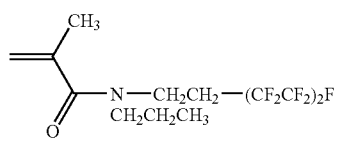
F-43 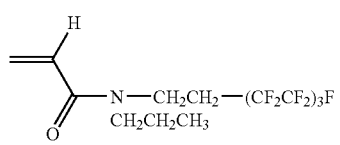
F-44 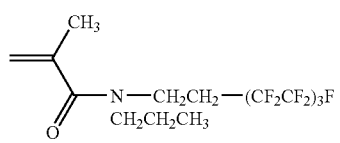
F-45 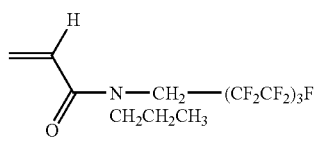
F-46 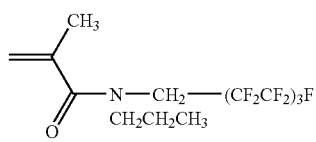
F-47 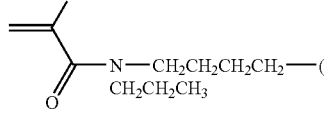
F-48 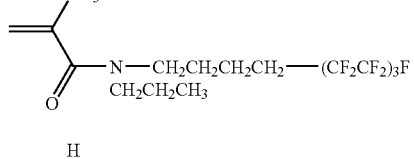
F-49 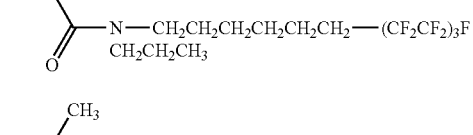
F-50 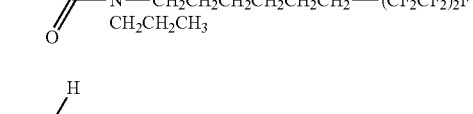
F-51 
F-52 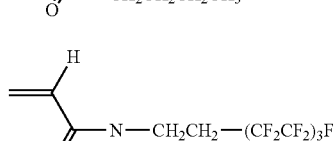
F-53 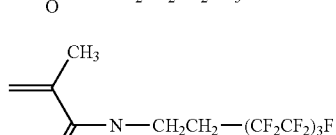
F-54 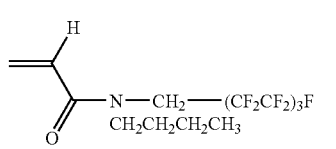
F-55 

-continued

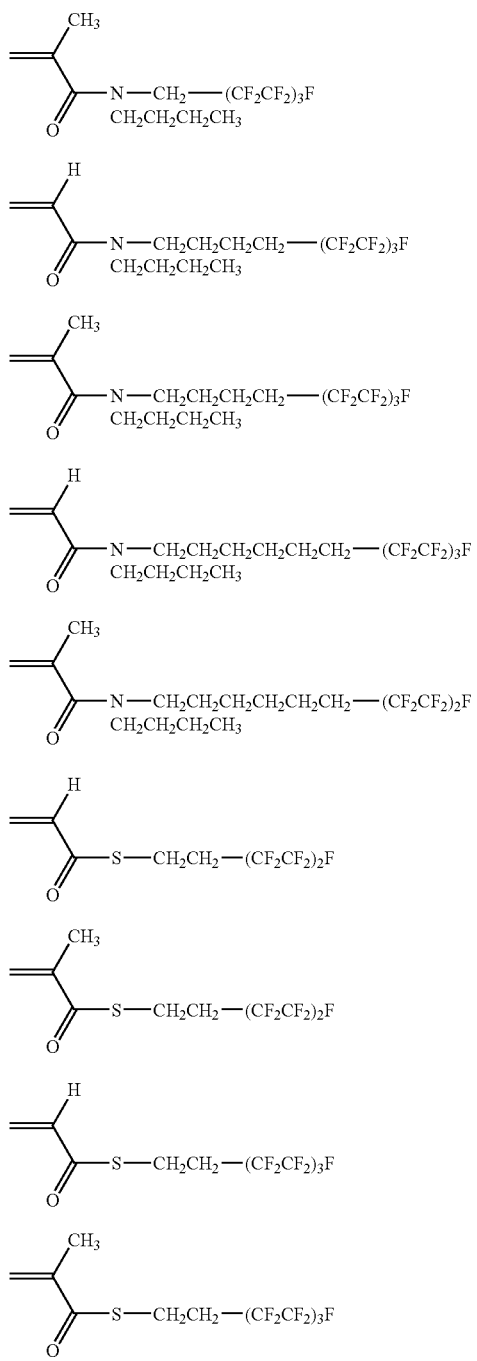

Additionally, part of fluorochemical products produced by electrolytic fluorination methods which have so far been affected are substances having poor biodegradability and high biological accumulativeness, and there is an apprehension that they have reproductive toxicity and developmental toxicity in limited degrees. The fluoropolymers according to the invention which have hydrogen atoms at the ends of their respective fluoroaliphatic groups or short lengths of fluoroalkyl chains (having at most 6 carbon atoms) even when they have fluorine atoms at the ends are also substances having higher environmental safety, which is said to be an industrially advantageous point.

The fluoropolymers usable in the invention may be copolymers of monomers specified in the invention and copolymerizable monomers of other kinds. As the copolymerizable monomers of other kinds, the monomers described in Polymer Handbook, 2nd. Ed., J. Brandrup, Wiley Interscience (1975), Chapter 2, Pages 1-483 can be used.

Examples of such copolymerizable monomers include compounds each having one addition polymerizable unsaturated bond, such as acrylic acid, methacrylic acid, acrylic acid esters, methacrylic acid esters, acrylamides, methacrylamides, allyl compounds, vinyl ethers and vinyl esters.

The following are examples of more specific monomers.

Acrylic Acid Esters:

Methyl acrylate, ethyl acrylate, propyl acrylate, chloroethyl acrylate, 2-hydroxyethyl acrylate, trimethylolpropane monoacrylate, benzyl acrylate, methoxybenzyl acrylate, furfuryl acrylate, tetrahydrofurfuryl acrylate and the like, Methacrylic Acid Esters:

Methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate and the like.

Acrylamides:

Acrylamide, N-alkylacrylamide (the alkyl moiety of which contains 1 to 3 carbon atoms, such as a methyl group, an ethyl group or a propyl group), N,N-dialkylacrylamide (the alkyl moiety of which contains 1 to 6 carbon atoms), N-hydroxyethyl-N-methylacrylamide, N-2-acetamidoethyl-N-acetylacrylamide and the like.

Methacrylamides:

Methacrylamide, N-alkylmethacrylamide (the alkyl moiety of which contains 1 to 3 carbon atoms, such as a methyl group, an ethyl group or a propyl group), N,N-dialkylmethacrylamide (the alkyl moiety of which contains 1 to 6 carbon atoms), N-hydroxyethyl-N-methylmethacrylamide, N-2-acetamidoethyl-N-acetylmethacrylamide and the like.

Allyl Compounds:

Allyl esters (such as allyl acetate, allyl caproate, allyl caprylate, allyl laurate, allyl palmitate, allkyl stearate, allyl benzoate, allyl acetoacetate and allyl lactate), allyloxy ethanol and the like Vinyl Ethers:

Alkyl vinyl ethers (such as hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether and tetrahydrofurfuryl vinyl ether)

Vinyl Esters:

Vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinyl butoxyacetate, vinyl lactate, vinyl-β-phenyl butyrate, vinyl cyclohexylcarboxylate and the like.

Dialkyl Itaconates:

Dimethyl itaconate, diethyl itaconate, dibutyl itaconate and the like.

Dialkyl or Monoalkyl Fumarates:

Dibutyl fumarate and the like.

Others:

Crotonic acid, itaconic acid, acrylonitrile, methacrylonitrile, maleylonitrile, styrene and so on.

The amount of polymerizing units derived from the fluoroaliphatic group-containing monomers of formula [1], [3],

[4] or [5] as constituents of a fluoropolymer used in the invention is preferably 80 mass % or less, far preferably 60 mass % or less, further preferably 50 mass % or less, based on the total polymerizing units constituting the fluoropolymer.

The amount of polymerizing units derived from monomers of formula [2], [6] or [7], which are suitably used in the invention, is preferably 20 mass % or more, far preferably 40 mass % or more, further preferably 50 mass % or more, based on the total polymerizing units constituting the fluoropolymer.

The mass-average molecular weight of a fluoroaliphatic group-containing polymer used in the invention is preferably from 3,000 to 100,000, far preferably from 6,000 to 80,000, further preferably from 8,000 to 60,000.

Herein, the mass-average molecular weight and molecular weights are values measured with a GPC analyzing system using columns TSKgel GMHxL, TSKgel G4000H and TSKgel G2000HxL (trade names, products of Tosoh Corporation), a solvent THF and differential refractometer detection, and calculated in terms of polystyrene.

The fluoropolymers according to the invention can be produced by use of generally known methods. For instance, they each can be produced by solving in an organic solvent monomers including the (meth)acrylate having a fluoroaliphatic group as recited above and the (meth)acrylate having a linear, branched or cyclic alkyl group as recited above and polymerizing the monomers by adding thereto a generally used radical polymerization initiator. In some cases, they may be produced by polymerizing other addition polymerizing unsaturated compounds together with the foregoing monomers in accordance with the method described above. Alternatively, a dripping polymerization method, in which polymerization is performed as monomers and an initiator are dripped into a reaction vessel in accordance with polymerization capability of each monomer, can be applied, and it is effective for producing polymers uniform in composition.

Examples of specific structures of fluoropolymers according to the invention include the following, but not limited to these structures. Incidentally, the figures in structural formulae represent proportions by mass of their corresponding monomeric constituents. Mw stands for mass-average molecular weight.

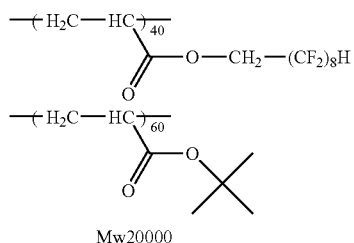

P-1

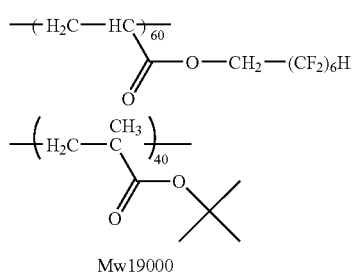

P-2

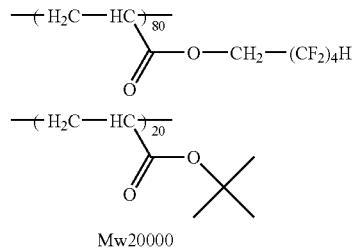

P-3

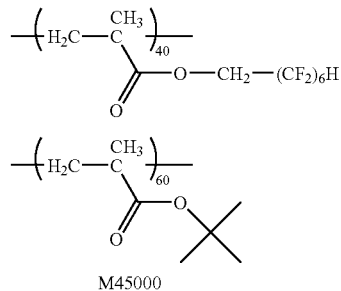

P-4

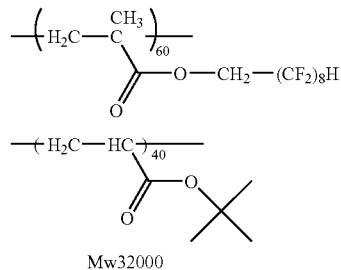

P-5

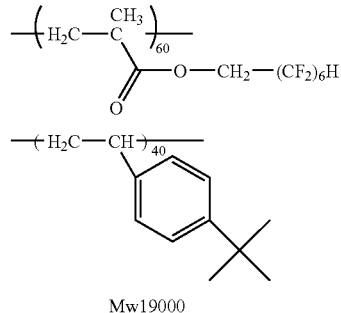

P-6

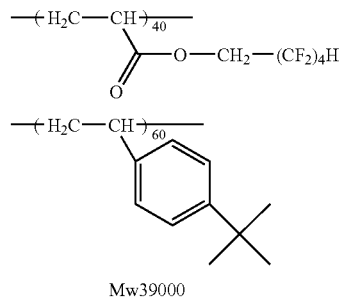

P-7

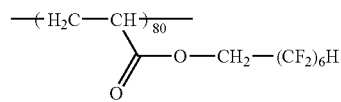

P-8

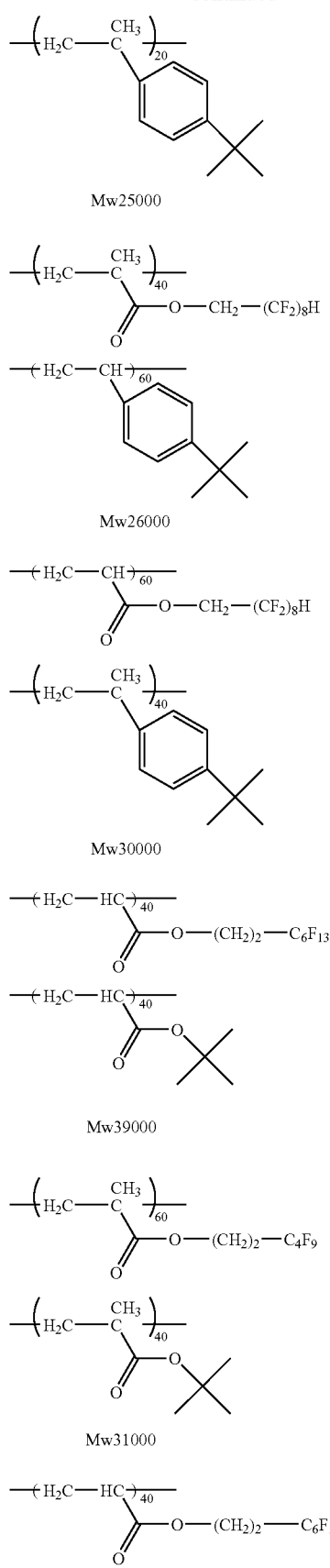
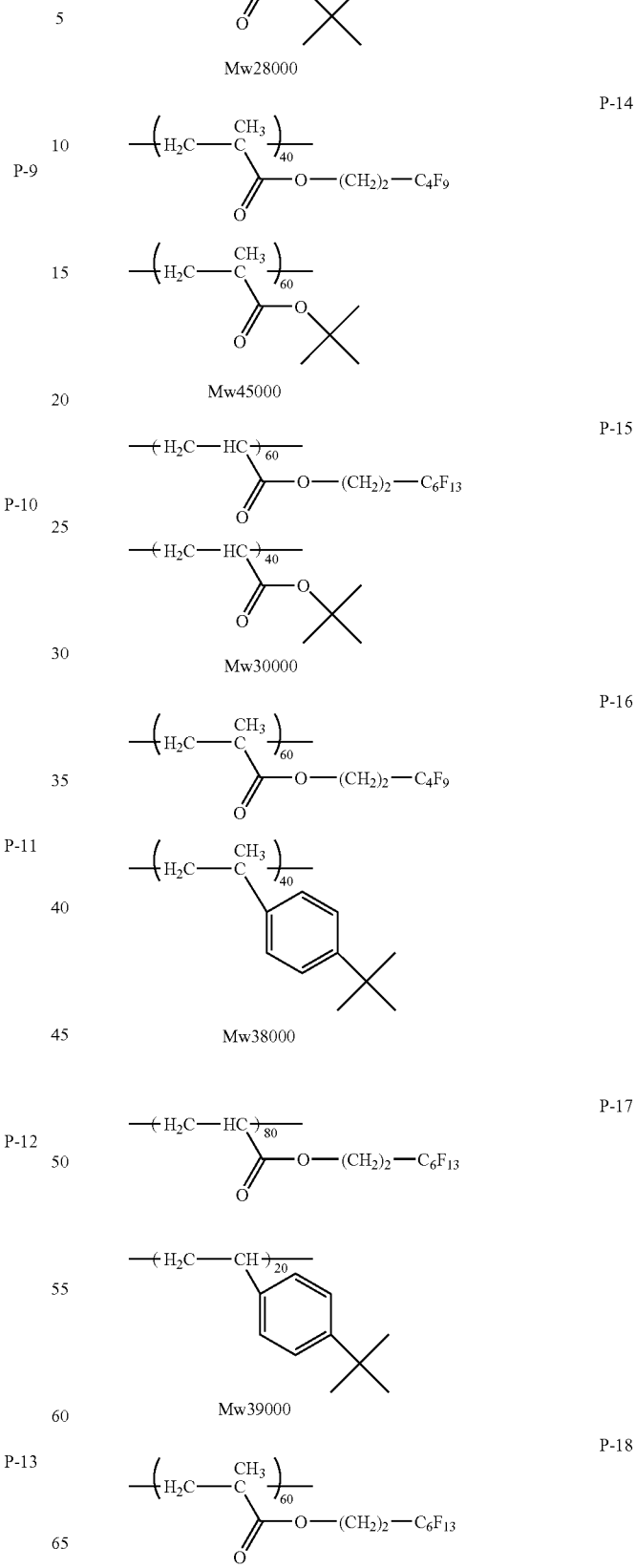

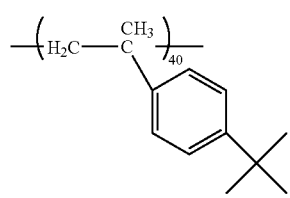
Mw45000
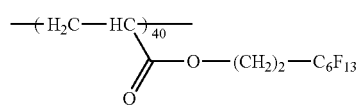
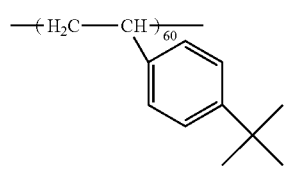
Mw46000
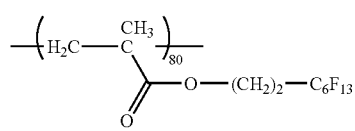
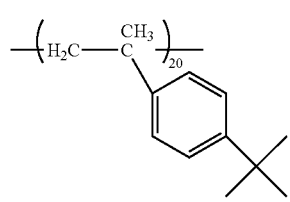
Mw28000
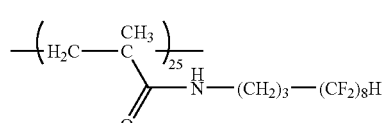
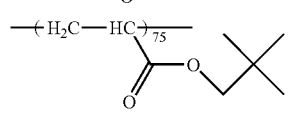
Mw48000
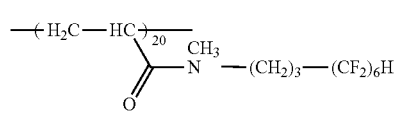
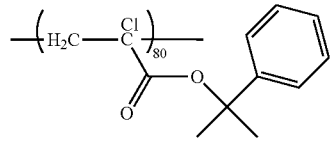
Mw39000
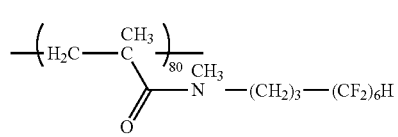
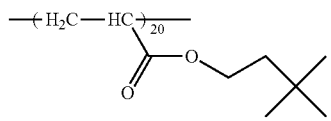
Mw45000
P-19
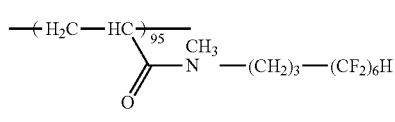
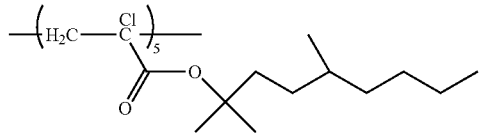
Mw28000
P-20
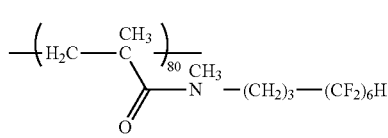
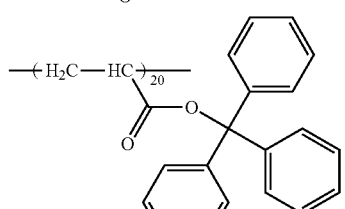
Mw29000
P-21
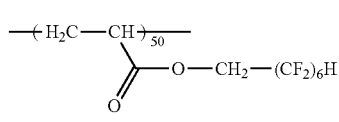
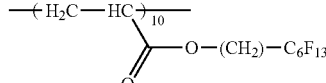
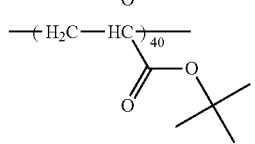
Mw30000
P-22
P-23
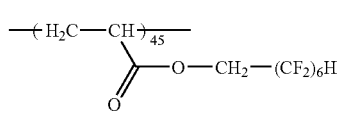
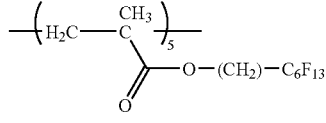
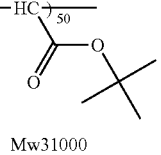
Mw31000
P-24
P-25
P-26
P-27

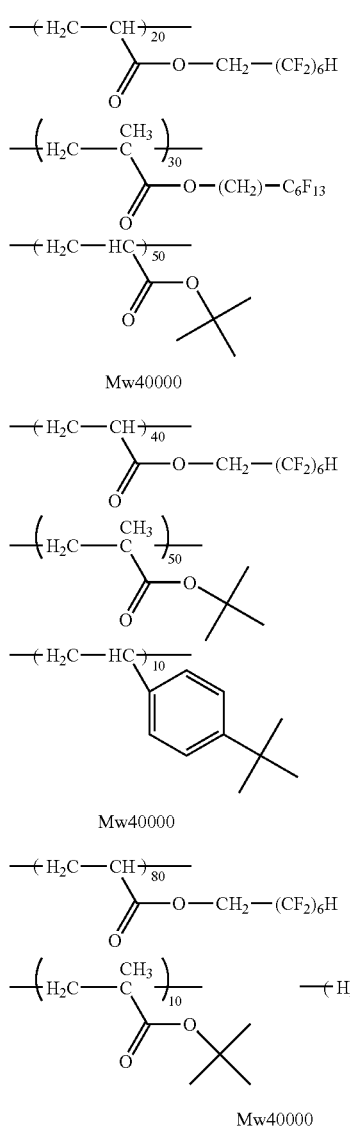

The present coating composition contains at least any of the fluoropolymers as illustrated above.

The amount of the fluoropolymers added is preferably from 0.001 mass % to 5.0 mass %, far preferably from 0.01 mass % to 1.0 mass %, based on the composition.

In addition, the proportion of fluorine atoms contained in the fluoropolymers to the composition is preferably from 0.0003 mass % to 3.0 mass %, far preferably from 0.003 mass % to 0.6 mass %.

In view of improvements in surface conditions, it is appropriate that the coating composition have a water content of 30 mass % or less, preferably 10 mass % or less.

The present coating composition can contain ingredients required according to the intended uses, such as a binder, an inorganic filler and a dispersion stabilizer, and can be made into an optical film by being coated on a transparent support described hereinafter. One or more kinds of coating compositions can be coated on a support to form one or more functional layers, from which an antireflective film, a polarizing plate or the like can be made. The present coating compositions can be preferably utilized for, e.g., hard coating layers, medium refractive index layers, high refractive index layers and low refractive index layers in antireflective films mentioned below, far preferably utilized for hard coating layers and high refractive index layers.

[Layer Structure of Antireflective Film]

FIG. 1 is a schematic cross-sectional diagram showing an example of the layer structure of an antireflective film relating to the invention. The antireflective film has a layer structure that a transparent support (1), a hard coating layer (2), a medium refractive index layer (3), a high refractive index layer (4) and a low refractive index layer are arranged in the order described.

Figure 2:
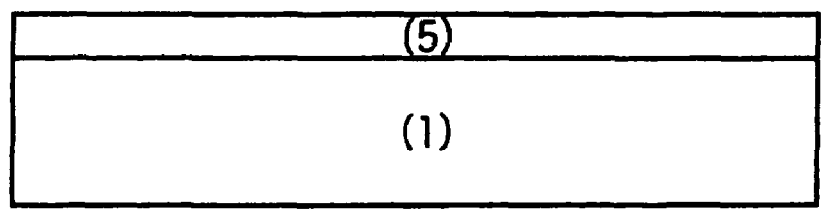
FIG. 2 is a schematic cross-sectional diagram showing another example of layer structures of antireflective films relating to the invention.
Figure 3:
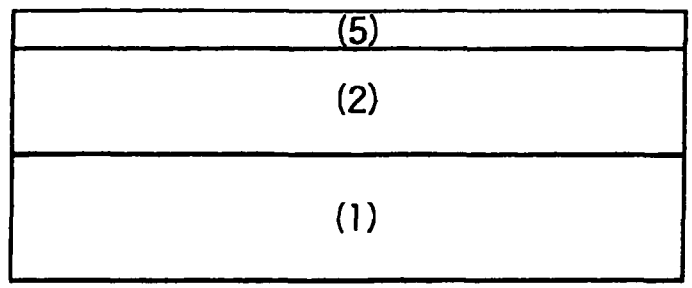
FIG. 3 is a schematic cross-sectional diagram showing still another example of layer structures of antireflective films relating to the invention.

Alternatively, as shown in FIG. 2 and FIG. 3, laminate made by superposing a low refractive index layer (5) as a refractive index layer on a transparent support (1) or a hard coating layer (2) coated on a transparent support (1) can be used suitably as an antireflective film.

Figure 4:
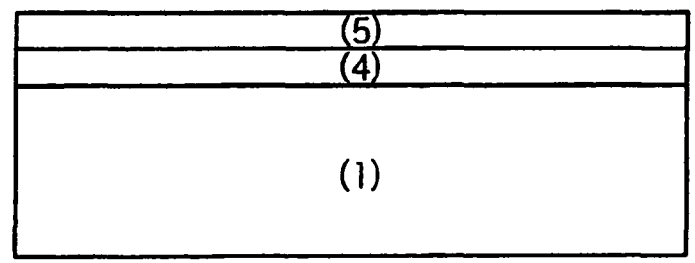
FIG. 4 is a schematic cross-sectional diagram showing a further example of layer structures of antireflective films relating to the invention.
Figure 5:
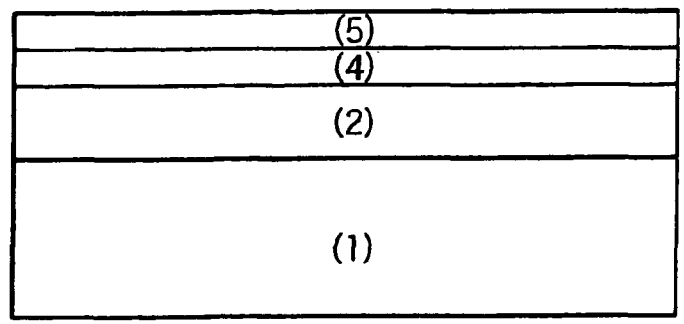
FIG. 5 is a schematic cross-sectional diagram showing still a further example of layer structures of antireflective films relating to the invention.

As shown in FIG. 4 and FIG. 5, laminate made by further superposing a high refractive index layer (4) and a low refractive index layer (5) on a transparent support (1) or a hard coating layer (2) coated on a transparent support (1) can also be used suitably as an antireflective film.

Figure 6:
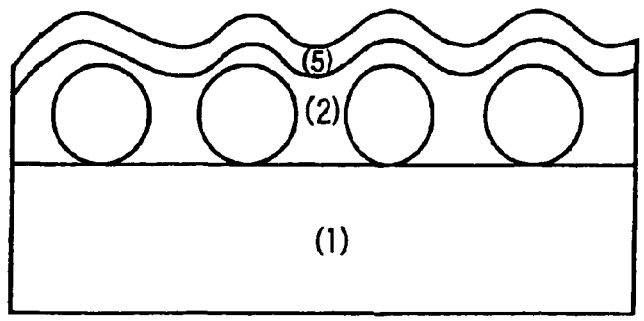
FIG. 6 is a schematic cross-sectional diagram showing an example of layer structures of antireflective films relating to the invention and emphasizing the aspect of an antiglare property.
Figure 7:
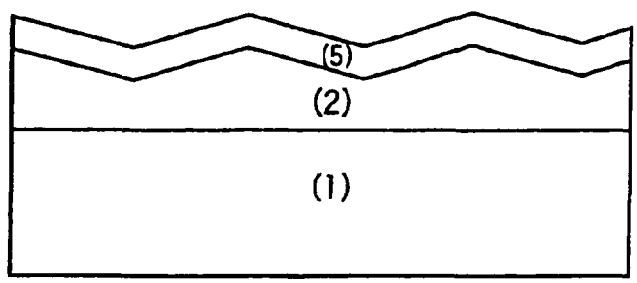
FIG. 7 is a schematic cross-sectional diagram showing another example of layer structures of antireflective films relating to the invention and emphasizing the aspect of an antiglare property.

The hard coating layer (2) may have an antiglare property. The antiglare property may be yielded by dispersion of matting particles as shown in FIG. 6 or by shapes given to the surface through, e.g., an embossing process as shown in FIG. 7.

[Descriptions of Ingredients in Each Layer]

[Base Film (Support)]

Plastic film is suitable for use as a transparent support used in an antireflective film according to the invention. Examples of a material for plastic film include cellulose esters (such as triacetyl cellulose, diacetyl cellulose, propionyl cellulose, butyryl cellulose, acetyl propionyl cellulose and nitrocellulose), polyamide, polycarbonate, polyesters (such as polyethylene terephthalate, polyethylene naphthalate, poly-1,4-cyclohexanedimethylene terephthalate, polyethylene-1,2-diphenoxyethane-4,4'-dicarboxylate and polybutylene terephthalate), polystyrenes (such as syndiotactic polystyrene), polyolefins (such as polypropylene, polyethylene and polyethylpentene), polysulfone, polyether sulfone, polyarylate, polyether imide, polymethyl methacrylate and polyether ketone. When the present antireflective film is utilized as one of surface protective films provided on a polarizing plate specifically for use in liquid crystal display devices, organic EL display devices and the like, the use of triacetyl cellulose is preferred. As triacetyl cellulose films, those having been known for some time, such as TAC-TD80U (a product of Fuji Photo Film Co., Ltd.), and the triacetyl cellulose film disclosed in Journal of Technical Disclosure No. 2001-1745 are suitably used. On the other hand, when the present antireflective film and a glass substrate are bonded together for use in flat CRTs and PDPs, the use of polyethylene terephthalate or polyethylene naphthalate is preferred. The light transmittance of a transparent support is preferably 80% or above, far preferably 86% or above. The haze of a transparent support is preferably 2.0% or below, far preferably 1.0% or below. The refractive index of a transparent support is preferably from 1.4 to 1.7. The thickness of a transparent support for use in the invention is preferably from 30 to 150 μm, far preferably from 40 to 120 μm.

[Hard Coating Layer]

Hard coating layers usable in the invention are described below.

A hard coating layer includes a binder for imparting a property as a hard coating to the layer, matting particles for imparting an antiglare property to the layer, and additives such as an inorganic filler for enhancing a refractive index, avoiding cross-link shrinkage and increasing strength, an initiator for initiating reaction, a surfactant, a thixotropic agent and an antistatic agent.

The binder is preferably a polymer having as a main chain a saturated hydrocarbon chain or a polyether chain, far preferably a polymer having as a main chain a saturated hydrocarbon chain.

In addition, it is preferable that the binder polymer has a cross-linked structure. As the binder polymer having as a main chain a saturated hydrocarbon chain, a polymer of ethylenic unsaturated monomers are suitable. The binder polymer having not only a saturated hydrocarbon chain as a main chain but also a cross-linked structure is preferably a (co) polymer of monomers having two or more ethylenic unsaturated groups per molecule.

For enhancement of a refractive index, it is appropriate that such a monomer contain in its structure an aromatic ring or at least one atom chosen from halogen atoms other than fluorine, a sulfur atom, a phosphorus atom or a nitrogen atom.

Examples of a monomer having two or more ethylenic unsaturated groups include esters of polyhydric alcohols and (meth)acrylic acid (such as ethylene glycol di(meth)acrylate, 1,4-cyclohexane diacrylate, pentaerythritol tetra(meth)acrylate, pentaerythritol tri(meth)acrylate, trimethylolpropane tri (meth)acrylate, trimethylolethane tri(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid 2-acryloylethyl ester and 1,4-divinylcyclohexanone), vinyl sulfones (such as divinyl sulfone), acrylamides (such as methylenebisacrylamide) and methacrylamides. These monomers may be used as combinations of two or more thereof.

Examples of a monomer with a high refractive index include bis(4-methacryloylthiophenyl)sulfide, vinylnaphthalene, vinyl phenyl sulfide and 4-methacryloxyphenyl-4'-methoxyphenylthioether. These monomers may also be used as combinations of two or more thereof.

Polymerization of those monomers having ethylenic unsaturated groups can be performed by application of ionizing radiation or heat in the presence of a photo-initiator or thermo-initiator for radical polymerization.

Accordingly, an antireflective film can be formed by preparing a coating solution containing monomers having ethylenic unsaturated groups, a photo-initiator or thermo-initiator for radical polymerization, matting particles and an inorganic filler, applying a coating of the solution to the surface of a transparent support, and then curing the coating by polymerization reaction under irradiation with ionizing radiation or heating.

Examples of a radical photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds. Examples of acetophenones include 2,2-diethoxyacetophenone, p-dimethylacetophenone, 1-hydroxydimethylphenylketone, 1-hydroxycyclohexylphenylketone, 2-methyl-4-methylthio-2-morpholinopropiophenone and 2-benzyl-2-dimethylamino-1-(4-morpholinophenyl)-butanone. Examples of benzoins include benzenesulfonic acid ester of benzoin, toluenesulfonic acid ester of benzoin, methyl ether of benzoin, ethyl ether of benzoin and isopropyl ether of benzoin. Examples of benzophenones include benzophenone, 2,4-dichlorobenzophenone, 4,4-dichlorobenzophenone and p-chlorobenzophenone. Examples of phosphine oxides include 2,4,6-trimethylbenzoyldiphenylphosphine oxide.

Various examples of radical photopolymerization initiators are also described in Saishin UV Koka Gijutsu (publisher: Kazuhiro Takasusuki, publishing office: K.K. Gijutu Joho Kyokai, issued in 1991), and they are useful in the invention, too.

Suitable examples of commercially available radical photopolymerization initiators of photo-cleavage type include Irugacure 651, 184 and 907 (trade names) produced by Nihon Ciba-Geigy K.K.

The amount of a photopolymerization initiator used is preferably from 0.1 to 15 parts by mass, far preferably from 1 to 10 parts by mass, per 100 parts by mass of multifunctional monomers.

In addition to a photopolymerization initiator, a photosensitizer may be used. Examples of such a photosensitizer include n-butylamine, triethylamine, tri-n-butylphosphine, Michler's ketone and thioxanthone.

As the thermo-initiator for radical polymerization, an organic or inorganic peroxide, an organic azo or diazo compound, or the like can be used.

Examples of such an organic peroxide include benzoyl peroxide, halogenobenzoyl peroxide, lauroyl peroxide, acetyl peroxide, dibutyl peroxide, cumene hydroperoxide and butyl hydroperoxide, examples of such an inorganic peroxide include hydrogen peroxide, ammonium persulfate and potassium persulfate, examples of such an azo compound include 2-azobis-isobutyronitrile, 2-azo-bis-propionitrile and 2-azo-bis-cyclohexanedinitrile, and examples of such a diazo compound include diazoaminobenzene and p-nitrobenzene diazonium.

The polymers having polyether chains as their main chains are preferably ring scission polymers of multifunctional epoxy compounds. The ring scission polymerization of multifunctional epoxy compounds can be performed by application of ionizing radiation or heat in the presence of a photo-acid generator or a thermo-acid generator.

Accordingly, an antireflective film can be formed by preparing a coating solution containing a multifunctional epoxy compound, a photo-acid generator or thermo-acid generator, matting particles and an inorganic filler, applying a coating of the solution to the surface of a transparent support, and then curing the coating by polymerization reaction under irradiation with ionizing radiation or heating.

The cross-linked structure may be introduced into a binder polymer in a manner that cross-linkable functional groups are introduced into the polymer by use of a cross-linking group-containing monomer in place of or in addition to a monomer having two or more ethylenic unsaturated groups and made to undergo reaction.

Examples of cross-linkable functional groups usable therein include an isocyanate group, an epoxy group, an aziridine group, an oxazoline group, an aldehyde group, a carbonyl group, a hydrazine group, a carboxyl group, a methylol group and an active methylene group. Vinylsulfonic acid, acid anhydrides, cyanoacrylate derivatives, melamine, etherified methylols, esters and urethanes, and metal alkoxides, such as tetramethoxysilane, can also be utilized as monomers for introduction of cross-linked structures. Functional groups capable of exhibiting a cross-linking property as a result of decomposition reaction, such as a blocked isocyanate group, may also be used. In other words, the cross-linkable groups used in the invention may be groups exhibiting reactivity as a result of decomposition even though their reaction does not occur immediately.

The binder polymer having those cross-linkable functional groups can form a cross-linked structure by heating after they are applied.

In the hard coating layer, matting particles, such as inorganic compound particles or resin particles, having an average diameter greater than that of filler particles, specifically ranging from 1 to 10 µm, preferably from 1.5 to 7.0 µm, are incorporated for the purpose of imparting an antiglare property.

Suitable examples of the matting particles include inorganic compound particles, such as silica particles or $TiO_2$ particles, and resin particles such as cross-linked acrylic particles, cross-linked styrene particles, melamine resin particles or benzoguanamine resin particles. Of these particles, cross-linked acrylic particles, such as cross-linked polymethyl methacrylate particles, and cross-linked styrene particles are preferred over the others.

In addition, two or more types of matting agents differing in particle sizes may be used together. It is possible to impart antiglare property by use of a matting agent having greater particle sizes and another optical property by use of a matting agent having smaller particle sizes. For instance, when an antireflective film is stuck on a high-definition display having a pixel count of 133 ppi or above, an optical qauality referred to as "glitter" is required. The glitter is brought about by loss of uniformity in surface quality, which results from enlargement or reduction of picture elements by microscopic asperities subtly present on the film surface, so it can be greatly improved by using a matting agent whose particle sizes are 5 to 50% smaller than those of a matting agent used for imparting antiglare property.

Furthermore, it is preferable that the matting particles have a monodisperse distribution with respect to their particle diameters, and the closer to identical all the particles diameters the better. When particles having diameters, say, at least 20% greater than their average diameter are defined as coarse particles, the number of these coarse particles is preferably 1% or less, preferably 0.1% or less, far preferably 0.01% or less, of the total number of the particles. The matting particles having such a particle diameter distribution can be obtained by classification after usual synthesis reaction, and when the number of classifications is increased and the classifications are intensified in extent, the matting agent obtained can have a more suitable particle diameter distribution.

In addition to the matting particles, it is advantageous for enhancement of refractive index that the hard coating layer contains an inorganic filler including the oxide of at least one metal selected from titanium, zirconium, aluminum, indium, zinc, tin or antimony, having an average particle diameter of 0.5 nm to 0.2 µm, preferably from 1 nm to 0.1 µm, far preferably from 1 nm to 0.06 µm.

In the hard coating layer using matting particles with a high refractive index, on the other hand, it is also advantageous for widening a difference of refractive index between the layer and the matting particles that silicon oxide is used in order to keep the refractive index of the layer at a little small value. The suitable particle diameter range of silicon oxide is the same as the foregoing inorganic filler has.

Examples of an inorganic filler usable in the hard coating layer include $TiO_2$, $ZrO_2$, $Al_2O_3$, $In_2O_3$, $ZnO$, $SnO_2$, $Sb_2O_3$, ITO (Indium-tin oxide), and $SiO_2$. Of these fillers, $TiO_2$ and $ZrO_2$ are preferred over the others in point of increase in refractive index.

It is also preferable that the surface of the inorganic filler undergoes silane coupling treatment or titanate coupling treatment, and it is advantageous to use a surface treatment agent having a functional group capable of reacting with the binder on the filler surface.

The amount of these inorganic fillers added is preferably from 10 to 90%, far preferably from 20 to 80%, particularly preferably from 30 to 75%, of the total mass of the hard coating layer.

Incidentally, such a filler causes no scattering because its particle diameters are sufficiently smaller than wavelengths of light, and the dispersion of such a filler in a binder polymer behaves like an optically uniform material.

The hard coating layer for use in the invention can contain additives, such as a surfactant, a thixotropic agent and antistatic agent, responsive to the functions required thereof. The hard coating layer preferably contains a fluoropolymer according to the invention.

The total refractive index of a binder-inorganic filler mixture in the hard coating layer for use in the invention is preferably from 1.4 to 2.00, par preferably from 1.45 to 1.80. The refractive index can be adjusted to the foregoing range by properly selecting species of binder and inorganic filler to be mixed and a mixing ratio between them. How to select them can be experimentally found in advance.

The thickness of the hard coating layer is preferably from 1 to 15 µm, far preferably from 1.2 to 8 µm.

[High Refractive Index Layer]

The high refractive index layer for use in the invention includes a cured film having a refractive index of 1.55 to 2.40, which is typically formed by coating and curing a curable composition (a composition for the high refractive index layer) containing at least a particulate inorganic compound and a matrix binder (simply referred to as matrix) each having a high refractive index. In the high refractive index layer, a fluorochemical surfactant is preferably incorporated. The refractive index is preferably from 1.65 to 2.30, particularly preferably from 1.80 to 2.00. The refractive index of a high refractive index layer for use in the invention is from 1.55 to 2.40, so the high refractive index layer includes layers commonly called a high refractive index layer and a medium refractive index layer. In the present specification, however, sometimes those layers are generically called high refractive index layers.

[Composition for High Refractive Index Layer]

<Particles with High Refractive Index>

Inorganic fine particles with a high refractive index, which are contained in the high refractive index layer for use in the invention, are preferably those having a refractive index in a range of 1.80 to 2.80 and an average particle diameter of their primary particles in a range of 3 to 150 nm. As far as the refractive index is in the foregoing range, the particles can have sufficient effect on enhancement of a refractive index of the resulting film, and take on no coloration. In addition, as far as the average particle diameter of primary particles is in the foregoing range, the resulting film has a low haze value, great transparency and a high refractive index. The inorganic fine particles preferred in the invention have their refractive index in the range of 1.90 to 2.80, and the average particle diameter of their primary particles is from 3 to 100 nm. And the inorganic fine particles far preferred in the invention are particles having a refractive index of 1.90 to 2.80 and an average primary particle diameter of 5 to 80 nm.

Suitable examples of inorganic fine particles with a high refractive index include particulate inorganic compounds whose main components are oxides, compound oxides or sulfides of Ti, Zr, Ta, In, Nd, Sn, Sb, Zn, La, W, Ce, Nb, V, Sm, Y or/and so on. The term "main component" as used herein refers to the component having the highest content (mass %) of all the contents the components constituting the particles have. The preferred in the invention are particulate oxides or compound oxides containing as each individual main component at least one metal element selected from Ti, Zr, Ta, In or Sn. In the inorganic fine particles used in the invention, a wide variety of elements may be contained. In the cases of tin oxide and indium oxide, incorporation of such an element as Sb, Nb, P, B, In, V or halogen, is favorable for enhancement of conductivity of the particles, and it is most favorable to incorporate antimony oxide in a proportion of about 5 mass % to about 20 mass %.

The preferred in particular are inorganic fine particles predominantly composed of titanium dioxide containing at least one element selected from Co, Zr or Al (hereinafter referred to as "specified oxides", too). Of these elements, Co is preferred over the others. The total content of Co, Al and Zr in titanium dioxide is preferably from 0.05 to 30 mass %, far preferably from 0.1 to 10 mass %, further preferably from 0.2 to 7 mass %, particularly preferably from 0.3 to 5 mass %, infinitely preferably from 0.5 to 3 mass %, on the basis of Ti.

Co, Al and Zr are present in the interior and/or on the surface of inorganic fine particles predominantly composed of titanium oxide. It is preferable that they are present in the interior of inorganic fine particles predominantly composed of titanium oxide, and it is far preferable that they are present both in the interior and on the surface. These specified metal elements may be present in the form of oxides.

As another example of inorganic particles preferred in the invention, mention may be made of fine particles of a compound oxide of titanium element and at least one metal element selected from metal elements capable of imparting a refractive index of 1.95 or above to the resulting oxides (hereinafter abbreviated as "Met", too), wherein the compound oxide is doped with at least one type of metal ion selected from Co ion, Zr ion or Al ion (Sometimes these inorganic fine particles are referred to as "specified compound oxide"). Examples of a metal element suitably used herein for imparting a refractive index of 1.95 or above to the resulting oxide include Ta, Zr, In, Nd, Sb, Sn and Bi. Of these elements, Ta, Zr, Sn and Bi are preferred over the others. The content of metal ions with which a compound oxide is doped is preferably below 25 mass % of the total amount of metals [Ti+Met] constituting the compound oxide from the viewpoint of refractive-index retention. This content is far preferably from 0.05 to 10 mass %, further preferably from 0.1 to 5 mass %, especially preferably from 0.3 to 3 mass %.

The doped metal ions may be present in the form of metal ions or metal atoms, and they may lie in any part of particulate compound oxide, from on the surface to in the interior, as appropriate. The doped metal ions are preferably present both on the surface and in the interior.

The inorganic fine particles used in the invention preferably have a crystalline structure or an amorphous structure. It is preferable that the crystalline structure is predominantly composed of a rutile structure, a rutile/anatase mixed structure or an anatase structure, especially a rutile structure. By having such a makeup, it becomes possible for inorganic fine particles of the specified oxide or the specified compound oxide in the invention to attain a refractive index of 1.90 to 2.80, preferably 2.10 to 2.80, far preferably 2.20 to 2.80. Moreover, it becomes possible to suppress photocatalytic activity of titanium oxide, thereby resulting in considerable improvement in weather resistance of the high refractive index layer for use in the invention.

As methods for doping of the specified metal elements or metal ions, heretofore known methods can be used. For instance, the doping can be carried out according to the methods disclosed in JP-A-5-330825, JP-A-11-263620, JP-T-11-512336 (the term "JP-T" as used herein means a published Japanese translation of a PCT patent application) and EP-A-0335773, and the ion implantation methods (e.g., Ion Beam Oyo Gijutsu, edited by Shun-ichi Gonda, Junzo Ishikawa & Eiji Kamijo, published by CMC Publishing Co., Ltd. in 1989; Yasushi Aoki, Hyomen Kagaku, vol. 18, No. 5, p. 262 (1998); and Masakazu Anpo et al., Hyomen Kagaku, vol. 20, No. 2, p. 60 (1999)).

The inorganic fine particles used in the invention may undergo surface treatment. The surface treatment performs reforming of the inorganic fine particles' surfaces by use of an inorganic compound and/or an organic compound, and thereby wettability adjustment of the inorganic particles' surfaces can be made to result in improvements in fine granulation suitability in organic solvents and dispersibility and dispersion stability in a composition for forming a high refractive index layer. Examples of a compound capable of reforming particle surfaces through physicochemical adsorption to the particle surfaces include silicon-containing inorganic compounds (e.g., $SiO_2$), aluminum-containing inorganic compounds (e.g., $Al_2O_3$, $Al(OH)_3$), cobalt-containing inorganic compounds (e.g., $CoO_2$, $Co_2O_3$, $Co_3O_4$), zirconium-containing inorganic compounds (e.g., $ZrO_2$, $Zr(OH)_4$) and iron-containing inorganic compounds (e.g., $Fe_2O_3$).

Examples of an organic compound used for the surface treatment include compounds heretofore known as surface reforming agents for inorganic fillers, such as metal oxides and inorganic pigments. For instance, descriptions of such surface reforming agents can be found in Ganryo Bunsan Anteika to Hyomen Shori Gijutsu Hyoka, Chap. 1, Gijutsu Joho Kyokai (2001).

More specifically, organic compounds with polar groups having affinity for the inorganic particles' surfaces can be given as examples of the surface reforming agent. In such organic compounds are included the compounds termed coupling compounds. Examples of a polar group having affinity for the inorganic particles' surfaces include a carboxyl group, a phosphono group, a hydroxyl group, a mercapto group, a cyclic acid anhydride group and an amino group, and compounds having in each molecule at least one of these groups are preferred. Examples of such compounds include long-chain aliphatic carboxylic acids (such as stearic acid, lauric acid, oleic acid, linoleic acid and linolenic acid), polyol compounds (such as pentaerythritol tiracrylate, dipentaerythritol pentaacrylate, and ECH(epichlorohydrin)-modified glycerol triacrylate), phosphono group-containing compounds (such as EO(ethylene oxide)-modified phosphonotriacrylate) and alkanolamines (such as ethylenediamine-EO(5 moles) adduct).

As examples of coupling compounds, heretofore known organometallic compounds can be given, and therein are included silane coupling agents, titanate coupling agents and aluminate coupling agents. Of these coupling agents, silane coupling agents are preferred over the others. Examples of silane coupling agents include the compounds disclosed in JP-A-2002-9908, and JP-A-2001-310423, par. Nos. [0011]-[0015].

In those surface treatments, two or more of the compounds as recited above can be used in combination.

As the particulate oxides usable in the invention, fine particles having a core/shell structure wherein a shell of an inorganic compound is formed on a core of the inorganic fine particles as described above are also suitable. As a material of the shell, an oxide of at least one element selected from Al, Si or Zr is suitable. Such particulate oxides are found, e.g., in the descriptions in JP-A-2001-166104.

The inorganic fine particles used in the invention have no particular restriction as to their shapes, but their preferred shapes are a shape of rice grain, a spherical shape, a cubic shape, a spindle-like shape or an indefinite shape. In the invention, though only one kind of the inorganic fine particles as recited above may be used, two or more kinds can also be used in combination.

(Dispersant)

For utilizing the inorganic particles used in the invention as the specified superfine stable particles, it is preferable that the inorganic particles are used in combination with a dispersant. As the dispersant, a low-molecular or high-molecular compound with a polar group having affinity for surfaces of the inorganic fine particles is suitable.

Examples of such a polar group include a hydroxyl group, a mercapto group, a carboxyl group, a sulfo group, a phosphono group, an oxyphosphono group, —P(=O)($R_1$)(OH) groups, —O—P(=O)($R_1$)(OH) groups, amido groups (—CONH$R_2$ and —SO$_2$NH$R_2$), groups containing cyclic acid anhydrides, amino groups, and quaternary ammonium groups.

Therein, $R_1$ represents a 1-18C hydrocarbon group (such as a methyl group, an ethyl group, a propyl group, a butyl group, a hexyl group, an octyl group, a decyl group, a dodecyl group, an octadecyl group, a chloroethyl group, a methoxyethyl group, a cyanoethyl group, a benzyl group, a methylbenzyl group, a phenethyl group or a cyclohexyl group). $R_2$ represents a hydrogen atom or the same group as $R_1$ represents.

Of the polar groups recited above, the groups having dissociable protons may be salts thereof. The foregoing amino groups or quaternary ammonium groups may be any of primary, secondary and tertiary amino groups, preferably tertiary amino groups, or quaternary ammonium groups. The groups attached to the nitrogen atoms in tertiary amino groups or quaternary ammonium groups are preferably 1-12C hydrocarbon groups (e.g., the same groups as the foregoing $R_1$ can represent). In addition, the tertiary amino groups may be amino groups forming nitrogen-containing rings (such as a piperidine ring, a morpholine ring, a piperazine ring and a pyridine ring), and the quaternary ammonium groups may be quaternary ammonium groups having those cyclic amino groups. As the hydrocarbon groups, 1-6C alkyl groups in particular are preferred.

As the polar groups of the dispersants relating to the invention, anionic groups having pKa of 7 or above or salts thereof are preferred. Of these groups, a carboxyl group, a sulfo group, a phosphono group, an oxyphosphono group and dissociable salts thereof are especially preferred.

It is advantageous that the dispersant further contains a cross-linkable or polymerizable functional group. Examples of such a cross-linkable or polymerizable functional group include ethylenic unsaturated groups which can undergo addition reaction and polymerization reaction induced by radical species (e.g., a (meth)acryloyl group, an allyl group, a styryl group, a vinyloxycarbonyl group, a vinyloxy group), cationic polymerizable groups (e.g., an epoxy group, a thioepoxy group, an oxetanyl group, a vinyloxy group, spiroorthoester group) and polycondensation reactive groups (e.g., a hydrolytic silyl group and the like, an N-methylol group), preferably ethylenic unsaturated groups, an epoxy group and a hydrolytic silyl group.

More specifically, the compounds disclosed, e.g., in JP-A-11-153703, U.S. Pat. No. 6,210,858B1, JP-A-2002-2776069, and JP-A-2001-310423, par. Nos. [0013]-[0015], are examples of those dispersants.

It is also preferable that the dispersants usable in the invention are polymeric dispersants, especially polymeric dispersants having anionic groups and cross-linkable or polymerizable functional groups. Examples of these functional groups include the same ones as recited hereinbefore.

It is appropriate that the dispersant as recited above be used in an amount of 1 to 100 mass %, preferably 3 to 50 mass %, particularly preferably 5 to 40 mass %, based on the inorganic fine particles. And two or more kinds of the dispersants may be used in combination.

(Dispersion Medium)

A dispersion medium applicable to wet dispersion of inorganic fine particles can be chosen properly from water or organic solvents, and the dispersion medium chosen is preferably a liquid having a boiling point of 50° C. or above, far preferably an organic solvent having its boiling point in the range of 60° C. to 180° C. The percentage of the dispersion medium used is preferably from 5 to 50 mass %, far preferably from 10 to 30 mass %, based on the total dispersion composition including inorganic fine particles and a dispersant. In such a range, dispersion can proceed with ease, and the disperse matter obtained can have its viscosity in the range where satisfactory workability is ensured.

Examples of such a dispersion medium include alcohol compounds, ketones, esters, amides, ethers, ether esters, hydrocarbons, and halogenated hydrocarbons. More specifically, alcohol (e.g., methanol, ethanol, propanol, butanol, benzyl alcohol, ethylene glycol, propylene glycol, ethylene glycol monoacetate), ketone (e.g., methyl ethyl ketone, methyl isobutyl ketone, cyclohexanone, methylcyclohexanone), ester (e.g., methyl acetate, ethyl acetate, propyl acetate, butyl acetate, ethyl formate, propyl formate, butyl formate, ethyl lactate), aliphatic hydrocarbon (e.g., hexane, cyclohexane), halogenated hydrocarbon (e.g., methylchloroform), aromatic hydrocarbon (e.g., benzene, toluene, xylene), amide (e.g., dimethylformamide, dimethylacetamide, N-methylpyrrolidone), ether (e.g., dioxane, tetrahydrofuran, ethylene glycol dimethyl ether, propylene glycol dimethyl ether) and ether alcohol (e.g., 1-methoxy-2-propanol, ethyl cellosolve, methyl carbinol) are dispersion media usable in the invention. These dispersion media may be used alone or as mixtures of two or more thereof. Of those dispersion media, toluene, xylene, methyl ethyl ketone, methyl isobutyl ketone, cyclohexanone and butanol are preferred over the others. In addition, coating solvents mainly constituted of ketone solvents (e.g., methyl ethyl ketone, methyl isobutyl ketone, cyclohexanone) can also be used to advantage.

(Making Inorganic Fine Particles into Superfine Particles)

By rendering a curable coating composition for forming a high refractive index layer used in the invention as a composition in which inorganic superfine particles having an average diameter of 100 nm or below are dispersed, the liquid stability of the composition can be enhanced, and it becomes possible for inorganic fine particles to be present as superfine particles dispersed homogeneously in the matrix of the cured film formed from the curable coating composition; as a result, formation of transparent film with a high refractive index and uniform optical quality is attained. As to the sizes of superfine particles present in the matrix of the cured film, it is appropriate that the average particle diameter be in the range of 3 to 100 nm, preferably 5 to 100 nm, especially preferably 10 to 80 nm.

Moreover, it is advantageous that the inorganic fine particles are free of coarse particles having their average diameter in a range of 500 nm or above, particularly 300 nm or above. Thus, the surface of the cured film can be formed into the above-specified shape of microscopic asperities.

In order to achieve a state that the inorganic substance particles with the high refractive index as specified above are dispersed in sizes of superfine particles without including the coarse particles falling within the foregoing range, a wet dispersion method in which media having an average particle diameter, say, smaller than 0.8 mm are used together with the dispersant as recited above can be adopted.

Examples of a wet dispersing machine usable therein include heretofore known dispersing machines, such as a sand grinder mill (e.g., a bead mill with pins), a DYNO-MILL, a high-speed impeller mill, a pebble mill, a roller mill, an attrition mill and a colloid mill. In order to disperse the particulate oxide for use in the invention in a state of superfine particles, a sand grinder mill, a DYNO-MILL and a high-speed impeller mill in particular are used to advantage.

The average particle diameter of media used in combination with the dispersing machine as recited above is below 0.8 mm, and use of the media having their particle diameters in such a range allows the inorganic fine particles to have diameters smaller than 100 nm, and besides, it permits formation of superfine particles uniform in particle diameter. The average particle diameter of the media is preferably 0.5 mm or below, far preferably from 0.05 mm to 0.3 mm.

As the media used in wet dispersion, beads are preferred. Examples of such beads include zirconia beads, glass beads, ceramic beads and steel beads. Of these beads, zirconia beads ranging in size from 0.05 to 0.2 mm are especially favored from the viewpoints of durability, including high resistance to breaks occurring in beads during dispersion, and efficiency in making superfine particles. The dispersion temperature in a dispersion process is preferably from 20° C. to 60° C., far preferably from 25° C. to 45° C. When the inorganic fine particles are dispersed in a state of superfine particles at a temperature falling within the foregoing range, the particles dispersed cause neither re-coagulation nor precipitation. As a reason for this, it can be thought that, since adsorption of a dispersant to particles of an inorganic compound is performed properly, lack of dispersion stability due to desorption of the dispersant from the particles under ordinary temperature is prevented from occurring.

By use of the dispersion method as mentioned above, it is possible to favorably form a high refractive index film having a uniform refractive index and excellent film strength, adhesion to adjacent layers and so on without attended with loss of its transparency.

Prior to the wet dispersion process, preliminary dispersion treatment may further been carried out. Examples of a dispersing machine usable in the preliminary dispersion treatment include a ball mill, a three-rod roll mill, a kneader and an extruder.

In order that the particles dispersed in a dispersion meet the foregoing ranges concerning the average particle diameter and the monodisperse characteristic of particle diameters, it is also preferable that a filter element for performing precision filtration is further arranged in separation treatment of beads for the purpose of removing coarse aggregates in the dispersion. As the filter element for precision filtration, materials permitting filtration of particles measuring 25 μm or below in size are suitable. The filter element for precision filtration has no particular restriction as to its type so long as it has the aforesaid performance, but it may be either a filament type, or a felt type, or a mesh type. The filter element for precision filtration of the dispersion has no particular restriction on its material so long as the filter element has the foregoing performance and no adverse effect on the resulting coating solution, but more specifically, stainless steel, polyethylene, polypropylene or nylon is usable as material of the filter element.

(Matrix of High Refractive Index layer)

The high refractive index layer contains at least inorganic superfine particles with a high refractive index and a matrix.

In accordance with a preferred embodiment of the invention, the matrix of the high refractive index layer is formed by coating and subsequent curing of a high refractive index layer forming composition containing at least either (i) an organic binder, or (ii) a hydrolysis product of a hydrolysable functional group-containing organometallic compound and a partial condensate of the hydrolysis product.

(i) Organic Binder

Examples of an organic binder include binders formed from:

(a) heretofore known thermoplastic resins,
(b) combinations of heretofore known reactive cure resins with curing agents, or
(c) combinations of binder precursors (e.g., curable multifunctional monomers and oligomers as recited hereinafter) with polymerization initiators.

A coating composition for forming the high refractive index layer is prepared from a dispersion containing the binder-forming ingredient (a), (b) or (c), fine particles of a compound oxide with a high refractive index and a dispersant. The coating composition is formed into a layer by application to a transparent support, and cured in accordance with a method appropriate to the binder-forming ingredient used, thereby forming the high refractive index layer. The curing method is chosen as appropriate in response to the kind of the binder ingredient used. For instance, there is a method of causing cross-linking or polymerization reaction of a curable compound (e.g., a multifunctional monomer, a multifunctional oligomer) by at least either heating or irradiation with light. What is particularly preferred is the method of forming a binder by using the combination (c) and curing the curable compound in the combination (c) through cross-linking or polymerization reaction caused by irradiation with light.

Furthermore, it is preferable that the dispersant contained in a dispersion of fine particles of a compound oxide with a high refractive index is made to undergo cross-linking or polymerization reaction simultaneously with or subsequently to application of the coating composition for forming the high refractive index layer.

The binder in the cured film thus prepared takes a form, e.g., such that an anionic group of the dispersant is incorporated in the binder through the cross-linking or polymerization reaction caused between the dispersant and the curable multifunctional monomer or oligomer as a binder precursor. Since the anionic group has a function of keeping the dispersion state of inorganic fine particles and the cross-linked or polymerized structure imparts a film forming ability to the binder, the binder in the cured film can improve physical strength, chemical resistance and weather resistance of the cured film containing fine particles of inorganic compound with a high refractive index.

Examples of the thermoplastic resins include polystyrene resin, polyester resin, cellulose resin, polyether resin, vinyl chloride resin, vinyl acetate resin, vinyl chloride-vinyl acetate copolymer resin, polyacrylic resin, polymethacrylic resin, polyolefin resin, urethane resin, silicone resin and imide resin.

On the other hand, it is preferable to use the reactive cure resins, namely at least either thermosetting resins or ionizing-radiation cure resins. Examples of thermosetting resins include phenol resin, urea resin, diallylphthalate resin, melamine resin, guanamine resin, unsaturated polyester resin, polyurethane resin, epoxy resin, aminoalkyd resin, melamine-urea cocondensation resin, silicon resin and polysiloxane resin. Examples of ionizing-radiation cure resins include resins having as functional groups at least either radical polymerizable unsaturated groups (e.g., a (meth)acryloyloxy group, a vinyloxy group, a styryl group and a vinyl group) or cationic polymerizable groups (e.g., an epoxy group, a thioepoxy group, a vinyloxy group and an oxetanyl group), such as relatively low molecular-weight polyester resin, polyether resin, (meth)acrylic resin, epoxy resin, urethane resin, alkyd resin, spiro-acetal resin, polybutadiene resin and polythiolpolyene resin.

These reactive cure resins are used after adding thereto on an as needed basis heretofore known compounds including a curing agent, such as a cross-linking agent (e.g., an epoxy compound, a polyisocyanate compound, a polyol compound, a polyamine compound, a melamine compound) or a polymerization initiator (e.g., a UV light initiator, such as an azobis compound, an organic peroxide compound, an organic halogenated compound, an onium salt compound or ketone compound), and a polymerization accelerator (e.g., an organometallic compound, an acidic compound, a basic compound). Examples of these agents include the compounds described, e.g., in Shinzo Yamashita & Tosuke Kaneko, Kakyouzai Handbook, Taiseisha (1981).

As a preferred method for forming a cured binder, the method of forming a cured binder by using the combination (c) and causing the curable compound to undergo cross-linking or polymerization reaction under irradiation with light is mainly described below.

The functional groups in light-curable multifunctional monomers or oligomers may be either radical-polymerizable groups or cation-polymerizable groups.

Examples of radical-polymerizable functional groups include ethylenic unsaturated groups, such as a (meth)acryloyl group, a vinyloxy group, a styryl group and an allyl group. Of these groups, a (meth)acryloyl group is preferred over the others.

The incorporation of a multifunctional monomer having two or more radical-polymerizable groups in each molecule is preferred.

It is preferable that the radical-polymerizable multifunctional monomer is chosen from compounds having at least two terminal ethylenic unsaturated bonds per molecule. The preferred are compounds having 2 to 6 terminal ethylenic unsaturated bonds per molecule. The group of these compounds are widely known in the field of polymer materials, and they can be used in the invention without any particular restrictions. These compounds can have chemical forms, such as monomers, prepolymers including dimers, trimers and oligomers, and mixtures or copolymers thereof.

Examples of the radical-polymerizable monomers include unsaturated carboxylic acids (e.g., acrylic acid, methacrylic acid, itaconic acid, crotonic acid, isocrotonic acid, maleic acid), and esters and amides of these acids, preferably esters formed from unsaturated carboxylic acids and aliphatic polyhydric alcohol compounds and amides formed from unsaturated carboxylic acids and aliphatic polyamine compounds. Furthermore, products of addition reactions between esters or amides of unsaturated carboxylic acids having nucleophilic substituents, such as a hydroxyl group, an amino group and mercapto group, and monofunctional or multifunctional isocyanates or epoxy compounds, and products of dehydrocondensation reactions between those esters or amides and multifunctional carboxylic acids are also used to advantage. In addition, products of reactions between esters or amides of unsaturated carboxylic acids having electrophilic substituents, such as an isocyanate group and an epoxy group, and monofunctional or multifunctional alcohol compounds, amines or thiols are also used to advantage. Alternatively, it is possible to use a group of compounds formed by replacing the unsaturated carboxylic acids in the foregoing reactions with unsaturated phosphonic acids or styrene.

Examples of the aliphatic polyhydric alcohol compounds include alkanediols, alkanetriols, cyclohexanediol, cyclohexanetriol, inositol, cyclohexanedimethanol, pentaerythritol, sorbitol, dipentaerythritol, tripentaerythritol, glycerin and diglycerin. Examples of polymerizable ester compounds (monoesters or polyesters) formed from those aliphatic polyhydric alcohol compounds and unsaturated carboxylic acids include the compounds disclosed, e.g., in JP-A-2001-139663, par. Nos. [0026]-[0027].

Examples of other polymerizable esters suitable for use include vinyl methacrylate, allyl methacrylate, allyl acrylate, the esters of aliphatic alcohol compounds disclosed in JP-B-46-27926, JP-B-51-47334 and JP-A-57-196231, the esters having aromatic skeletons as disclosed in JP-A-2-226149, and the esters having amino groups disclosed in JP-A-1-165613.

Examples of the polymerizable amides formed from aliphatic polyamine compounds and unsaturated carboxylic acids include methylenebis(meth)acrylamide, 1,6-hexamethylenebis(meth)acrylamide, diethylenetriaminetris(meth)acrylamide, xylenebis(meth)acrylamide, and the amides having cyclohexylene structures disclosed in JP-B-54-21726.

In addition to the foregoing compounds, it is also possible to use vinylurethane compounds having two or more polymerizable vinyl groups per molecule (e.g., in JP-B-48-41708), urethane acrylates (e.g., in JP-B-2-16765), urethane compounds having ethylene oxide skeletons (e.g., in JP-B-62-39418), polyester acrylates (e.g., in JP-B-52-30490) and the light-curable monomers and oligomers described in Nippon Secchaku Kyoukai Shi, vol. 20, No. 7, pp. 300-308 (1984).

These radical-polymerizable multifunctional monomers may be used as combinations of two or more thereof.

Next, the cation-polymerizable group-containing compounds usable for formation of binder of the high refractive index layer (hereinafter referred to as "cation-polymerizable compounds" or "cation-polymerizable organic compounds", too) are described.

As the cation-polymerizable compounds for use in the invention, it is possible to utilize compounds capable of causing at least either polymerization reaction or cross-linking reaction when irradiated with active energy beams in the presence of an active energy beam-responsive, cationic polymerization initiator, and typical examples thereof include epoxy compounds, cyclic thioether compounds, cyclic ether compounds, spiro-orthoester compounds and vinyl ether compounds. In the invention, one or more than one of the cation-polymerizable organic compounds recited above may be used.

As to the cation-polymerizable group-containing compounds, the number of cation-polymerizable groups per molecule is preferably from 2 to 10, particularly preferably from 2 to 5. The molecular weight of such compounds is 3,000 or below, preferably from 200 to 2,000, particularly preferably from 400 to 1,500. The molecular weight falling outside such a range is unfavorable because too low molecular weight causes a problem of volatilization during the film formation, while too high molecular weight causes deterioration in compatibility with a composition for the high refractive index layer.

The epoxy compounds include aliphatic and aromatic epoxy compounds.

Examples of an aliphatic epoxy compound include polyglycidyl ether of aliphatic polyhydric alcohol or its alkylene oxide adduct, polyglycidyl ester of an aliphatic long-chain polybasic acid, and homo- or copolymer of glycidyl acrylate or glycidyl methacrylate. Besides these compounds, monoglycidyl ether of aliphatic higher alcohol, glycidyl ester of a higher fatty acid, epoxidized soybean oil, butyl epoxystearate octyl epoxystearate, epoxidized flax seed oil and epoxidized polybutadiene can be given as examples of the epoxy compound. In addition thereto, there can be recited alicyclic epoxy compounds including polyglycidyl ether of polyhydric alcohol having at least one alicyclic ring, and a compound containing cyclohexene oxide, cyclopentene oxide or the like, which is an epoxidation product prepared from a compound containing unsaturated alicyclic ring (e.g., cyclohexene, cyclopentene, dicyclooctene, tricyclodecene) and an appropriate oxidizing agent such as hydrogen peroxide or peracid.

On the other hand, the aromatic epoxy compound can include mono- or polyglycidyl ether of mono- or polyhydric phenol having at least one aromatic nucleus or its alkylene oxide adduct. Examples of such an epoxy compound include the compounds disclosed in JP-A-11-242101, par. Nos. [0084]-[0086], and the compounds disclosed in JP-A-10-158385, par. Nos. [0044]-[0046].

Of these epoxy compounds, aromatic epoxides and alicyclic epoxides are preferred from the viewpoint of rapid-curing property. In the invention, the epoxy compounds may be used alone or as appropriate combinations of two or more thereof.

Examples of a cyclic thioether compounds include the same compounds as recited above for examples of epoxy compounds except that the epoxy rings are replaced with thioepoxy rings.

Examples of a compound containing an oxetanyl group as a cyclic ether include the compounds disclosed in JP-A-2000-239309, par. Nos. [0024]-[0025]. These compounds are preferably used in combination with epoxy group-containing compounds.

Examples of a spiro-orthoester compound include the compounds as disclosed in JP-T-2000-506908.

Examples of a vinylhydrocarbon compound include styrene compounds, alicyclic hydrocarbon compounds having vinyl substituents (e.g., vinylcyclohexane, vinylcycloheptene), the compounds recited above for the radical-polymerizable monomers (or the compounds whose V1 corresponds to —O—), propenyl compounds (described, e.g., in Journal of Polymer Science, Part A: Polymer Chemistry, Vol. 32, 2895 (1994)), alkoxyarene compounds (described, e.g., in Journal of Polymer Science, Part A: Polymer Chemistry, Vol. 33, 2493 (1995)), vinyl compounds (described, e.g., in Journal of Polymer Science, Part A: Polymer Chemistry, Vol. 34, 1015 (1996), and JP-A-2002-29162), and isopropenyl compounds (described, e.g., in Journal of Polymer Science, Part A: Polymer Chemistry, Vol. 34, 2051 (1996)). These compounds may be used as appropriate combinations of two or more thereof.

The multifunctional compounds for use in the invention are preferably compounds containing in each molecule at least one group selected from the radical-polymerizable groups recited above and at least one group selected from the cation-polymerizable groups recited above. Examples of such compounds include the compounds disclosed in JP-A-8-277320, par. Nos. [0031]-[0052], and the compounds disclosed in JP-A-2000-191737, par. No. [0015]. Compounds usable in the invention should not be construed as being limited to those compounds.

It is appropriate that the radical-polymerizable compound and the cation-polymerizable compound be contained in a radical-polymerizable compound/cation-polymerizable compound ratio of 90:10 to 20:80 by mass, preferably 80:20 to 30:70 by mass.

Next, polymerization initiators used in combination with binder precursors in the combination (c) are described in detail.

The polymerization initiators include thermal polymerization initiators and photo polymerization initiators.

The polymerization initiators (L) usable in the invention are compounds capable of generating radicals or acids under at least either irradiation with light or application of heat. The photopolymerization initiators (L) for use in the invention preferably have their maximal absorption wavelengths in a range of 400 nm or below. By use of photopolymerization initiators having their absorption wavelengths in a ultraviolet region, the treatment under white light becomes feasible. Alternatively, it is possible to use compounds having their maximal absorption wavelengths in a near infrared region.

To begin with, radical-generating compounds (L1) are described below in detail.

The radical-generating compounds (L1) suitable for use in the invention refer to the compounds that can generate radicals by application of light and/or heat thereto and initiate or promote polymerization of compounds having polymerizable unsaturated groups.

As to such compounds (L1), it is possible to use compounds appropriately chosen from known polymerization initiators or compounds having bonds small in dissociation energy. Additionally, the radical-generating compounds can be used alone or as combinations of two or more thereof.

Examples of the radical-generating compounds include the heretofore known radical thermal polymerization initiators, such as organic peroxide compounds and azo-type polymerization initiators, and radical photopolymerization initiators, such as amine compounds (disclosed in JP-B-44-20189), organic halogenated compounds, carbonyl compounds, metallocene compounds, hexaarylbiimidazole compounds, organic boric acid compounds and disulfone compounds.

Examples of the organic halogenated compounds include the compounds described in Wakabayashi et al., Bull. Chem. Soc. Japan, 42, 2924 (1969), U.S. Pat. No. 3,905,815, JP-A-63-298339, and M. P. Hutt, Journal of Heterocyclic Chemistry, 1(No. 3) (1970), notably oxazole compounds having trihalomethyl substituents and s-triazine compounds.

Of these compounds, s-triazine derivatives in which at least one mono-, di- or trihalogenated methyl group is bonded to each individual s-triazine ring are preferred over the others.

Other examples of the organic halogenated compounds include the ketones, the sulfides, the sulfones and the nitrogen-containing heterocycles disclosed in JP-A-5-27830, par. Nos. [0039]-[0048].

Examples of the carbonyl compounds include the compounds described in Saishin UV Koka Gijutsu, pp. 60-62 (issued by K.K. Gijutu Joho Kyokai in 1991), JP-A-8-134404, par. Nos. [0015]-[0016], and JP-A-11-217518, par. Nos. [0029]-[0031], more specifically acetophenone compounds, hydroxyacetophenone compounds, benzophenone compounds, thioxane compounds, benzoin compounds including benzoin ethyl ether and benzoin isobutyl ether, benzoate derivatives including ethyl p-dimethylaminobenzoate and ethyl p-diethylaminobenzoate, benzyldimethylketal and acylphosphine oxide.

Examples of the organic peroxide compounds include the compounds disclosed in JP-A-2001-139663, par. No. [0019].

Examples of the metallocene compounds include the diversity of titanocene compounds disclosed in JP-A-2-4705 and JP-A-5-83588, and the iron-arene complexes disclosed in JP-A-1-304453 and JP-A-1-152109.

Examples of the hexaarylbiimidazole compounds include the diversity of compounds disclosed in JP-A-6-29285 and U.S. Pat. Nos. 3,479,185, 4,311,783 and 4,622,286.

Examples of the organic borate compounds include the compounds described as organic borates in Japanese Patent No. 2764769, JP-A-2002-116539, Kunz, Martin, Rad Tech '98. Proceeding Apr. 19-22, 1998, Chicago, and so on. More specifically, the compounds disclosed in JP-A-2002-116539, par. Nos. [0022]-[0027] can be given as examples.

Examples of other organoboron compounds include the organoboron-transition metal coordinated complexes disclosed, e.g., in JP-A-6-348011, JP-A-7-128785, JP-A-7-140589, JP-A-7-306527 and JP-A-7-292014.

Examples of the sulfone compounds include the compounds disclosed in JP-A-5-239015, and examples of the disulfone compounds include the compounds represented by formulae (II) and (III) in JP-A-61-166544.

These radical-generating compounds may be added alone, or they may be used as combinations of different two or more kinds thereof. And they can be added in an amount of 0.1 to 30 mass %, preferably 0.5 to 25 mass %, particularly preferably 1 to 20 mass %, based on the total radical-polymerizable monomers used. In such a range, the composition for the high refractive index layer has no problem with temporal stability and can retain high polymerization capability.

Next, photo-acid generators (L2) usable as photopolymerization initiators (L) are described in detail.

Examples of acid generators (L2) include compounds known as photo initiators for cationic photopolymerization, photodecoloring agents for dyes, photodiscoloring agents or acid generators for use in microresist, and mixtures of two or more thereof.

Other examples of acid generators (L2) include organic halogenated compounds and disulfone compounds. Examples of these organic halogenated compounds and disulfone compounds include the same ones as recited for the radical-generating compounds.

Examples of the onium compounds include diazonium salts, ammonium salts, iminium salts, phosphonium salts, iodonium salts, sulfonium salts, arsonium salts and selenonium salts, and examples of these salts include the compounds disclosed, e.g., in JP-A-2002-29162, par. Nos. [0058]-[0059].

The acid generators (L2) used to particular advantage in the invention are onium salts. Of the onium salts, diazonium salts, iodonium salts, sulfonium salts and iminium salts are preferred over the others from the viewpoints of optical sensitivity to initiation of photopolymerization, material stability of the compounds, and so on.

Concrete examples of onium salts which can be suitably used in the invention include the amylated sulfonium salts disclosed in JP-A-9-268205, par. No. [0035], the diaryliodonium salts and triarylsulfonium salts disclosed in JP-A-2000-71366, par. Nos. [0010]-[0011], the sulfonium salts of thiobenzoic acid S-phenyl esters disclosed in JP-A-2001-288205, and the onium salts disclosed in JP-A-2001-133696, par. Nos. [0030]-[0033].

Other examples of acid generators are the compounds disclosed in JP-A-2002-29162, par. Nos. [0059]-[0062], including organometal/organic halide compounds, the photo-acid generators having o-nitrobenzyl type protective groups and the compounds generating sulfonic acids by photolysis (e.g., iminosulfonate).

These acid generators may be used alone or as combination of two or more thereof. And they can be added in an amount of 0.1 to 20 mass %, preferably 0.5 to 15 mass %, particularly preferably 1 to 10 mass %, based on 100 parts by mass of the total cation-polymerizable monomers used. Such a range of addition amount is suitable from the viewpoints of stability and polymerization reactivity of the composition for the high refractive index layer.

It is preferable that the composition for the high refractive index layer in the invention contains a radical polymerization initiator and a cationic polymerization initiator in proportions of 0.5 to 10 mass % and 1 to 10 mass %, respectively, based on the total mass of radical-polymerizable compounds and cation-polymerizable compounds. And it is far preferable that the radical polymerization initiator and the cationic polymerization initiator are contained in proportions of 1 to 5 mass % and 2 to 6 mass %, respectively.

When polymerization reaction is performed by ultraviolet irradiation, heretofore known ultraviolet spectral sensitizers and chemical sensitizers may be used in the composition for the high refractive index layer in the invention. Examples of such sensitizers include Michler's ketone, amino acids (e.g., glycine) and organic amines (e.g., butylamine, dibutylamine).

When polymerization reaction is performed by near-infrared irradiation instead of ultraviolet irradiation, the use of a near-infrared spectral sensitizer is appropriate.

The near-infrared spectral sensitizer used may be a light absorbing substance having its absorption band in at least part of the wavelength region of 700 nm or above, and the light absorbing substance is preferably a compound having a molecular extinction coefficient of 10,000 or above. Furthermore, it is advantageous for the compound to have absorption in the region of 750 nm to 1,400 nm and a molecular extinction coefficient of 20,000 or above. In addition, it is more advantageous for the compound to have a absorption trough in the visible region of 420 nm to 700 nm and to be optically transparent. As the near-infrared spectral sensitizer, it is possible to use a wide variety of pigments and dyes known as near-infrared absorbing pigments and near-infrared absorbing dyes. Of such pigments and dyes, heretofore known near-infrared absorbents are preferably used.

Dyes usable as near-infrared spectral sensitizers include commercially available dyes, and the dyes mentioned in literature (e.g., Kagaku to Kogyo, pp. 45-51, issued in May 1986, entitled "Kin-sekigai Kyushu Shikiso", 90-Nendai Kinousei Shikiso no Kaihatsu to Shijo Doko, chap. 2, par. 2.3, CMC (1990), Tokushu Kinou Shikiso (compiled by Ikemori and Hashigatani, published by CMC Publishing Co., Ltd. in 1986), J. F. ABIAN, Chem. Rev., 92, pp. 1197-1226 (1992), the catalogs issued by Nippon Kanko Shikiso Kenkyujo in 1995 and the laser dye catalogs issued by Exciton Inc. in 1989), or dyes heretofore known by disclosure in patents.

(ii) Organometallic Compounds Containing Hydrolyzable Functional Groups

As a matrix of the high refractive index layer used in the invention, it is also preferable to utilize a film formed by using an organometallic compound containing a hydrolyzable functional group, forming a coating film by making the organometallic compound undergo sol-gel reaction, and then curing the coating film. Examples of the organometallic compound include compounds containing Si, Ti, Zr and Al as their respective constituents. Examples of the hydrolyzable group include alkoxy groups, alkoxycarbonyl groups, halogen atoms and a hydroxyl group. Of these groups, alkoxy groups including a methoxy group, an ethoxy group, a propoxy group and a butoxy group are preferred over the others. The suitable organometallic compounds are organosilicon compounds represented by the following formula (1') and partial hydrolysis products (partial condensates) thereof. Incidentally, it is well-known fact that the organosilicon compounds represented by formula (1') are readily hydrolyzed, and subsequently undergo dehydrating condensation reaction.

(Ra)m–Si(X)n                                    Formula (1'):

In formula (1'), Ra represents a substituted or unsubstituted, 1-30C aliphatic or 6-14C aryl group. X represents a halogen atom (e.g., chlorine atom, a bromine atom), an OH group, an OR2 group or an OCOR2 group. Herein, R2 represents a substituted or unsubstituted alkyl group. m represents an integer of 0 to 3. n represents an integer of 1 to 4. The sum of m and n is 4. When m is 0, however, X represents an OR2 or OCOR2 group.

In formula (1'), the aliphatic group of Ra is preferably a 1-18C aliphatic group (with examples including methyl, ethyl, propyl, butyl, pentyl, hexyl, octyl, decyl, dodecyl, hexadecyl, octadecyl, benzyl, phenethyl, cyclohexyl, cyclohexylmethyl, hexenyl, decenyl and dodecenyl groups), far preferably a 1-12C aliphatic group, particularly preferably a 1-8C aliphatic group.

Examples of the aryl group of Ra include phenyl, naphthyl and anthranyl groups, preferably phenyl groups.

These groups have no particular restriction as to substituents they may have, but it is preferable that their substituents include halogen atoms (e.g., fluorine, chlorine, bromine), a hydroxyl group, a mercapto group, a carboxyl group, an epoxy group, alkyl groups (e.g., methyl, ethyl, i-propyl, propyl, t-butyl), aryl groups (e.g., phenyl, naphthyl), aromatic heterocyclic groups (e.g., furyl, pyrazolyl, pyridyl), alkoxy groups (e.g., methoxy, ethoxy, i-propoxy, hexyloxy), aryloxy groups (e.g., phenoxy), alkylthio groups (e.g., methylthio, ethylthio), arylthio groups (e.g., phenylthio), alkenyl groups (e.g., vinyl, 1-propenyl), alkoxysilyl groups (e.g., trimethoxysilyl, triethoxysilyl), acyloxy groups (e.g., acetoxy, (meth) acryloyl), alkoxycarbonyl groups (e.g., methoxycaronyl, ethoxycarbonyl), aryloxycarbonyl groups (e.g., phenoxycarbonyl), carbamoyl groups (e.g., carbamoyl, N-methylcarbamoyl, N,N-dimethylcarbamoyl, N-methyl-N-octylcarbamoyl), and acylamino groups (e.g., acetylamino, benzoylamino, acrylamino, methacrylamino).

Of these substituents, a hydroxyl group, a mercapto group, a carboxyl group, an epoxy group, alkyl groups, alkoxysilyl groups, acyloxy groups and acylamino groups are preferred by far, and especially preferred substituents are an epoxy group, polymerizable acyloxy groups (including (meth)acryloyl) and polymerizable acylamino groups (including acrylamino and methacrylamino). These substituents may further be substituted.

R2 represents a substituted or unsubstituted alkyl group. A description of substituents the alkyl group may have is the same one as given to Ra.

m represents an integer of 0 to 3. n represents an integer of 1 to 4. The sum of m and n is 4. m is preferably 0, 1 or 2, particularly preferably 1. When m is 0, X represents an OR2 or OCOR2 group.

The content of a compound of formula (1') is preferably from 10 to 80 mass %, far preferably from 20 to 70 mass %, particularly preferably from 30 to 50 mass %, of the total solids in the high refractive index layer.

Examples of compounds represented by formula (1') include the compounds disclosed in JP-A-2001-166104, par. Nos. [0054]-[0056].

In the high refractive index layer, it is preferable that the organic binder contains silanol groups. By introduction of silanol groups into the binder, the resulting high refractive index layer can further improve in physical strength, chemical resistance and weather resistance.

The introduction of silanol groups into the binder can be accomplished, e.g., by mixing in a coating composition for forming the high refractive index layer a cross-linking or polymerizable functional group-containing organosilicon compound represented by formula (1') as a binder-forming constituent in combination with other constituents of the coating composition, specifically binder precursors (curable multifunctional monomers or multifunctional oligomers), a polymerization initiator and a dispersant contained in a dispersion of inorganic fine particles with a high refractive index, and applying a coating of the resulting coating composition to a transparent support and causing cross-linking reaction or polymerization reaction between the dispersant, the multifunctional monomers or oligomers, and the organosilicon compound represented by formula (1').

The hydrolysis and condensation reaction for curing the organometallic compounds are preferably performed in the presence of a catalyst. Examples of the catalyst include inorganic acids such as hydrochloric acid, sulfuric acid and nitric acid, organic acids such as oxalic acid, acetic acid, formic acid, trifluoroacetic acid, methanesulfonic acid and toluenesulfonic acid, inorganic bases such as sodium hydroxide, potassium hydroxide and ammonia, organic bases such as triethylamine and pyridine, metal alkoxides such as triisopropoxyaluminum, tetrabutoxyzirconium and tetrabutoxytitanate, and metal-chelate compounds such as β-diketones and β-ketoesters. More specifically, the compounds disclosed in JP-A-2000-275403, par. Nos. [0071]-[0083] can be used as the catalyst.

The proportion of these catalytic compounds in the composition is from 0.01 to 50 mass %, preferably from 0.1 to 50 mass %, far preferably from 0.5 to 10 mass %, based on the organometallic compound used. It is preferable that the reaction conditions are adjusted appropriately according to the reactivity of the organometallic compound used.

In the high refractive index layer, it is also advantageous that the matrix has specified polar groups. Examples of the specified polar groups include anionic groups, amino groups and quaternary ammonium groups. Examples of the anionic groups, amino groups and quaternary ammonium groups include the same groups as recited for the dispersant.

The specified polar group-containing matrix of the high refractive index layer is prepared, e.g., by mixing a dispersion containing inorganic fine particles having a high refractive index and a dispersant in the coating composition for forming the high refractive index layer, further mixing as a cured film forming constituent at least either the composition of a binder precursor having a specified polar group (a curable multifunctional monomer or oligomer having a specified polar group) and a polymerization initiator, or the organosilicon compound represented by formula (1') and containing a specified polar group and a cross-linkable or polymerizable functional group, and furthermore, if desired, mixing a monofunctional monomer containing a specified polar group and a cross-linkable or polymerizable group, then applying a coating of the resulting composition to a transparent support and further causing therein cross-linking or polymerization reaction of at least any one of the dispersant, the monofunctional monomer, the multifunctional monomer, the multifunctional oligomer and the organosilicon compound represented by formula (1').

The monofunctional monomer containing a specified polar group functions as a dispersing aid of inorganic fine particles in the coating composition. After the coating, the monofunctional monomer is made into a binder by undergoing cross-linking or polymerization reaction together with the dispersant, the multifunctional monomer and the multifunctional oligomer; as a result, it becomes possible to retain uniformly well-dispersed condition of inorganic fine particles in the high refractive index layer and the thus formed high refractive index layer can have excellent physical strength, chemical resistance and weather resistance.

The monofunctional monomer having an amino group or a quaternary ammonium group is preferably used in an amount of 0.5 to 50 mass %, especially 1 to 30 mass %, based on the dispersant. As far as the binder is formed by the cross-linking or polymerization reaction simultaneously with or subsequently to the coating of the high refractive index layer, it is possible to cause the monofunctional monomer to function effectively before applying a coating of the high refractive index layer.

Another example of a matrix of the high refractive index layer used in the invention is a matrix which corresponds to the organic binder (a) and is formed from an organic polymer having heretofore known cross-linkable or polymerizable functional groups through curing reaction. Therein, it is preferable that the polymer after formation of the high refractive index layer has a cross-linked or polymerized structure further. Examples of such an organic polymer include polyolefin (constituted of saturated hydrocarbons), polyether, polyurea, polyurethane, polyester, polyamine, polyamide and melamine resin. Of these polymers, polyolefin, polyether and polyurea are preferred over the others, and polyolefin and polyether are preferable by far. The mass-average molecular weight of an organic polymer before curing is preferably from $1 \times 10^3$ to $1 \times 10^6$, far preferably from $3 \times 10^3$ to $1 \times 10^5$.

The organic polymer before curing is preferably a copolymer which includes repeating units containing the same specified polar groups as described above and repeating units having cross-linked or polymerized structures. The proportion of repeating units having anionic groups in the polymer is preferably 0.5 to 99 mass %, far preferably 3 to 95 mass %, especially preferably 6 to 90 mass %, of the total repeating units. Each repeating unit may have two or more identical or different anionic groups.

When the polymer contains repeating units having silanol groups, the proportion of such repeating units is preferably from 2 to 98 mole %, far preferably from 4 to 96 mole %, especially preferably from 6 to 94 mole %.

When the polymer contains repeating units having amino groups or quaternary ammonium groups, the proportion of such repeating units is preferably from 0.1 to 50 mass %, far preferably from 0.5 to 30 mass %.

Incidentally, similar effects can be produced even when silanol, amino or quaternary ammonium groups are contained in repeating units having anionic groups or repeating units having cross-linked or polymerized structures.

The proportion of repeating units having cross-linked or polymerized structures in the polymer is preferably from 1 to 90 mass %, far preferably from 5 to 80 mass %, especially preferably from 8 to 60 mass %.

It is preferable that the matrix made up of cross-linked or polymerized binder is formed by subjecting a coating composition for the high refractive index layer, which is coated on a transparent support, to cross-linking or polymerization reaction simultaneously with or subsequently to the coating of the composition.

To the high refractive index layer for use in the invention, other compounds can further be added as appropriate in accordance with uses and purposes. In the case of providing, e.g., a low refractive index layer on the high refractive index layer, it is preferable that the refractive index of the high refractive index layer is higher than that of a transparent support, and in the high refractive index layer can also be used favorably a binder obtained by cross-linking or polymerization reaction of a curable compound containing an aromatic ring, a halogenation element other than fluorine (e.g., Br, I, Cl), or an atom such as S, N or P, because the refractive index of an organic compound is enhanced by containing the above-recited ones.

(Other Compositions in High Refractive Index Layer)

To the high refractive index layer for use in the invention, other compounds can further be added as appropriate in accordance with uses and purposes. In the case of providing, e.g., a low refractive index layer on the high refractive index layer, it is preferable that the refractive index of the high refractive index layer is higher than that of a transparent support, and in the high refractive index layer can also be used favorably a binder obtained by cross-linking or polymerization reaction of a curable compound containing an aromatic ring, a halogenation element other than fluorine (e.g., Br, I, Cl), or an atom such as S, N or P, because the refractive index of an organic compound is enhanced by containing the above-recited ones.

In addition to the ingredients recited above (inorganic fine particles, polymerization initiators, sensitizers and so on), a resin, a surfactant, an antistatic agent, a coupling agent, a thickener, a coloration inhibitor, a coloring agent (a pigment or a dye), a defoaming agent, a leveling agent, a flame retardant, a ultraviolet absorbent, an infrared absorbent, an adhesion imparting agent, a polymerization suppressor, an anti-oxidant, a surface reforming agent, conductive fine particles of metal, and so on can be added to the high refractive index layer.

[Medium Refractive Index Layer]

In the antireflective film according to the invention, it is preferable that the high refractive index layer has a lamination structure made up of two layers differing in refractive index. More specifically, the structure of the antireflective film is preferably a three-layer lamination structure that the low refractive index layer formed by coating the composition according to the method mentioned above is provided on the high refractive index layer having a refractive index higher than the refractive index of the low refractive index layer, and a medium refractive index layer having a refractive index located midway between the refractive index of a support and the refractive index of the high refractive index layer is formed so as to be adjacent to the high refractive index layer, and that on the side opposite to the low refractive index layer. As mentioned above, these three refractive index layers stand in relative relation with respect to their respective refractive indexes.

The ingredients constituting the medium refractive index layer for use in the invention may be any of heretofore known ingredients, but it is preferable that they include the same ingredients as used in the high refractive index layer. The refractive index can be easily controlled by changing the kind and usage of the inorganic fine particles. The medium refractive index layer is formed as a thin layer having a thickness of 30 to 500 nm in the same way as in the foregoing description of the high refractive index layer. The more suitable thickness is from 50 to 300 nm.

[Low Refractive Index Layer]

Then, a low refractive index layer usable in the invention is described below.

The low refractive index layer for use in the invention is formed by curing a coating solution containing a binder and inorganic fine particles.

The refractive index of the low refractive index layer in a antireflective film according to the invention is in a range of 1.20 to 1.49, preferably 1.30 to 1.44.

(Hollow Particulate Silica)

The low refractive index layer for use in the invention may contain inorganic fine particles having a hollow structure with the intention of checking an increase in refractive index. The inorganic hollow particulate is preferably silica having a hollow structure. The refractive index of hollow particulate silica is preferably from 1.17 to 1.40, far preferably from 1.17 to 1.35, especially preferably from 1.17 to 1.30. The refractive index specified herein represents the refractive index that the particulates have in their entirety, and it does not represent the refractive index of only the outer shell silica forming hollow particulate silica. When the radius of a cavity in each particle is taken as "a" and the radius of an outer shell of each particle as "b", the porosity x calculated from the following mathematical expression (III) is preferably from 10% to 60%, far preferably from 20% to 60%, especially preferably from 30% to 60%.

$$x=(4\pi a^3/3)/(4\pi b^3/3)\times 100 \quad \text{(Mathematical Expression III):}$$

When it is intended to allow hollow particulate silica to have a lower refractive index and a greater porosity, the outer shell thickness is reduced and the particle strength is lowered. Therefore, particles having a refractive index lower than 1.17 cannot be used in point of scratch resistance.

Manufacturing methods of hollow silica are disclosed, e.g., in JP-A-2001-233611 and JP-A-2002-79616.

The amount of hollow silica mixed is preferably from 1 mg/m$^2$ to 100 mg/m$^2$, far preferably from 5 mg/m$^2$ to 80 mg/m$^2$, further preferably from 10 mg/m$^2$ to 60 mg/m$^2$. By adjusting the mixing amount to such a range, scratch resistance is enhanced, fine asperities on the surface of the low refractive index layer are reduced, and the outward appearance, such as deep blacks, and integrated reflectance are improved.

The average particle diameter of hollow silica is preferably from 30% to 150%, far preferably from 35% to 80%, further preferably from 40% to 60%, of thickness of the low refractive index layer. More specifically, when the thickness of the low refractive index layer is, say, 100 nm, the average particle diameter of hollow silica is preferably from 30 nm to 150 nm, far preferably from 35 nm to 80 nm, further preferably from 40 nm to 60 nm.

When the particle diameter of particulate silica is in the foregoing range, the refractive index is lowered, and fine asperities formed on the surface of the low refractive index layer are reduced to result in improvements of the outward appearance, such as deep blacks, and integrated reflectance. The particulate silica may be either in a crystalline state or in an amorphous state, and is preferably made up of monodisperse particles. While their best shape is a spherical shape, they may be indefinite in shape.

Herein, the average particle size of hollow silica can be determined from electron micrographs.

In the invention, solid silica particles can be used in combination with hollow silica. The suitable particle size of solid silica is from 30 nm to 150 nm, preferably from 35 nm to 80 nm, especially preferably from 40 nm to 60 nm.

Furthermore, it is preferable that at least one type of silica particles whose average diameter is below 25% of a thickness of the low refractive index layer (referred to as "small-diameter silica particles") are used in combination with silica particles having their diameters in the foregoing range (referred to as "large-diameter silica particles").

Small-diameter silica particles can contribute to the retention of large-diameter silica particles because they can be present in clearances among large-diameter silica particles.

The average diameter of small-diameter silica particles is preferably from 1 nm to 20 nm, far preferably from 5 nm to 15 nm, particularly preferably from 10 nm to 15 nm. The use of such silica particles is favorable in point of material cost and retainer effect.

For the purpose of aiming at ensuring dispersion stability in a dispersion liquid or a coating solution, or enhancing affinity and cohesion for a binder component, the particulate silica may be subjected in advance to physical surface treatment, such as plasma discharge treatment or corona discharge treatment, or chemical surface treatment with a surfactant, a coupling agent or so on. The use of a coupling agent in particular is advantageous. As the coupling agent, alkoxymetal compounds (e.g., titanate coupling agents, silane coupling agents) are suitably used. Of these treatments, the treatment with a silane coupling agent having an acryloyl or methacryloyl group is particular effective.

Although such a coupling agent is used as a surface treatment agent of an inorganic filler for a low refractive index layer for the purpose of giving surface treatment to the inorganic filler in advance of the preparation of a coating solution for the layer, it is preferable that the agent is further added as an additive at the time of preparation of the coating solution for the layer and thereby incorporated into the layer.

In point of reduction in load on surface treatment, it is preferable that the particulate silica is dispersed in a medium in advance of surface treatment.

As a binder forming the low refractive index layer for use in the invention, the same binders as usable in the aforementioned hard coating layer can be used. Besides them, fluorine-containing polymers may be utilized as low refractive index binders. The fluoropolymers suitable for such binders are fluorine-containing polymers which have kinetic friction coefficients of 0.03 to 0.15 and water contact angles of 90° to 120° and undergo cross-linking by application of heat or ionizing radiation.

Examples of a fluorine-containing polymer usable in the low refractive index layer include hydrolysis, dehydration condensates of perfluoroalkyl group-containing silane compounds (e.g., pentadecafluoro-1,1,2,2-tetrahydrodecyl)triethoxysilane), and fluorine-containing copolymers each having as constituents fluorine-containing monomer units and constitutional units for providing cross-linking reactivity.

Examples of the fluorine-containing monomer units include fluoroolefins (such as fluoroethylene, vinylidene fluoride, tetrafluoroethylene, perfluorooctylethylene, hexafluoropropylene and perfluoro-2,2-dimethyl-1,3-dioxol), partially or fully fluorinated alkyl ester derivatives of (meth)acrylic acid (such as Viskote 6FM, a product of Osaka Organic Chemical Industry Ltd., and R-2020, a product of Daikin Industries, Ltd.), and fully or partially fluorinated vinyl ethers. Of these monomers, perfluoroolefins are preferred over the others, and hexafluoropropylene is especially favorable in terms of refractive index, solubility, transparency and availability.

Examples of the constitutional units for providing cross-linking reactivity include constitutional units obtained by polymerization of monomers having self-cross-linkable functional groups introduced into their individual molecules beforehand, such as glycidyl(meth)acrylate and glycidyl vinyl ether, constitutional units obtained by polymerization of monomers having a carboxyl group, a hydroxyl group, an amino group, a sulfo group and the like, respectively (such as (meth)acrylic acid, methylol(meth)acrylate, hydroxylalkyl (meth)acrylate, allyl acrylate, hydroxyethyl vinyl ether, hydroxybutyl vinyl ether, maleic acid and crotonic acid), and constitutional units obtained by introducing cross-linkable groups such as (meth)acryloyl group into those constitutional units through macromolecular reaction (e.g., using a technique of reacting acrylic acid chloride with hydroxyl groups).

Beside the fluorine-containing monomers and the constitutional units for providing cross-linking reactivity, fluorine-free monomers can also be copolymerized as appropriate from the viewpoints of solubility in solvents and film transparency. Such monomer units usable in combination have no particular restrictions, but examples thereof can include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile.

Curing agents may be used in combination with the polymers recited above as described in JP-A-10-25388 and JP-A-10-147739.

Fluorine-containing polymers especially useful in the invention are random copolymers of perfluoroolefins and vinyl ethers or vinyl esters. And it is preferable that these copolymers have groups capable of causing cross-linking reaction by themselves (e.g., radical-reactive groups such as (meth)acryloyl group, ring opening-polymerizable groups such as epoxy group and oxetanyl group). It is preferable that the monomer units having those cross-linking reaction-causing groups constitute 5 to 70 mol %, especially 30 to 60 mol %, of the total monomer units in such copolymers each.

Preferred forms of fluorine-containing copolymers usable in the invention can be represented by the following formula 3.

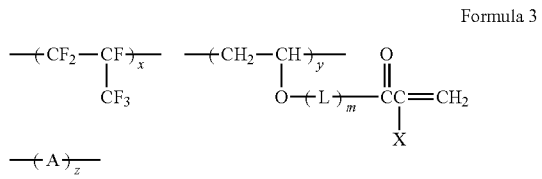

Formula 3

In formula 3, L represents a 1-10C linkage group, preferably a 1-6C linkage group, particularly preferably a 2-4C linkage group, and may have either a linear structure, or a branched structure, or a cyclic structure, and may further have a hetero atom chosen from O, N or S.

Suitable examples of such a linkage group include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—**, *—CONH—$(CH_2)_3$—O—**, *—$CH_2CH(OH)CH_2$—O—** and *—$CH_2CH_2OCONH(CH_2)_3$—O—** (wherein * stands for the linking site on the polymer's main chain side and ** stands for the linking site on the (meth) acryloyl group side). m represents 0 or 1.

In formula 3, X represents a hydrogen atom or a methyl group, and a hydrogen atom is preferred as X in point of curing reactivity.

In formula 3, A represents a repeating unit derived from an arbitrary vinyl monomer, has no particular restriction so long as it is a monomeric constituent copolymerizable with hexafluoropropylene, can be chosen as appropriate from the viewpoints of adhesion to a substrate, polymer's Tg (contributing to film hardness), solvent solubility, transparency, slippability and resistances to dust and soil, and may be made up of a single vinyl monomer or multiple vinyl monomers according to the intended purpose.

Suitable examples of such a monomer include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether, vinyl esters such as vinyl acetate, vinyl propionate and vinyl butyrate, (meth)acrylates such as methyl(meth)acrylate, ethyl(meth)acrylate, hydroxyethyl (meth)acrylate, glycidyl methacrylate, allyl(meth)acrylate and (meth)acryloyloxypropyltrimethoxysilane, styrene derivatives such as styrene and p-hydroxymethylstyrene, unsaturated carboxylic acid such as crotonic acid, maelic acid and itaconic acid, and their derivatives. Of these monomers, vinyl ether derivatives and vinyl ester derivatives, especially vinyl ether derivatives, are preferred over the others.

x, y and z represent mole % of their corresponding constituents, and they are values satisfying $30 \leq x \leq 60$, $5 \leq y \leq 70$ and $0 \leq z \leq 65$. The preferred are cases where $35 \leq x \leq 55$, $30 \leq y \leq 60$ and $0 \leq z \leq 20$ are satisfied, and the preferred in particular are cases where $40 \leq x \leq 55$, $40 \leq y \leq 55$ and $0 \leq z \leq 10$ are satisfied.

Especially preferred forms of the fluorine-containing copolymers can be represented by the following formula 4.

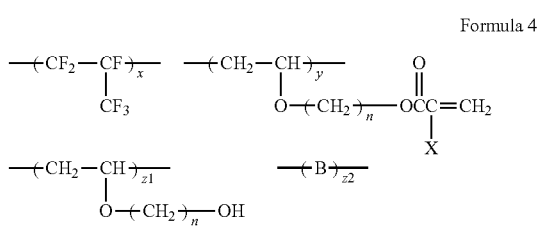

Formula 4

In formula 4, X, x and y have the same meanings as in formula 3, respectively, and preferred ranges thereof are also the same as in formula 3 n represents the integer of $2 \leq n \leq 10$, preferably $2 \leq n \leq 6$, particularly preferably $2 \leq n \leq 4$.

B represents a repeating unit derived from an arbitrary vinyl monomer, and may be made up of a single composition or multiple compositions. To examples of such a repeating unit, those recited as examples of A in formula 4 are applicable.

Z1 and Z2 represent mole % of their corresponding repeating units, and they are values satisfying $0 \leq z1 \leq 65$ and $0 \leq z2 \leq 65$, preferably $0 \leq z1 \leq 30$ and $0 \leq z2 \leq 10$, particularly preferably $0 \leq z1 \leq 10$ and $0 \leq z2 \leq 5$.

The fluorine-containing copolymers represented by formula 3 or 4 can be synthesized by introducing (meth)acryloyl groups into copolymers containing, e.g., hexafluoropropylene constituents and hydroxyalkyl vinyl ether constituents by use of any of techniques mentioned above.

Suitable examples of useful fluorine-containing copolymers are illustrated below, but useful copolymers should not be construed as being limited to these examples.

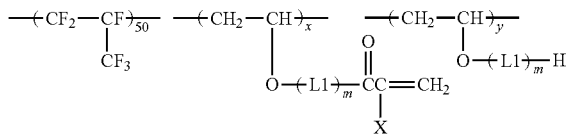

| | x | y | m | L1 | X |
|---|---|---|---|---|---|
| P-1 | 50 | 0 | 1 | *—CH$_2$CH$_2$O—** | H |
| P-2 | 50 | 0 | 1 | *—CH$_2$CH$_2$O—** | CH$_3$ |
| P-3 | 45 | 5 | 1 | *—CH$_2$CH$_2$O—** | H |
| P-4 | 40 | 10 | 1 | *—CH$_2$CH$_2$O—** | H |
| P-5 | 30 | 20 | 1 | *—CH$_2$CH$_2$O—** | H |
| P-6 | 20 | 30 | 1 | *—CH$_2$CH$_2$O—** | H |
| P-7 | 50 | 0 | 0 | — | H |
| P-8 | 50 | 0 | 1 | *—C$_4$H$_8$O—** | H |
| P-9 | 50 | 0 | 1 | *—(CH$_2$)$_2$—O—(CH$_2$)$_2$—O—** | H |
| P-10 | 50 | 0 | 1 | *—(C$_6$H$_{10}$)—O—** (cyclohexylene) | H |
| P-11 | 50 | 0 | 1 | *—CH$_2$CH$_2$NH—** | H |
| P-12 | 50 | 0 | 1 | *—CH$_2$CH$_2$OC(=O)NHCH$_2$CH$_2$CH$_2$O—** | H |
| P-13 | 50 | 0 | 1 | *—CH$_2$CH$_2$OC(=O)NHCH$_2$CH$_2$CH$_2$O—** | CH$_3$ |
| P-14 | 50 | 0 | 1 | *—CH$_2$CH$_2$CH$_2$CH$_2$OC(=O)NHCH$_2$CH$_2$CH$_2$O—** | CH$_3$ |
| P-15 | 50 | 0 | 1 | *—CH$_2$CH(OH)CH$_2$O—** | H |
| P-16 | 50 | 0 | 1 | *—CH$_2$CH(CH$_2$OH)O—** | H |
| P-17 | 50 | 0 | 1 | *—CH$_2$CH$_2$OCH$_2$—CH(OH)CH$_2$O—** | H |
| p-18 | 50 | 0 | 1 | *—CH$_2$OCH$_2$CH(OH)—CH$_2$O—** | CH$_3$ |
| P-19 | 50 | 0 | 1 | *—CH$_2$OCH$_2$CH(CH$_2$OH)—O—** | CH$_3$ |
| P-20 | 40 | 10 | 1 | *—CH$_2$CH$_2$O—** | CH$_3$ |

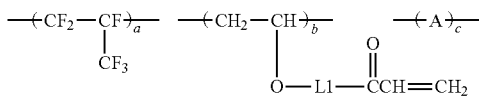

| | a | b | c | L1 | A |
|---|---|---|---|---|---|
| P-21 | 55 | 45 | 0 | *—CH$_2$CH$_2$O—** | — |

-continued

| ID | | | | Linker | Side group |
|---|---|---|---|---|---|
| P-22 | 45 | 55 | 0 | *—CH$_2$CH$_2$O—** | — |
| P-23 | 50 | 45 | 5 | *—CH$_2$CH$_2$OC(=O)NHCH$_2$CH$_2$CH$_2$O—** | —CH$_2$—CH(OCH$_2$CH$_2$OH)— |
| P-24 | 50 | 45 | 5 | *—CH$_2$CH(OH)CH$_2$O—** | —CH$_2$—CH(O—CH$_2$-epoxide)— |
| P-25 | 50 | 45 | 5 | *—CH$_2$CH(CH$_2$OH)O—** | —CH$_2$—CH(O—CH$_2$-epoxide)— |
| P-26 | 50 | 40 | 10 | *—CH$_2$CH$_2$O—** | —CH$_2$—CH(OCH$_2$CH$_3$)— |
| P-27 | 50 | 40 | 10 | *—CH$_2$CH$_2$O—** | —CH$_2$—CH(O-cyclohexyl)— |
| P-28 | 50 | 40 | 10 | *—CH$_2$CH$_2$O—** | —CH(CH$_3$)—CH(COOH)— |

$$-(CF_2-CF(CF_3))_x-(CH_2-CH(O-(CH_2)_n-OC(=O)C(X)=CH_2))_y-(CH_2-CH)_{z1}-(B)_{z2}-$$

| | x | y | z1 | z2 | n | X | B |
|---|---|---|---|---|---|---|---|
| P-29 | 50 | 40 | 5 | 5 | 2 | H | —CH$_2$—CH(O—CH$_2$CH$_3$)— |
| P-30 | 50 | 35 | 5 | 10 | 2 | H | —CH$_2$—CH(O—C(CH$_3$)$_3$)— |
| P-31 | 40 | 40 | 10 | 10 | 4 | CH$_3$ | —CH$_2$—CH(O-cyclohexyl)— |

$$-(CF_2-CF(CF_3))_{50}-(Y)_a-(Z)_b-$$

| | a | b | Y | Z |
|---|---|---|---|---|
| P-32 | 45 | 5 | —CH(CH$_3$)—CH(CO$_2$CH$_2$CH(OH)CH$_2$OC(=CH$_2$)CH$_3$)— | —CH(CH$_3$)—CH(COOH)— |
| P-33 | 40 | 10 | —CH$_2$—CH(CO$_2$H)—···—CONHCH$_2$CH$_2$OC(=O)CH=CH$_2$ | —CH—CH—(O=C-O-C=O cyclic)— |

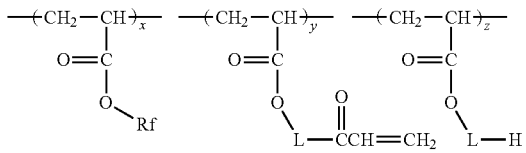

| | x | y | z | Rf | L |
|---|---|---|---|---|---|
| P-34 | 60 | 40 | 0 | —CH$_2$CH$_2$C$_8$F$_{17}$-n | —CH$_2$CH$_2$O— |
| P-35 | 60 | 30 | 10 | —CH$_2$CH$_2$C$_4$F$_8$H-n | —CH$_2$CH$_2$O— |
| P-36 | 40 | 60 | 0 | —CH$_2$CH$_2$C$_6$F$_{12}$H | —CH$_2$CH$_2$CH$_2$CH$_2$O— |

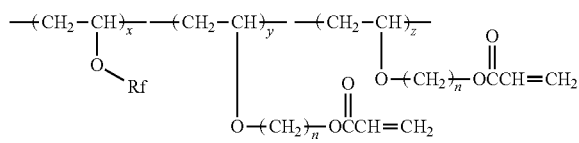

| | x | y | z | n | Rf |
|---|---|---|---|---|---|
| P-37 | 50 | 50 | 0 | 2 | —CH$_2$C$_4$F$_8$H-n |
| P-31 | 40 | 55 | 5 | 2 | —CH$_2$C$_4$F$_8$H-n |
| P-39 | 30 | 70 | 0 | 4 | —CH$_2$C$_8$F$_{17}$-n |
| P-40 | 60 | 40 | 0 | 2 | —CH$_2$CH$_2$C$_8$F$_{16}$H-n |

*stands for the polymer's main chain side, and **the (meth)acryloyl group side
*stands for the polymer's main chain side, and **the acryloyl group side The polymerization for syntheses of the fluorine-containing polymers as illustrated above can be performed by irradiation with ionizing radiation or application of heat in the presence of a photo-acid generator or a thermo-acid generator.

The reactive cross-linking group-containing binder for a low refractive index layer usable in the invention is preferably a binder containing as reactive cross-linking groups any of (meth)acryloyl, epoxy and isocyanate groups, far preferably a binder containing (meth)acryloyl groups as reactive cross-linking groups.

The foregoing copolymers can be synthesized by synthesizing their precursors, such as hydroxyl group-containing polymers, in accordance with any of various polymerization methods, such as solution polymerization, precipitation polymerization, suspension polymerization, precipitation polymerization, mass polymerization and emulsion polymerization, and then by introducing (meth)acryloyl groups into the precursors through the macromolecular reaction as mentioned above. The polymerization reaction can be performed by any of known operations, such as a batch-wise operation, a semicontinuous operation and a continuous operation.

As a method for initiating polymerization, there are a method of using a radical initiator and a method of applying light or radiation. These polymerization methods and methods for initiating polymerization are described, e.g., in Teiji Tsuruta, Kobunshi Gosei Hoho, revised edition (Nikkan Kogyo Shimbun Ltd., 1971), and Takayuki Ohtsu & Masayoshi Kinoshita, Kobunshi Gosei no Jikken-ho, pp. 124-154, Kagaku-dojin Publishing Co., Inc. (1972).

Of the aforementioned polymerization methods, the solution polymerization method using a radical initiator is especially preferred. The solvent used in the solution polymerization method may be a single solvent or a mixture of two or more solvents chosen from various organic solvents including ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol, or a mixture of such an organic solvent with water.

The polymerization temperature is required to be set in relation to the molecular weight of a polymer to be produced and the species of a initiator used. Although the polymerization temperature settings from 0° C. or below to 100° C. or above are possible, it is advantageous to carry out the polymerization at temperatures ranging from 50° C. to 100° C.

The reaction pressure, though can be chosen arbitrarily, is generally from 1 to 100 kg/cm$^2$, especially preferably from 1 to 30 kg/cm$^2$. The reaction time is of the order of 5 to 30 hours.

The re-precipitation solvent for the polymer obtained is preferably isopropanol, hexane, methanol or the like.

For the purpose of inhibiting aggregation and sedimentation of inorganic fillers, it is favorable in the invention also to use a dispersion stabilizer in combination with the inorganic fillers in a coating solution for forming each layer. Examples of a dispersion stabilizer usable for the foregoing purpose include polyvinyl alcohol, polyvinyl pyrrolidone, cellulose derivatives, polyamide, phosphoric acid esters, polyether, surfactants, and silane or titanate coupling agents. The aforementioned silane coupling agents in particular are preferred in point of high strength of cured film.

The composition for forming a low refractive index layer takes a liquid form, and is prepared by dissolving in an appropriate solvent the aforementioned binder and inorganic fine particles as essential ingredients and, on an as needed basis, various additives and a radical polymerization initiator. Herein, the solids concentration, though chosen appropriately according to purpose, is generally of the order of 0.01 to 60 mass %, preferably of the order of 0.5 to 50 mass %, particularly preferably of the order of 1 to 20 mass %.

From the viewpoint of film hardness of the low refractive index layer, it is not always favorable to add additives including a curing agent, but it is also possible to add a limited amount of curing agent, such as a multifunctional (meth) acrylate compound, a multifunctional epoxy compound, a polyisocyanate compound, an aminoplasto, or a polybasic acid or an anhydride thereof, from the viewpoint of interfacial adhesion to the high refractive index layer. It is appropriate that such a compound be added in an amount of 0 to 30 mass %, preferably 0 to 20 mass %, particularly preferably 0 to 10 mass %, based on the total solids in the film of low refractive index layer.

For the purpose of imparting properties including soil resistance, water resistance, chemical resistance and slipping ability, heretofore known silicone-type or fluorocarbon-type antifoulants and slipping agents can also be added as appropriate. It is appropriate that these additives be added in an amount of 0.01 to 20 mass %, preferably 0.05 to 10 mass %, particularly preferably 0.1 to 5 mass %, based on the total solids in the low refractive index layer.

A suitable example of silicone-type compounds is a compound containing two or more dimethylsilyloxy units as repeating units and having substituents in its main chain ends and/or side chains. In the main chain of a compound containing dimethylsilyloxy as repeating units, structural units other than dimethylsilyloxy may be contained. The substituents may be the same or different, and the number of thereof is preferably two or more. Suitable examples of such substituents include groups containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carbonyl group, an amino group and so on. These silicone compounds have no particular limitation on molecular weight, but the molecular weight thereof is preferably a hundred thousand or below, far preferably fifty thousand or below, further preferably from 3,000 to 30,000, especially preferably from 10,000 to 20,000. And there is no particular limit to the silicon atom contents in such silicone compounds, but the contents are preferably 18.0 mass % or above, far preferably from 25.0 to 37.8 mass %, especially preferably from 30.0 to 37.0 mass %. Examples of suitable silicone compounds include X-22-174DX, X-22-2426, X-22-164B, X-22-164C, X-22-170DX, X-22-176D and X-22-1821 (all of which are trade names) produced by Shin-Etsu Chemical Co., Ltd.; FM-0725, FM-7725, FM-4421, FM-5521, FM6621 and FM-1121 produced by Chisso Corporation; and DMS-U22, RMS-033, RMS-083, UMS-182, DMS-H21, DMS-H31, HMS-301, FMS121, FMS123, FMS131, FMS141 and FMS221 (all of which are trade names) produced by Gelest, but not limited to these products.

The fluorocarbon compounds are preferably compounds having fluoroalkyl groups. The fluoroalkyl groups are preferably 1-20C fluoroalkyl groups, far preferably 1-10C fluoroalkyl groups, and they may have either linear structures (e.g., —$CF_2CF_3$, —$CH_2(CF_2)_4H$, —$CH_2(CF_2)_8CF_3$, —$CH_2CH_2(CF_2)_4H$), or branched structures (e.g., $CH(CF_3)_2$, $CH_2CF(CF_3)_2$, $CH(CH_3)CF_2CF_3$, $CH(CH_3)(CF_2)_5CF_2H$), or alicyclic structures (preferably 5- and 6-membered ring structures, e.g., a perfluorocyclohexyl group, a perfluorocyclopentyl group, alkyl groups substituted with these groups), or may contain ether linkages (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$). Two or more of these fluoroalkyl groups may be contained in one and the same molecule.

It is preferable that each fluorocarbon compound further has substituents contributing to bonding or compatibility with a film of low refractive index layer. The substituents may be the same or different, and the number thereof is preferably at least two. Examples of suitable substituents include an acryloyl group, a methacryloyl group, a vinyl group, an aryl group, a cinnamoyl group, an epoxy group, an oxetanyl group, a hydroxyl group, an polyoxyalkylene group, a carboxyl group and an amino group. The fluorocarbon compounds may be copolymers or oligomeric copolymers of fluorine-containing compounds and fluorine-free compounds, and have no particular limitation on molecular weight. The content of fluorine atoms in fluorocarbon compounds each is not particularly limited, but it is preferably 20 mass % or above, far preferably from 30 to 70 mass %, especially preferably from 40 to 70 mass %. Examples of suitable fluorocarbon compounds include R-2020, M-2020, R-3833 and M-3833 (all of which are trade names) produced by Daikin Industries Ltd.; and Megafac F-171, F-172, F-179A and Defensa MCF-300 (all of which are trade names) produced by Dainippon Ink and Chemicals, Incorporated, but not limited to these products.

For the purpose of imparting dustproof, antistatic and like properties, such dust-proofing and antistatic agents as heretofore known cationic surfactants or polyoxyalkylene compounds can also be added as appropriate. Structural units of these dust-proofing and antistatic agents may be incorporated into the above-recited silicone compounds or fluorocarbon compounds as part of their functions. When these agents are added as additives, they are added in amounts ranging preferably from 0.01 to 20 mass %, far preferably from 0.05 to 10 mass %, particularly preferably from 0.1 to 5 mass %, based on the total solids in the low refractive index layer. Examples of suitable compounds include Megafac F-150 (trade name) produced by Dainippon Ink and Chemicals, Incorporated, and SH-3748 (trade name) produced by Dow Coming Toray Co., Ltd., but not limited to these products.

Solvents usable in coating solutions for forming constituent layers (e.g., a hard coating layer, a high refractive index layer, a medium refractive index layer and a low refractive index layer) of an antireflective film according to the invention are described below.

Examples of coating solvents having boiling points of, say, 100° C. or below include hydrocarbons, such as hexane (boiling point: 68.7° C., and hereinafter "° C." is omitted from the parenthesized data), heptane (98.4), cyclohexane (80.7) and benzene (80.1); halogenated hydrocarbons, such as dichloromethane (39.8), chloroform (61.2), carbon tetrachloride (76.8), 1,2-dichloroethane (83.5) and trichloroethylene (87.2); ethers, such as diethyl ether (34.6), diisopropyl ether (68.5), dipropyl ether (90.5) and tetrahydrofuran (66); esters, such as ethyl formate (54.2), methyl acetate (57.8), ethyl acetate (77.1) and isopropyl acetate (89); ketones, such as acetone (56.1) and 2-tanone(=methyl ethyl ketone, 79.6); alcohol compounds, such as methanol (64.5), ethanol (78.3), 2-propanol (82.4) and 1-propanol (97.2); cyano compounds, such as acetonitrile (81.6) and propionitrile (97.4); and carbon disulfide (46.2).

Examples of coating solvents having boiling points of, say, higher than 100° C. include octane (125.7), toluene (110.6), xylene (138), tetrachloroethylene (121.2), chlorobenzene (131.7), dioxane (101.3), dibutyl ether (142.4), isobutyl acetate (118), cyclohexanone (155.7), 2-methyl-4-pentanone (=MIBK, 115.9), 1-tanol (117.7), N,N-methylformamide (153), N,N-methylacetamide (166) and dimethyl sulfoxide (189), preferably toluene, cyclohexanone and 2-thyl-4-pentanone.

Of the solvents recited above, ketones, aromatic hydrocarbons and esters, especially ketones, are preferred over the others. Of the ketones, 2-butanone in particular is used to advantage.

In the case of ketone solvents, they may be used alone or as mixtures. When they are used as mixtures, the content of ketone solvents is preferably 10 mass % or more, far preferably 30 mass % or more, further preferably 60 mass % or more, of the total solvents contained in a coating composition.

Ingredients for each of functional layers and the low refractive index layer in the antireflective film according to the invention are diluted with a solvent having the composition as mentioned above, thereby preparing a coating solution for each layer. It is preferable that the concentration of the coating solution is adjusted properly with consideration given to the viscosity of the coating solution, the gravities of layer materials and so on, and more specifically, to a range of 0.1 to 80 mass %, preferably 1 to 60 mass %.

In addition, the solvents used for those constituent layers may have the same composition or different ones.

[Coating Method]

The present antireflective film can be formed according to the following methods, but methods usable in the invention should not be construed as being limited to the following.

A coating solution containing ingredients for forming each constituent layer is prepared first. Then, the coating solution for forming each layer is applied to a transparent support by use of a coating method, such as a dip coating method, an air knife coating method, a curtain coating method, a roller coating method, a wire bar coating method, a gravure coating method or a die coating method, and further dried by heating. Of such coating methods, a gravure coating method, a wire bar coating method and a die coating method, especially a die coating method, is preferred over the others. Herein, it is most advantageous to perform coating operations by use of a die having a structure devised as mentioned below. Thereafter, the solvents are removed in a drying process. As the drying process, it is advantageous to provide a drying process in which a drying zone is provided immediately after the coating process and the drying speed is adjusted by controlling the internal environment of the drying zone. And it is more advantageous to provide the drying process as disclosed in JP-A-2003-106767 wherein a drying apparatus is arranged for condensing and recovering the solvents in a coating solution used by installing a condensation plate as a platy member in nearly parallel with the location of transport just after coating and controlling the distance between the condensation plate and a coating film and the temperature of the condensation plate.

Thereafter, the monomers for forming each layer are polymerized and cured by irradiation with light or application of heat. Thus, each layer is formed.

[Structure of Die Coater]

Figure 8:
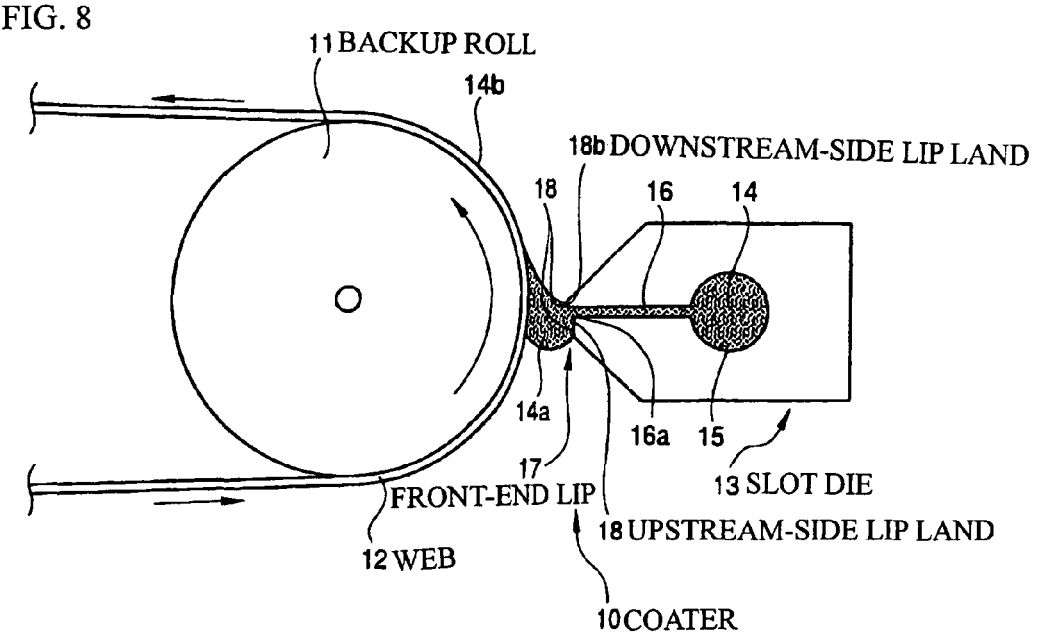
FIG. 8 is a cross-sectional diagram of a slot die-utilized coater which is used in carrying out the invention.

FIG. 8 is a cross-sectional diagram of a coater with a slot die used in carrying out the invention. The coater 10 forms a coating film 14*b* on a web W by a coating solution 14 being discharged in the form of bead 14*a* from a slot die 13 onto the web W traveling continuously as it is supported by the backup roll 11.

In the interior of the slot die 13, a pocket 15 and a slot 16 are formed. The cross-section of the pocket 15 is formed with curved and straight lines and, as shown in FIG. 8, the pocket 15 may be nearly circle or semicircle in cross section. The pocket 15 is a reservoir space for the coating solution, which is extended in the width direction of the slot die while keeping its cross-sectional shape, and the effective extension length thereof is generally adjusted to almost the same as or a little longer than a coating width.

The coating solution 14 is fed to the pocket 15 from a side of the slot die 13 or from the center of the face on the side opposite to the slot opening 16*a*. In addition, the pocket 15 is equipped with a stopper for preventing the coating solution 14 from leaking out.

The slot 16 is a channel of the coating solution 14 from the pocket 15 toward the web W, and has its cross-sectional shape in the width direction of the slot die as in the case of the pocket 15. The opening 16*a* located on the web side is generally adjusted so as to have almost the same length as the coating width by use of a member not shown in the figure, such as a width regulatory plate. An angle that the slot 16 makes at the slot tip with the tangent to the backup roll 11 in the web W traveling direction is preferably from 30° to 90°.

The front-end lips 17 of the slot die 13, between which the opening 16*a* of the slot is sited, are shaped so as to taper, and there is a flat part 18 referred to as a land at each of the frond ends thereof. As to this land 18, the land situated on the upstream side of the slot 16 in the traveling direction of a web W is referred to as the upstream-side lip land 18*a*, and the land situated on the downstream side is referred to as the downstream-side lip land 18*b*.

Figure 9:
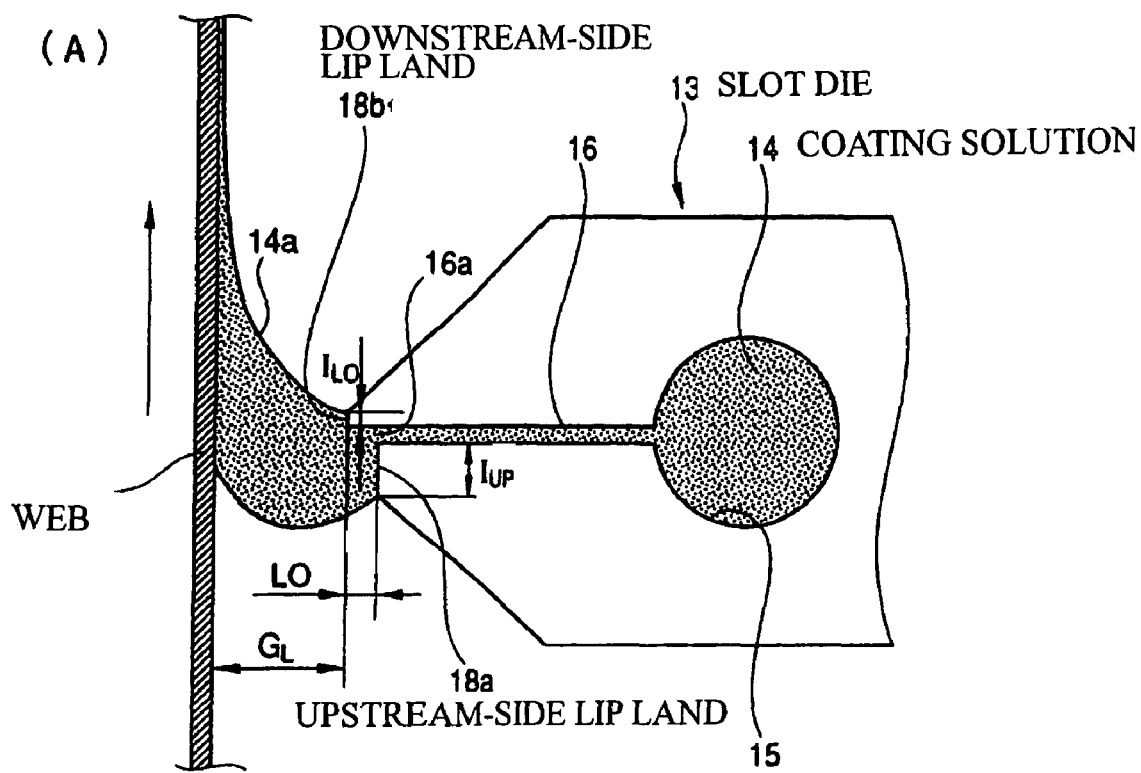
FIG. 9 shows cross-sectional diagrams for making comparison between the cross-sectional profile of a slot die 13 and that of the slot die currently in use.
Figure 9:
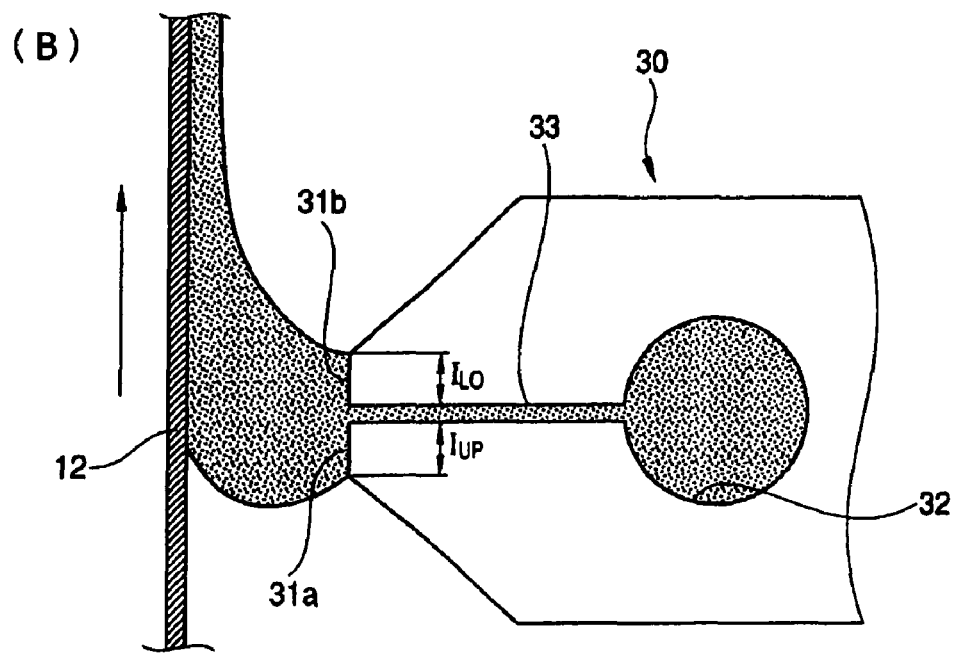

FIG. 9 shows the cross-sectional shape of the slot die 13 in comparison with that currently in use. (A) shows the slot die 13 used in carrying out the invention, while (B) shows a slot die 30 currently in use. In the case of the slot die 30 currently in use, the distance between the upstream-side lip land 31*a* and the web is the same as the distance between the downstream-side lip land 31*b* and the web. In (B), the reference numeral 32 stands for a pocket and the reference numeral 33 stands for a slot. In contrast to such a design, the downstream-side lip land length $I_{LO}$ is made shorter in the slot die 13 for carrying out the invention, and thereby a layer having a wet thickness of 20 µm or below can be coated with high accuracy.

The land length of the upstream-side lip land 18*a*, $I_{UP}$, has no particular limitations, but the range of 100 µm to 1 mm is preferably adopted. The land length of the downstream-side lip land 18*b*, $I_{LO}$, is preferably from 30 µm to 100 µm, far preferably from 30 µm to 80 µm, especially preferably from 30 µm to 60 µm.

When the downstream-side lip land length $I_{LO}$ is shorter than 30 µm, the edges or the land of the front-end lip are apt to become chipped and the coating layer tends to develop streaks, which eventually leads to impossibility of coating. In addition, the setting of wet line position becomes difficult, so there occurs a problem that the coating solution tends to spread out on the downstream side. It has been known so far that the wet spread of the coating solution on the downstream side means unevenness in wet line, and leads to a problem of incurring a defective surface profile, such as streaks, on the coating layer.

On the other hand, when the downstream-side lip land length $I_{LO}$ is longer than 100 µm, the bead itself cannot be formed to result in impossibility of thin-layer coating.

Additionally, since the downstream-side lip land 18*b* is closer to the web W than the upstream-side lip land 18*a* and shaped like overbite, the decompression degree can be lowered and bead formation suitable for thin-layer coating becomes possible. The difference between the distance of the downstream-side lip land 18*b* from the web and the distance of the upstream-side lip land 18*a* from the web (hereinafter referred to as "overbite length LO") is preferably 30 µm to 120 µm, far preferably from 30 µm to 100 µm, especially preferably from 30 µm to 80 µm.

When the slot die 13 has an overbite shape, the space between the front-end lip 17 and the web W, $G_L$, indicates the space between the downstream-side lip land 18b and web W.

Figure 10:
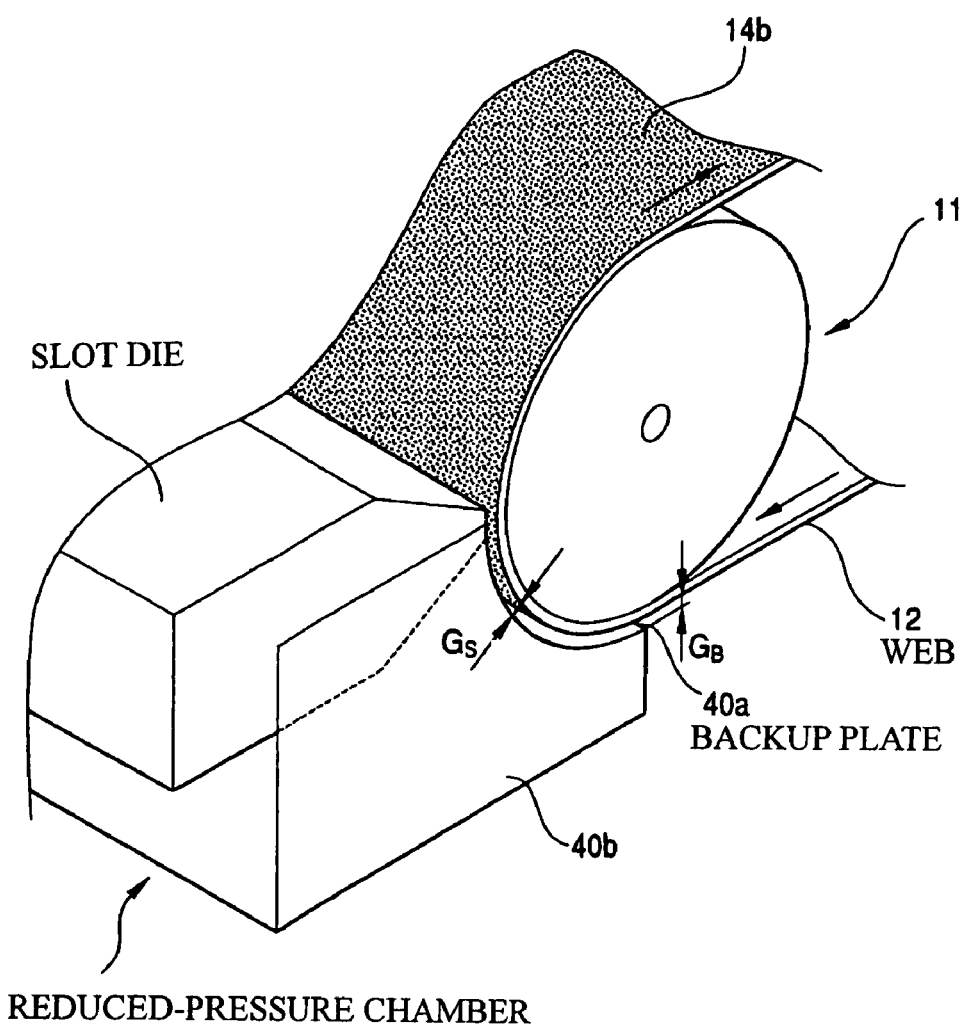
FIG. 10 is a diagrammatic perspective view showing the slot die and its surroundings in the coating process adopted for carrying out the invention.

FIG. 10 is a diagrammatic perspective view showing the slot die and its surroundings adopted in the coating process for carrying out the invention. On the side opposite to the web traveling direction side, a reduced-pressure chamber 40 is installed in a position having no contact with the slot die in order to perform sufficient decompression control on the bead 14a. The reduced-pressure chamber 40 is provided with a back plate 40a and a side plate 40b in order to retain its operational efficiency, and there are a gap $G_B$ between the back plate 40a and the web W and a gap $G_S$ between the side plate 40b and the web W.

Figure 11:
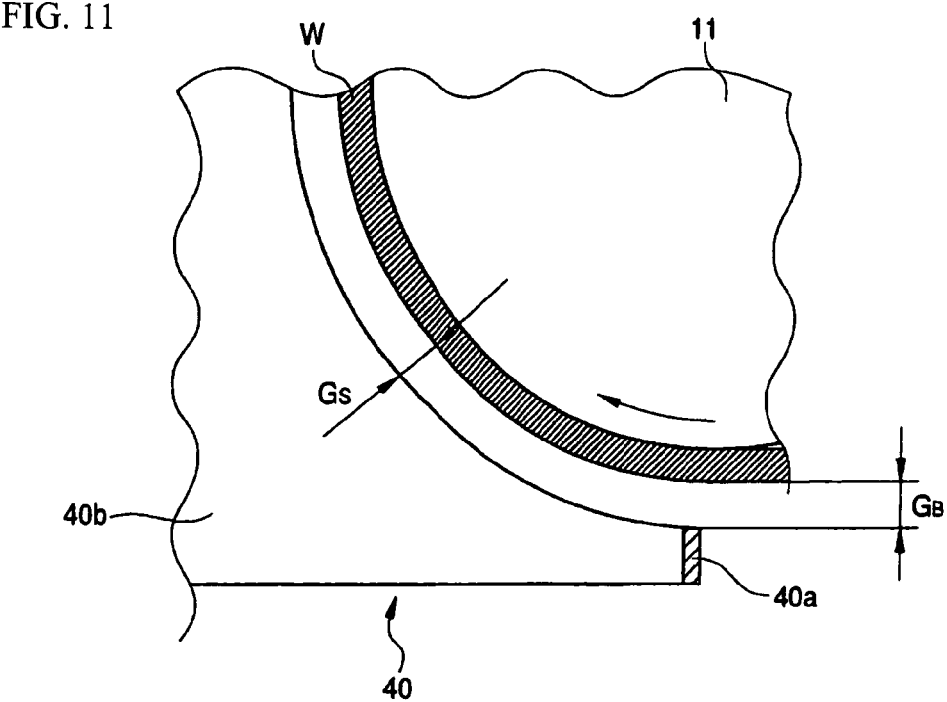
FIG. 11 is a cross-sectional diagram showing a pressure-reduced chamber 40 and web W which are adjacent to each other.
Figure 12:
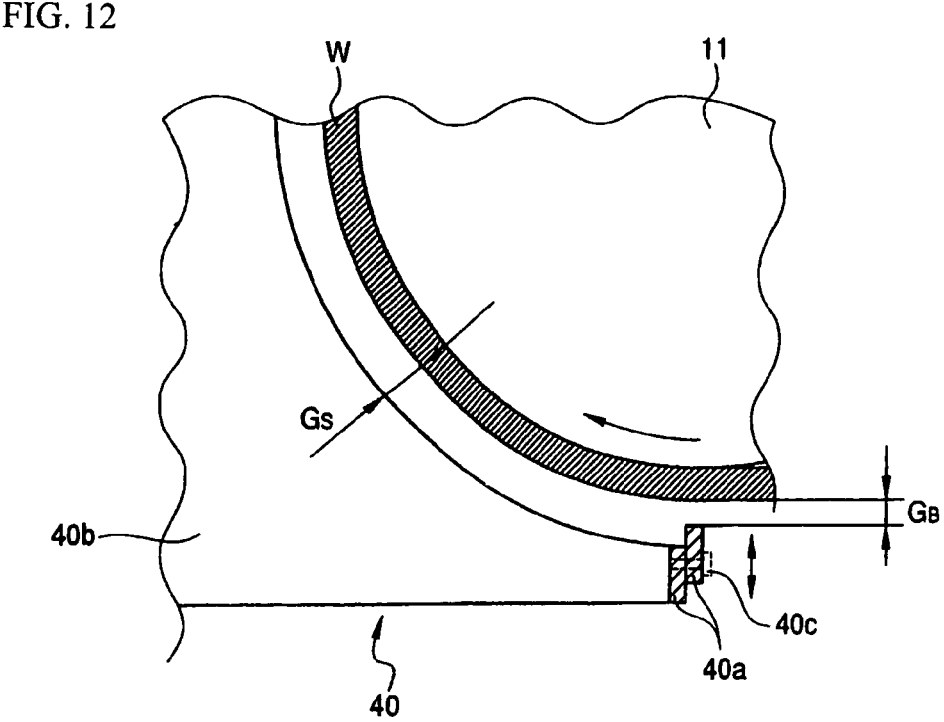
FIG. 12 is a cross-sectional diagram showing another pressure-reduced chamber and web W which are adjacent to each other.

FIG. 11 and FIG. 12 are cross-sectional diagrams showing the reduced-pressure chamber 40 and the web W in close proximity to each other. The side plate 40b and the back plate 40a may be integral with the body of the reduced-pressure chamber 40 as shown in FIG. 11 or, as shown in FIG. 12, may be configured to be held to the chamber with a screw 40c and so on in order that the gap is varied as appropriate.

In every structure, the actual spacing between the back plate 40a and the web W and that between the side plate 40b and the web W are defined as the gap $G_B$ and the gap $G_S$, respectively. The gap $G_B$ between the back plate 40a of the reduced-pressure chamber 40 and the web W refers to the distance from the topmost end of the back plate 40a to the web W when the reduced-pressure chamber 40 is placed beneath the web W and the solid die 13 as shown in FIG. 10.

It is preferable to set up a configuration that the gap $G_B$ between the back plate 40a and the web W is greater than the gap $G_L$ between the front-end lip 17 and the web W. By doing so, it becomes possible to avoid a decompression degree change caused in the bead neighborhood by eccentricity of the backup roll 11.

For instance, when the gap $G_L$ between the front-end lip 17 of the slot die 13 and the web W is from 30 μm to 100 μm, the suitable setting of the gap $G_B$ between the back plate 40a and the web W is from 100 μm to 500 μm.

[Material Quality and Accuracy]

The longer the length of the front-end lip on the web traveling direction side in the web traveling direction, the more unfavorable it becomes to bead formation. And when the values of this length vary among arbitrary points in the direction of the slot die width, the bead becomes unstable even by slight external disturbance. Therefore, it is preferable that the variation range of this length in the direction of the slot die width is controlled to within 20 μm.

As to a material for the front-end lip 17 of the slot die, on the other hand, the use of a material like stainless steel causes a shear droop at the stage of die machining, so it cannot satisfy the accuracy requirement for the front-end lip 17 even when the length of the slot die front-end lip 17 in the web traveling direction is adjusted to the above-specified range of 30 to 100 μm.

For ensuring high machining accuracy, therefore, it is important to use the superhard material as disclosed in Japanese Patent No. 2,817,053. More specifically, it is favorable that at least the front-end lip 17 of the slot die is formed from a superhard alloy produced by binding carbide crystal having an average grain size of 5 μm or below.

As a superhard alloy, an alloy formed from crystal grains of a carbide, such as tungsten carbide (hereinafter referred to as WC), bound together with a bonding metal like cobalt is known. As another bonding metal, titanium, tantalum, niobium or a mixture thereof can also be used. It is far preferred that the average grain size of WC crystal is 3 μm or below.

For achievement of highly accurate coating, the land length of the front-end lip 17 on the side of web-traveling direction and variations in the gap with the web in the direction of the slot die width become important factors. And it is preferable that the combination of these two factors, namely the straightness within a range that gap variations can be controlled up to a point, is attained. More specifically, it is advantageous to make the front-end lip 17 and the backup roll 11 have straightness that can ensure the gap variation range of 5 μm or below in the direction of the slot die width.

A polarizing plate is formed mainly of a polarizing film and two protective films provided on both sides of the polarizing film. It is preferable to use the present antireflective film as at least one of those protective films between which the polarizing film is sandwiched. When the present antireflective film also serves as a protective film, the production cost of the polarizing plate can be reduced. Moreover, by use of the present antireflective film as the outermost layer, the resulting polarizing plate can avoid reflected outside light and can also get high scratch resistance and soil resistance.

The polarizing film may be any of known polarizing films, or may be a polarizing film cut from a long length of polarizing film whose absorption axis is neither parallel nor perpendicular to the direction of the length. The polarizing film whose absorption axis is neither parallel nor perpendicular to the direction of the length is formed in the following manner.

More specifically, such a polarizing film can be formed by a stretching method in which a continuously supplied polymer film is stretched to 1.1 to 20.0 times its original length in the direction of its width under a tension while holding both edges thereof with holding tools. Herein, the longitudinally traveling speed difference between the film-edge holding tools is controlled to 3% or below, and the traveling direction of the film is bend as the film edges are held with the holding tools so that the film traveling direction at the exit from the film edge holding process tilts 20 to 70 degrees toward the substantial stretch direction of the film. The 45° tilt of the film traveling direction is especially favorable from the viewpoint of productivity.

Detailed description of the polymer film stretching method can be found in JP-A-2002-86554, paragraphs [0020] to [0030].

It is also preferable that, of polarizer's two protective films, the film other than an antireflective film is an optically-compensatory film with an optically-compensatory layer including an optically anisotropic layer. The optically-compensatory film (retardation film) can improve viewing angle characteristics of a liquid crystal display screen.

As the optically-compensatory film, known films can be used. From the viewpoint of widening the viewing angle, it is advantageous to use an optically-compensatory film which has an optically-compensatory layer including the compound having discotic structural units as disclosed in JP-A-2001-100042 and is characterized in that the angle between the discotic compound and the support varies in the depth direction of the layer.

And it is preferable that the angle increases with distance from the support side of the optically anisotropic layer.

The present antireflective film can be applied to image display devices including a liquid crystal display device (LCD), a plasma display panel (PDP), an electroluminescent display (ELD) and a cathode-ray tube display device (CRT). As the present antireflective film has a transparent support, it can be used in a state that its transparent support is bonded to the display screen of an image display device.

When the present antireflective film is used as a surface protective film on one side of a polarizing film, the resulting polarizing plate can be favorably used in a transmission, reflection or semi-transmission liquid crystal display of a twisted nematic (TN) mode, a super twisted nematic (STN) mode, a vertical alignment (VA) mode, an in-plane switching (IPS) mode, an optically compensatory bend cell (OCB) mode or so on.

In addition to (1) a strictly VA-mode liquid crystal cell in which rod-shaped liquid crystalline molecules are aligned in a substantially vertical direction when no voltage is applied thereto, but they are forced to align in a substantially horizontal direction by application of a voltage thereto (as disclosed in JP-A-2-176625), VA-mode liquid crystal cells include (2) a multidomain VA-mode (MVA-mode) liquid crystal cell (as described in SID 97, Digest of Tech. Papers (preprints) 28, p. 845(1997)), (3) an (n-ASM-mode) liquid crystal cell in which rod-shaped liquid crystalline molecules are aligned in a substantially vertical direction when no voltage is applied thereto, but they are brought into a twisted multidomain alignment by application of a voltage thereto (as described in preprints of Nippon Ekisho Toronkai, pp. 58-59 (1998)), and (4) a SURVAIVAL-mode liquid crystal cell (announced at LCD International 98).

OCB-mode liquid crystal cells are liquid crystal displays using liquid crystal cells of a bend alignment mode in which rod-shape liquid crystalline molecules in the upper part of each liquid crystal cell and those in the lower part are forced to align (symmetrically) in substantially opposite directions, and they are disclosed in U.S. Pat. Nos. 4,583,825 and 5,410,422. Since the rod-like liquid crystal molecules are symmetrically aligned in an upper part and a lower part of the liquid crystal cell, the bend orientation mode liquid crystal cell has an optically self-compensation function. Therefore, this liquid crystal mode is referred to as an OCB (optically compensatory bend) liquid crystal mode. The liquid crystal display device of the bend orientation mode has an advantage of high response speed.

ECB-mode liquid crystal cells, in which rod-shape liquid crystalline molecules are aligned in a substantially horizontal direction when no voltage is applied thereto, are prevailingly utilized as color TFT liquid crystal display devices, and described in an abundant technical literature. For example, descriptions thereof can be found in EL, PDP and LCD Displays published by Toray Research Center (2001).

With respect to TN-mode and IPS-mode liquid crystal display devices in particular, as described in JP-A-2001-100043, a polarizing plate having both antireflective effect and viewing angle expanding effect can be obtained in a thickness of only one polarizing plate by using an optically compensatory film having a viewing angle expanding effect as one of two protective films of a polarizing film on the side opposite to the side of the present antireflective film provided as the other protective film. Therefore, such a case is especially preferred.

EXAMPLES

The invention will now be illustrated in more detail by reference to the following examples, but these examples should not be construed as limiting the scope of the invention in any way.

(Synthesis of Fluoroaliphatic Group-Containing Copolymer (P-3))

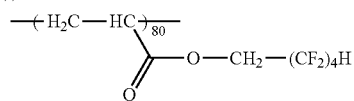

P-3

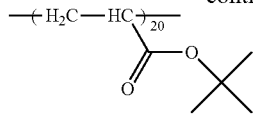

Mw20000

In a reaction vessel equipped with a stirrer and a reflux condenser, 31.94 g of 1H,1H,5H-octafluoropentyl acrylate, 7.99 g of t-butyl acrylate, 1.1 g of dimethyl 2,2'-azobisisobutyrate and 30 g of 2-butanone were placed, and heated at 78° C. for 6 hours under the atmosphere of nitrogen to complete reaction. Thus, P-3 was obtained. The mass-average molecular weight of P-3 was found to be $2.0 \times 10^4$.

(Synthesis of Fluoroaliphatic Group-Containing Copolymer (P-6))

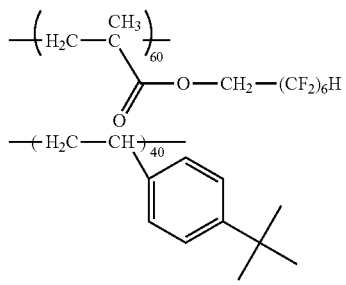

P-6

Mw19000

By using 23.96 g of 1H,1H,7H-dodecafluoroheptyl methacrylate, 15.97 g of 4-t-butylstyrene, 1.1 g of dimethyl 2,2'-azobisisobutyrate and 30 g of 2-butanone, P-6 was obtained in the same manner as the fluoroaliphatic group-containing polymer (P-3). The mass-average molecular weight was found to be $1.9 \times 10^4$.

(P-9), (P-12), (P-15) and (P-27) were also synthesized in the same manner as the fluoroaliphatic group-containing copolymer (P-3).

(Preparation of Coating Solution (HCL-1) of Antiglare Hard Coating Layer)

284 g of a commercially available zirconia-containing UV-cure hard coating solution (DeSolite Z70404 produced by JSR Corp., having a solids concentration of about 61% and about 70% $ZrO_2$ content in solid component, and containing a polymerizable monomer and a polymerization initiator) and 86 g of a dipentaerythritol acrylate-dipentaerythritol hexaacrylate mixture (DPHA, produced by Nippon Kayaku Co., Ltd.) were mixed, and further diluted with 60 g of methyl isobutyl ketone and 17 g of methyl ethyl ketone. The resulting mixture was further mixed with 28.5 g of a silane coupling agent (KBM-5103, produced by Shin-Etsu Chemical Co., Ltd.) with stirring. To the resulting solution, 0.26 g of a fluoropolymer according to the invention (P-3, 40 mass % MEK solution) was further added, and mixed with stirring. To the resulting solution, 30 g of a 30% methyl isobutyl ketone dispersion of classification strengthened cross-linked PMMA particles having an average particle size of 3.0 µm (refractive index 1.49, MXS-3000, produced by Soken Chemical & Engineering Co., Ltd.) prepared by 20 minutes' dispersing operation at 10,000 rpm by means of a Polytron dispersing machine and 95 g of a 30% methyl ethyl ketone dispersion of silica particles having an average particle size of 1.5 µm (refractive index 1.46, SEAHOSTAR KE-P150, produced by Nippon Shokubai Co., Ltd.) prepared by 30 minutes' dispersing operation at 10,000 rpm by means of the Polytron dispersing machine were further added, mixed and stirred, thereby making a finished solution. The mixed solution thus obtained was passed through a polypropylene filter having a pore size of 30 μm to prepare a coating solution (HCL-1) for an antiglare hard coating layer.

(Preparation of Coating Solution (HCL-2) for Antiglare Hard Coating Layer)

A coating solution (HCL-2) for an antiglare hard coating layer was prepared in the same manner as the coating solution (HCL-1) for an antiglare hard coating layer, inclusive of the addition amounts, but except that 0.26 g of a fluoropolymer (P-6, 40 wt % MEK solution) was added in place of the fluoropolymer (P-3) in the coating solution (HCL-1).

(Preparation of Coating Solution (HCL-3) for Antiglare Hard Coating Layer)

A coating solution (HCL-3) for an antiglare hard coating layer was prepared in the same manner as the coating solution (HCL-1) for an antiglare hard coating layer, inclusive of the addition amounts, but except that 0.26 g of a fluoropolymer (P-9, 40 wt % MEK solution) was added in place of the fluoropolymer (P-3) in the coating solution (HCL-1).

(Preparation of Coating Solution (HCL-4) for Antiglare Hard Coating Layer)

A coating solution (HCL-4) for an antiglare hard coating layer was prepared in the same manner as the coating solution (HCL-1) for an antiglare hard coating layer, inclusive of the addition amounts, but except that 0.26 g of a fluoropolymer (P-11, 40 wt % MEK solution) was added in place of the fluoropolymer (P-3) in the coating solution (HCL-1).

(Preparation of Coating Solution (HCL-5) for Antiglare Hard Coating Layer)

A coating solution (HCL-5) for an antiglare hard coating layer was prepared in the same manner as the coating solution (HCL-1) for an antiglare hard coating layer, inclusive of the addition amounts, but except that 0.26 g of a fluoropolymer (P-15, 40 wt % MEK solution) was added in place of the fluoropolymer (P-3) in the coating solution (HCL-1).

(Preparation of Coating Solution (HCL-6) for Antiglare Hard Coating Layer)

A coating solution (HCL-6) for an antiglare hard coating layer was prepared in the same manner as the coating solution (HCL-1) for an antiglare hard coating layer, inclusive of the addition amounts, but except that 0.26 g of a fluoropolymer (P-27, 40 wt % MEK solution) was added in place of the fluoropolymer (P-3) in the coating solution (HCL-1).

(Preparation of Coating Solution (HCL-7) for Antiglare Hard Coating Layer)

A coating solution was prepared by thoroughly mixing 300 parts by mass of a UV-cure resin, PETA (trade name, a mixture of pentaerythritol acrylate and pentaerythritol tetraacrylate, produced by Nippon Kayaku Co., Ltd.), 13.2 parts by mass of a light cure initiator, Irgacure 184 (produced by Ciba Specialty Chemicals), 52.3 parts by mass of cross-linked acrylic-styrene particles as first translucent fine particles (produced by Soken Chemical & Engineering Co., Ltd., average particle size 3.5 μm, refractive index 1.55, 30% toluene dispersion), 155.0 parts by mass of cross-linked polystyrene particles as second translucent fine particles (produced by Soken Chemical & Engineering Co., Ltd., average particle size 3.5 μm, refractive index 1.60, 30% toluene dispersion, used after 20 minutes' dispersion at 10,000 rpm by means of a Polytron dispersing machine), 1.13 parts by mass of a fluoropolymer according to the invention (P-3, 40 mass % cyclohexanone solution), 60.0 parts by mass of an organosilane compound, KBM-5103 (trade name, produced by Shin-Etsu Chemical Co., Ltd.), 143.0 parts by mass of cyclohexanone and 240.0 parts by mass of toluene.

(Preparation of Coating Solution (HCL-8) for Antiglare Hard Coating Layer)

A coating solution (HCL-8) for an antiglare hard coating layer was prepared in the same manner as the coating solution (HCL-7) for an antiglare hard coating layer, inclusive of the addition amounts, but except that 1.13 parts by mass of a fluoropolymer (P-6, 40 wt % cyclohexanone solution) was added in place of the fluoropolymer (P-3) in the coating solution (HCL-7).

(Preparation of Coating Solution (HCL-9) for Antiglare Hard Coating Layer)

A coating solution (HCL-9) for an antiglare hard coating layer was prepared in the same manner as the coating solution (HCL-7) for an antiglare hard coating layer, inclusive of the addition amounts, but except that 1.13 parts by mass of a fluoropolymer (P-9, 40 wt % cyclohexanone solution) was added in place of the fluoropolymer (P-3) in the coating solution (HCL-7).

(Preparation of Coating Solution (HCL-10) for Antiglare Hard Coating Layer)

A coating solution (HCL-10) for an antiglare hard coating layer was prepared in the same manner as the coating solution (HCL-7) for an antiglare hard coating layer, inclusive of the addition amounts, but except that 1.13 parts by mass of a fluoropolymer (P-11, 40 wt % cyclohexanone solution) was added in place of the fluoropolymer (P-3) in the coating solution (HCL-7).

(Preparation of Coating Solution (HCL-11) for Antiglare Hard Coating Layer)

A coating solution (HCL-11) for an antiglare hard coating layer was prepared in the same manner as the coating solution (HCL-7) for an antiglare hard coating layer, inclusive of the addition amounts, but except that 1.13 parts by mass of a fluoropolymer (P-15, 40 wt % cyclohexanone solution) was added in place of the fluoropolymer (P-3) in the coating solution (HCL-7).

(Preparation of Coating Solution (HCL-12) for Antiglare Hard Coating Layer)

A coating solution (HCL-12) for an antiglare hard coating layer was prepared in the same manner as the coating solution (HCL-7) for an antiglare hard coating layer, inclusive of the addition amounts, but except that 1.13 parts by mass of a fluoropolymer (P-27, 40 wt % cyclohexanone solution) was added in place of the fluoropolymer (P-3) in the coating solution (HCL-7).

(Preparation of Coating Solution (HCL-13) for Antiglare Hard Coating Layer)

A coating solution was prepared by thoroughly mixing 310 parts by mass of a UV-cure resin, PETA (trade name, a mixture of pentaerythritol acrylate and pentaerythritol tetraacrylate, produced by Nippon Kayaku Co., Ltd.), 15.0 parts by mass of a light cure initiator, Irgacure 184 (produced by Ciba Specialty Chemicals), 50.0 parts by mass of cross-linked acrylic-styrene particles as first translucent fine particles (produced by Soken Chemical & Engineering Co., Ltd., average particle size 3.5 μm, refractive index 1.55, 30% toluene dispersion), 150.0 parts by mass of cross-linked polystyrene particles as second translucent fine particles (produced by Soken Chemical & Engineering Co., Ltd., average particle size 3.5 μm, refractive index 1.60, 30% toluene dispersion, used after 20 minutes' dispersion at 10,000 rpm by means of a Polytron dispersing machine), 1.13 parts by mass of a fluoropolymer according to the invention (P-3, 40 mass % cyclohexanone solution), 60.0 parts by mass of an organosilane compound, KBM-5103 (trade name, produced by Shin-Etsu Chemical Co., Ltd.), 20.0 parts by mass of cyclohexanone and 400.0 parts by mass of methyl isobutyl ketone.

(Preparation of Coating Solution (HCL-14) for Antiglare Hard Coating Layer)

A coating solution (HCL-14) for an antiglare hard coating layer was prepared in the same manner as the coating solution (HCL-13) for an antiglare hard coating layer, inclusive of the addition amounts, but except that 1.13 parts by mass of a fluoropolymer (P-6, 40 wt % cyclohexanone solution) was added in place of the fluoropolymer (P-3) in the coating solution (HCL-13).

(Preparation of Coating Solution (HCL-15) for Antiglare Hard Coating Layer)

A coating solution (HCL-15) for an antiglare hard coating layer was prepared in the same manner as the coating solution (HCL-13) for an antiglare hard coating layer, inclusive of the addition amounts, but except that 1.13 parts by mass of a fluoropolymer (P-9, 40 wt % cyclohexanone solution) was added in place of the fluoropolymer (P-3) in the coating solution (HCL-13).

(Preparation of Coating Solution (HCL-16) for Antiglare Hard Coating Layer)

A coating solution (HCL-16) for an antiglare hard coating layer was prepared in the same manner as the coating solution (HCL-13) for an antiglare hard coating layer, inclusive of the addition amounts, but except that 1.13 parts by mass of a fluoropolymer (P-11, 40 wt % cyclohexanone solution) was added in place of the fluoropolymer (P-3) in the coating solution (HCL-13).

(Preparation of Coating Solution (HCL-17) for Antiglare Hard Coating Layer)

A coating solution (HCL-17) for an antiglare hard coating layer was prepared in the same manner as the coating solution (HCL-13) for an antiglare hard coating layer, inclusive of the addition amounts, but except that 1.13 parts by mass of a fluoropolymer (P-15, 40 wt % cyclohexanone solution) was added in place of the fluoropolymer (P-3) in the coating solution (HCL-13).

(Preparation of Coating Solution (HCL-18) for Antiglare Hard Coating Layer)

A coating solution (HCL-18) for an antiglare hard coating layer was prepared in the same manner as the coating solution (HCL-13) for an antiglare hard coating layer, inclusive of the addition amounts, but except that 1.13 parts by mass of a fluoropolymer (P-27, 40 wt % cyclohexanone solution) was added in place of the fluoropolymer (P-3) in the coating solution (HCL-13).

(Preparation of Coating Solution (HCL-19) for Antiglare Hard Coating Layer)

A coating solution was prepared by thoroughly mixing 310 parts by mass of a UV-cure resin, PETA (trade name, a mixture of pentaerythritol acrylate and pentaerythritol tetraacrylate, produced by Nippon Kayaku Co., Ltd.), 15.0 parts by mass of a light cure initiator, Irgacure 184 (produced by Ciba Specialty Chemicals), 1.13 parts by mass of a fluoropolymer according to the invention (P-3, 40 mass % cyclohexanone solution), 60.0 parts by mass of an organosilane compound, KBM-5103 (trade name, produced by Shin-Etsu Chemical Co., Ltd.), 20.0 parts by mass of cyclohexanone and 400.0 parts by mass of methyl isobutyl ketone.

(Preparation of Coating Solution (HCL-20) for Antiglare Hard Coating Layer)

A coating solution (HCL-20) for an antiglare hard coating layer was prepared in the same manner as the coating solution (HCL-19) for an antiglare hard coating layer, inclusive of the addition amounts, but except that 1.13 parts by mass of a fluoropolymer (P-6, 40 wt % cyclohexanone solution) was added in place of the fluoropolymer (P-3) in the coating solution (HCL-19).

(Preparation of Coating Solution (HCL-21) for Antiglare Hard Coating Layer)

A coating solution (HCL-21) for an antiglare hard coating layer was prepared in the same manner as the coating solution (HCL-19) for an antiglare hard coating layer, inclusive of the addition amounts, but except that 1.13 parts by mass of a fluoropolymer (P-9, 40 wt % cyclohexanone solution) was added in place of the fluoropolymer (P-3) in the coating solution (HCL-19).

(Preparation of Coating Solution (HCL-22) for Antiglare Hard Coating Layer)

A coating solution (HCL-22) for an antiglare hard coating layer was prepared in the same manner as the coating solution (HCL-19) for an antiglare hard coating layer, inclusive of the addition amounts, but except that 1.13 parts by mass of a fluoropolymer (P-11, 40 wt % cyclohexanone solution) was added in place of the fluoropolymer (P-3) in the coating solution (HCL-19).

(Preparation of Coating Solution (HCL-23) for Antiglare Hard Coating Layer)

A coating solution (HCL-23) for an antiglare hard coating layer was prepared in the same manner as the coating solution (HCL-19) for an antiglare hard coating layer, inclusive of the addition amounts, but except that 1.13 parts by mass of a fluoropolymer (P-15, 40 wt % cyclohexanone solution) was added in place of the fluoropolymer (P-3) in the coating solution (HCL-19).

(Preparation of Coating Solution (HCL-24) for Antiglare Hard Coating Layer)

A coating solution (HCL-24) for an antiglare hard coating layer was prepared in the same manner as the coating solution (HCL-19) for an antiglare hard coating layer, inclusive of the addition amounts, but except that 1.13 parts by mass of a fluoropolymer (P-27, 40 wt % cyclohexanone solution) was added in place of the fluoropolymer (P-3) in the coating solution (HCL-19).

(Preparation of Coating Solution (HCL-25) for Antiglare Hard Coating Layer)

A coating solution (HCL-25) for an antiglare hard coating layer was prepared in the same manner as the coating solution (HCL-1) for an antiglare hard coating layer, inclusive of the addition amounts, but except that the fluoropolymer (P-3) was not admixed in the coating solution (HCL-1).

(Preparation of Coating Solution (HCL-26) for Antiglare Hard Coating Layer)

A coating solution (HCL-26) for an antiglare hard coating layer was prepared in the same manner as the coating solution (HCL-1) for an antiglare hard coating layer, inclusive of the addition amounts, but except that 0.26 g of the fluoropolymer represented by R-1 illustrated below (40 wt % MEK solution) was added in place of the fluoropolymer (P-3) in the coating solution (HCL-1).

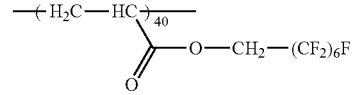

R-1

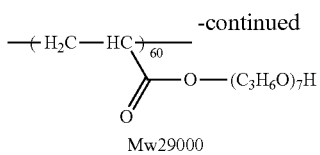

Mw29000

(Preparation of Coating Solution (HCL-27) for Antiglare Hard Coating Layer)

A coating solution (HCL-27) for an antiglare hard coating layer was prepared in the same manner as the coating solution (HCL-1) for an antiglare hard coating layer, inclusive of the addition amounts, but except that 0.26 g of the fluoropolymer represented by R-2 illustrated below (40 wt % MEK solution) was added in place of the fluoropolymer (P-3) in the coating solution (HCL-1).

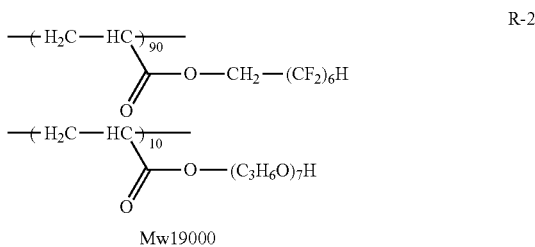

Mw19000

(Preparation of Coating Solution (HCL-28) for Antiglare Hard Coating Layer)

A coating solution (HCL-28) for an antiglare hard coating layer was prepared in the same manner as the coating solution (HCL-1) for an antiglare hard coating layer, inclusive of the addition amounts, but except that 0.26 g of the fluoropolymer represented by R-3 illustrated below (40 wt % MEK solution) was added in place of the fluoropolymer (P-3) in the coating solution (HCL-1).

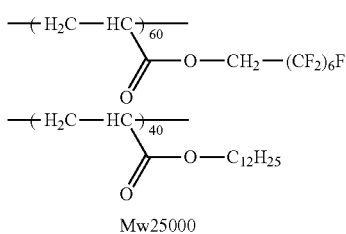

Mw25000

(Preparation of Sol "a")

In a reaction vessel equipped with a stirrer and a reflux condenser, 119 parts of methyl ethyl ketone, 101 parts of acryloyloxypropyltrimethoxysilane (KBM5103, produced by Shin-Etsu Chemical Co., Ltd.) and 3 parts of diisopropoxyaluminum ethylacetoacetate were admixed, and thereto 30 parts of ion-exchanged water was added. The resultant admixture underwent reaction at 60° C. for 4 hours, and then cooled to room temperature. Thus, sol "a" was prepared.

The mass-average molecular weight of the sol "a" was found to be 1,600, and the proportion of components ranging in molecular weight from 1,000 to 20,000 in all the components higher in molecular weight than oligomeric components was found to be 100%. In addition, it was ascertained by gas chromatography analysis that acryloyloxypropyltrimethoxysilane used as the starting material didn't remain at all.

(Preparation of Coating Solution (LL-1) for Low Refractive Index Layer)

A coating solution (LL-1) for a low refractive index layer was prepared by admixing and stirring 13.1 g of JTA113 (trade name, refractive index 1.44, solids concentration 6%, MEK solution, produced by JSR Corp.), which can further enhance coating strength as compared with the previous JN-7228A, 1.31 g of a colloidal silica dispersion MEK-ST-L (trade name, average particle size 45 nm, solids concentration 30%, produced by Nissan Chemical Industries, Ltd.), 0.59 g of the sol "a", 5.1 g of methyl ethyl ketone and 0.6 g of cyclohexanone, and then passing the resultant mixture through a polypropylene filter having a pore size of 1 μm.

(Structure of Die Coater)

As the slot die 13 shown in FIG. 9 was used a slot die having dimensions that the upstream-side lip land length $I_{UP}$ was 0.5 mm, the downstream-side lip land length $I_{LO}$ was 50 μm, the opening length of the slot 16 was 150 μm in the direction of web travel and the length of slot 16 was 50 mm.

The gap between the upstream-side lip land 18a and the web W was set at a value 50 μm longer than the gap between the downstream-side lip land 18b and the web W (hereinafter this situation is referred to as "overbite length of 50 μm), and the gap $G_L$ between the downstream-side lip land 18b and web W was set at 50 μm.

In addition, the gap $G_S$ between the side plate 40b of the pressure-reduced chamber 40 and the web W and the gap $G_B$ between the back plate 40a and the web W were both set at 200 μm.

(Evaluation of Antireflective Film)

Evaluation of the following items was performed on films obtained.

(1) Resistance to Steel Wool Abrasion

Abrasion tests were carried out using a rubbing tester under the following conditions.

Requirements for Sample Humidity Conditioning:
  25° C., 60% RH, 2 hours or above
Rubbing Material:
  Steel wool (grade No. 0000, produced by Nihon Steel Wool Co., Ltd.) was wound around a tester's rubbing tip (1 cm×1 cm) to be brought into contact with a sample, and further a band was fastened around the steel wool to keep the steel wool from moving.

Moving distance (one way): 13 cm, rubbing speed: 13 cm/sec, load: 200 g/cm², contact area of tip; 1 cm×1 cm, number of rubbings: 20 reciprocations At the completion of the rubbing, the sample's back was coated with oil-based black ink. Visual observations of the resultant samples were made with reflected light, and abrasions of the rubbed areas were evaluated on the following criteria.

No abrasion is observed at all: good

Moderate abrasions are observed: fair

Severe abrasions are observed in one glance: bad (2) Evaluation of Tolerance to Rubbing with Cotton Swab in Water A cotton swab was fasten to the rubbing tip of the rubbing tester, both up and down sides of a sample were held down with clips in a flat and smooth pan, and the sample and the cotton swab were immersed in 25° C. water at an ambient temperature of 25° C. A load of 500 g was imposed on the cotton swab, and rubbing tests among which the number of rubbings varied were carried out. Rubbing conditions adopted are as follows:

Rubbing distance (one way): 1 cm

Rubbing speed: about 2 reciprocations/sec

By observation at the conclusion of each rubbing test, each sample was examined for the number of rubbings by which exfoliation of film occurred, and tolerance to rubbing was evaluated as follows.

Exfoliation of film occurs by 0-30 reciprocations: bad

Exfoliation of film occurs by 30-150 reciprocations: fair

No exfoliation of film occurs even by 150 reciprocations: good

EXAMPLE 1

Example 1

(Making of Antireflective Film)

The coating-side surface of an 80 μm-thick triacetyl cellulose film (TD-80UF, produced by Fuji Photo Film Co., Ltd.) was subjected to electricity removal treatment with a ultrasonic dust eliminator, and thereon the coating solution (HCL-1) for an antiglare hard coating layer was coated at a coating speed of 30 m/min by means of the die coater mentioned above. The degree of pressure reduction in the pressure-reduced chamber was 0.8 kPa. The coating of HCL-1 was performed at a setting that the gap $G_L$ between the downstream-side lip land 18b and the web W was adjusted to 80 μm. The coating thus provided on the web was dried at 80° C., and then cured by UV irradiation with a 160 W/cm air-cooled metal halide lamp (made by Eye Graphics Co., Ltd.) at an illuminance of 400 mW/cm$^2$ and an exposure of 500 mJ/cm$^2$ while reducing an oxygen concentration in the atmosphere to 0.1 volume % or below by nitrogen purge. Thus, a hard coating layer having a thickness of 7 μm was formed. On the thus formed hard coating layer, the coating solution (LL-1) for a low refractive index layer was coated at 30 m/min by means of the die coater. The degree of pressure reduction in the pressure-reduced chamber was 0.8 kPa. The coating thus provided on the web was dried for 30 seconds at 90° C., and then cured by UV irradiation with a 240 W/cm air-cooled metal halide lamp (made by Eye Graphics Co., Ltd.) at an illuminance of 600 mW/cm$^2$ and an exposure of 400 mJ/cm$^2$ while reducing an oxygen concentration in the atmosphere to 0.1 volume % or below by nitrogen purge, thereby forming a low refractive index layer (refractive index: 1.45, thickness: 83 nm). Thus, an antireflective film was made.

In the foregoing processes, the coating and drying processes were carried out under the atmosphere of air with cleanliness of 30 or below (per cubic meter) particles 0.5 μm or above in size. Immediately before the coating, dust removal was carried out by blowing high-speed air of high cleanliness described in JP-A-10-309553 on the coating layer, thereby scaling adherents from the film surface and sucking the adherents into nearby suction openings under suction, and followed by coating. The electrification potential of the base before dust removal was 200 V or below. The coating was performed for each layer by undergoing the process including feeding, dust removal, coating, drying, (UV or heat) curing and winding steps.

Examples 2 to 24

Antireflective films were made in the same manner as in Example 1, except that the coating solution for the antiglare hard coating layer was changed to HCL-2 to HCL-24, respectively. Abrasion resistance evaluations of the antireflective films obtained and visual observation results of surface conditions of the antireflective films whose backs were filled in with black are shown in Table 1. The antireflective films with coatings formed from the coating solutions containing the present compositions were all good in abrasion resistance evaluation, evenness in airing and evenness in coating. The term "evenness in airing" as used herein refers to the surface-condition fault which varies under change in drying conditions, and the term "evenness in coating" as used herein refers to the surface-condition fault which varies under change in coating conditions. When faults in the surface condition are recognized by visual observation, the evenness was assumed to be bad.

Each of the antireflective films made in Examples 1 to 24 was immersed in a 2.0N, 55° C. aqueous solution of NaOH for 2 minutes, thereby saponifying the triacetyl cellulose surface as the film's back, and an 80 μm-thick triacetyl cellulose film (TD-80UF, produced by Fuji Photo Film Co., Ltd.) was saponified under the same condition as mentioned above. And these saponified films were bonded respectively to both sides of a polarizer made through adsorption of iodine to polyvinyl alcohol and stretching, thereby protecting the polarizer and making a polarizing plate. When each of the thus made polarizing plates was stuck with the antireflective film side outward in place of the viewing-side polarizing plate in the liquid crystal display device of a transmission TN-mode liquid crystal display-equipped notebook personal computer (having D-BEF made by Sumitomo 3M Limited as a polarization split film with a polarization selection layer between the backlight and the liquid crystal cell), every display device obtained was exceedingly reduced in background reflection and tint of reflected light, and further ensured uniformity in its screen and delivered very high display quality.

Comparative Examples 1 to 4

Antireflective films were made in the same manner as in Example 1, except that the coating solution for the antiglare hard coating layer was replaced by the coating solutions HCL-25 to HCL-28 for antiglare hard coating layers, respectively. Evaluation results of surface conditions of the antireflective films obtained, including evenness in airing and evenness in coating, are shown in Table 1. In Comparative Example 1 applying a coating of the fluoropolymer-free HCL-25, the antireflective film made was unfavorable because unevenness by airing developed and in-plane uniformity was low. In Comparative Example 2 applying a coating of HCL-26, there occurred degradation in abrasion resistance (resistances to rubbing with steel wool and a cotton swab). In Comparative Example 3 applying a coating of HCL-27, the antireflective film made was unfavorable because, although its abrasion resistance was improved, unevenness by coating developed and in-plane uniformity was low. In Comparative Example 4 applying a coating of HCL-28, the antireflective film made was unfavorable because repellent marks developed on the coating surface and in-plane uniformity was low. When each of the antireflective films obtained in Comparative Examples 1 to 4 was further placed on the viewing-side of the liquid crystal display device in the same manner as mentioned above, every resultant display device was undesirable because it had low uniformity in the screen and low display quality.

TABLE 1

| | Coating Solution for Antiglare Hard Coating Layer | Resistance to Steel Wool Abrasion | Rubbing with Cotton Swab | Evenness in Airing | Evenness in Coating |
|---|---|---|---|---|---|
| Example 1 | HCL-1 | good | good | good | good |
| Example 2 | HCL-2 | good | good | good | good |
| Example 3 | HCL-3 | good | good | good | good |
| Example 4 | HCL-4 | good | good | good | good |
| Example 5 | HCL-5 | good | good | good | good |
| Example 6 | HCL-6 | good | good | good | good |
| Example 7 | HCL-7 | good | good | good | good |
| Example 8 | HCL-8 | good | good | good | good |
| Example 9 | HCL-9 | good | good | good | good |
| Example 10 | HCL-10 | good | good | good | good |
| Example 11 | HCL-11 | good | good | good | good |
| Example 12 | HCL-12 | good | good | good | good |
| Example 13 | HCL-13 | good | good | good | good |
| Example 14 | HCL-14 | good | good | good | good |
| Example 15 | HCL-15 | good | good | good | good |
| Example 16 | HCL-16 | good | good | good | good |
| Example 17 | HCL-17 | good | good | good | good |
| Example 18 | HCL-18 | good | good | good | good |
| Example 19 | HCL-19 | good | good | good | good |
| Example 20 | HCL-20 | good | good | good | good |
| Example 21 | HCL-21 | good | good | good | good |
| Example 22 | HCL-22 | good | good | good | good |
| Example 23 | HCL-23 | good | good | good | good |
| Example 24 | HCL-24 | good | good | good | good |
| Comparative Example 1 | HCL-25 | good | good | bad | good |
| Comparative Example 2 | HCL-26 | bad | fair | good | good |
| Comparative Example 3 | HCL-27 | good | good | good | bad |
| Comparative Example 4 | HCL-28 | repellent | repellent | repellent | repellent |

While the invention has been described in detail and with reference to specific examples thereof, it will be apparent to one skilled in the art that various changes and modifications can be made therein without departing from the spirit and scope thereof.

This application is based on the Japanese patent application filed in Jan. 27, 2005 (Japanese Patent Application 2005-019561), and the entire disclosure thereof is incorporated herein by reference, as if fully set forth herein.

INDUSTRIAL APPLICABILITY

Although the all wet coating using a solvent is highly advantageous from the productivity viewpoint, it has a large problem of tending to cause unevenness in surface conditions. However, the present invention makes it possible to improve the unevenness in surface conditions, so mass production of antireflective films is considered to become feasible.

The invention claimed is:

1. A coating composition, which comprises:
a fluoroaliphatic group-containing copolymer in an amount of from 0.001 mass% to 5.0 mass% that comprises a repeating unit corresponding to the following monomer (i) and a repeating unit corresponding to the following monomer (ii):
(i) fluoroaliphatic group-containing monomer represented by the following formula [1],
(ii) monomer represented by the following formula [2]:

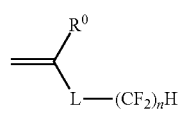

Formula [1]

in formula [1], R represents a hydrogen atom, a halogen atom or a methyl group;

L represents a divalent linkage group; and n represents an integer of 1 to 18, and

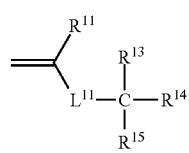

Formula [2]

in formula [2], $R^{11}$ represents a hydrogen atom, a halogen atom or a methyl group;

$L^{11}$ represents a divalent linkage group; and $R^{13}$, $R^{14}$ and $R^{15}$ each represents a 1-20C linear, branched or cyclic hydrocarbon group or an aromatic heterocyclic group, which each may have a substituent.

2. The coating composition according to claim 1, wherein the fluoroaliphatic group-containing monomer represented by the formula [1] is represented by the following formula [3]:

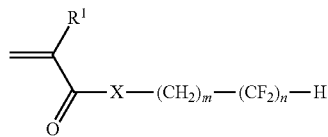

Formula [3]

in formula [3], $R^1$ represents a hydrogen atom, a halogen atom or a methyl group;

X represents an oxygen atom, a sulfur atom or —N(Ra)—;

m represents an integer of 1 to 6; and n represents an integer of 1 to 18, in which Ra represents a hydrogen atom or a 1-8C alkyl group which may have a substituent.

3. The coating composition according to claim 1, wherein the monomer represented by the formula [2] is represented by the following formula [6]:

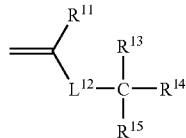

Formula [6]

in formula [6], $R^{11}$ represents a hydrogen atom, a halogen atom or a methyl group;

$L^{12}$ represents a divalent linkage group containing any of an oxygen atom, a nitrogen atom and a sulfur atom; and $R^{13}$, $R^{14}$, and $R^{15}$ each represents a 1-20C linear, branched or cyclic hydrocarbon atom or an aromatic heterocyclic group, which each may have a substituent.

4. The coating composition according to claim 2, wherein the monomer represented by the formula [2] is represented by the following formula [6]:

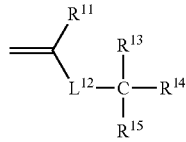

Formula [6]

in formula [6], $R^{11}$ represents a hydrogen atom, a halogen atom or a methyl group;

$L^{12}$ represents a divalent linkage group containing any of an oxygen atom, a nitrogen atom and a sulfur atom; and $R^{13}$, $R^{14}$ and $R^{15}$ each represents a 1-20C linear, branched or cyclic hydrocarbon atom or an aromatic heterocyclic group, which each may have a substituent.

5. The coating composition according to claim 1, wherein the monomer represented by the formula [2] is represented by the following formula [7]:

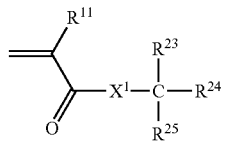

Formula [7]

in formula [7], $R^{11}$ represents a hydrogen atom, a halogen atom or a methyl group;

$X^1$ represents an oxygen atom, a sulfur atom or —N(Rc)- ; and $R^{23}$, $R^{24}$ and $R^{25}$ each represents a 1-20C linear, branched or cyclic alkyl group, in which Rc represents a hydrogen atom or a 1-8C alkyl group which may have a substituent.

6. The coating composition according to claim 2, wherein the monomer represented by the formula [2] is represented by the following formula [7]:

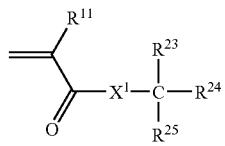

Formula [7]

in formula [7], $R^{11}$ represents a hydrogen atom, a halogen atom or a methyl group;

$X^1$ represents an oxygen atom, a sulfur atom or —N(Rc)- ; and $R^{23}$, $R^{24}$ and $R^{25}$ each represents a 1-20C linear, branched or cyclic alkyl group, in which Rc represents a hydrogen atom or a 1-8C alkyl group which may have a substituent.

7. The coating composition according to claim 1, wherein in formula [2], $R^{11}$ represents a hydrogen atom or a halogen atom.

8. The coating composition according to claim 1, wherein the mass-average molecular weight of the fluoroaliphatic group-containing copolymer is from 19,000 to 100,000.

9. The coating composition according to claim 1, wherein in formula [1], n represents 6.

* * * * *